US009760268B2

United States Patent
Jeon et al.

(10) Patent No.: US 9,760,268 B2
(45) Date of Patent: Sep. 12, 2017

(54) MOBILE DEVICE

(71) Applicant: Samsung Electronics Co., Ltd., Suwon-si, Gyeonggi-do (KR)

(72) Inventors: Ji Hyun Jeon, Suwon-si (KR); Young Sun Shin, Seongnam-si (KR); Eun Kyung Hong, Anyang-si (KR); Sun Young Seo, Seoul (KR); So Young Yun, Seoul (KR); Jiyoon Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 14/533,598

(22) Filed: Nov. 5, 2014

(65) Prior Publication Data

US 2015/0286388 A1    Oct. 8, 2015

(30) Foreign Application Priority Data

Sep. 5, 2013 (KR) ........................ 10-2013-0106889

(51) Int. Cl.
| | |
|---|---|
| G06F 3/048 | (2013.01) |
| G06F 3/0484 | (2013.01) |
| G06F 3/0481 | (2013.01) |
| G06F 3/0482 | (2013.01) |
| H04L 12/24 | (2006.01) |
| H04L 12/26 | (2006.01) |
| H04L 12/28 | (2006.01) |
| G06F 3/0488 | (2013.01) |

(52) U.S. Cl.
CPC ........ *G06F 3/04847* (2013.01); *G06F 3/0482* (2013.01); *G06F 3/04817* (2013.01); *G06F 3/04842* (2013.01); *H04L 12/282* (2013.01); *H04L 41/22* (2013.01); *H04L 43/0817* (2013.01); *G06F 3/04883* (2013.01); *G06F 3/04886* (2013.01)

(58) Field of Classification Search
CPC .................................................... G06F 3/0484
See application file for complete search history.

(56) References Cited

U.S. PATENT DOCUMENTS

| 6,020,881 A * | 2/2000 | Naughton ............... H04L 29/06 348/E5.102 |
| 6,452,607 B1 * | 9/2002 | Livingston .......... G06F 3/04895 715/705 |

(Continued)

*Primary Examiner* — Peiyong Weng
(74) *Attorney, Agent, or Firm* — Jefferson IP Law, LLP

(57) ABSTRACT

A mobile device includes a storage unit that stores information of previously registered electrical devices and an application for monitoring and controlling the previously registered electrical devices, a communication unit that communicates with the previously registered electrical device, a user interface unit that includes an overview part and a widget part, outputs an operation status of the previously registered electrical device, and receives an operation command of at least one of the previously registered electrical devices, a control unit that controls the user interface unit so that the operation status of the previously registered electrical device is output when the application is executed, and controls an operation of the at least one electrical device based on the operation command input to the user interface unit.

26 Claims, 77 Drawing Sheets

(56) References Cited

U.S. PATENT DOCUMENTS

2008/0309513 A1* 12/2008 Ebbe ................... G08C 17/02
                                                    340/4.21
2009/0057427 A1*  3/2009 Geadelmann ......... G05B 15/02
                                                    236/51

* cited by examiner

[Option menu]

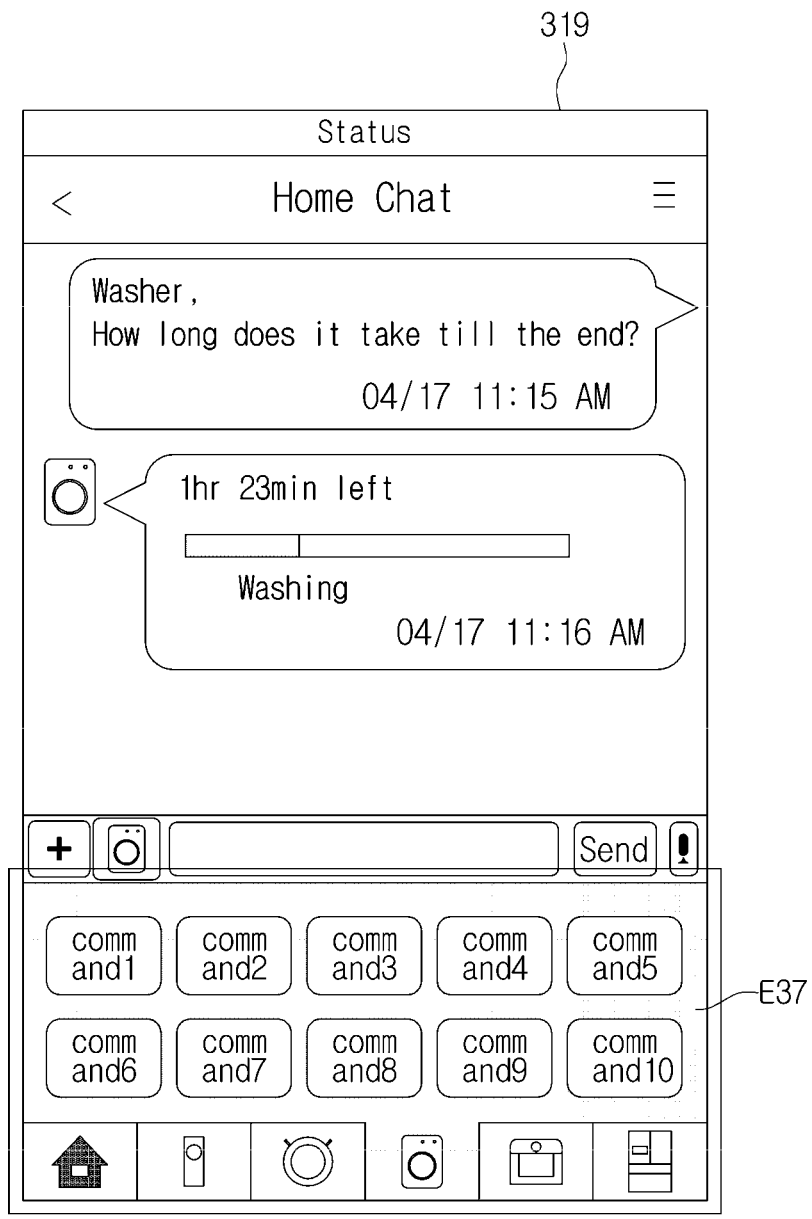

MOBILE DEVICE

CROSS-REFERENCE TO RELATED APPLICATION

This application claims the benefit of Korean Patent Application No. 10-2013-0106889, filed on Sep. 5, 2013 in the Korean Intellectual Property Office, the disclosure of which is incorporated herein by reference.

BACKGROUND

1. Field

Embodiments of the present invention relate to a mobile device for monitoring devices in home.

2. Description of the Related Art

With the rapid development of wired and wireless data communication technology and the proliferation of communication networks that are the foundations thereof, a high-speed communication service, such as the Internet, has become popular lately. In particular, as the Internet is supplied to homes, existing personal computer (PC)-based network building technology is being developed as home network technology for enabling control of digital information home appliances in a home at a remote site.

In a home network system, digital home appliances, sensors, lighting fixtures, an air-conditioning system, gas equipment, etc. installed in a home are connected via a wired network or a wireless network, so that a user may control desired devices any time anywhere.

Such a home network system generally includes a home server (or home monitoring gateway) performing functions of a master, a plurality of home network devices (referred to as "control-target devices" below) monitored and controlled by the home server, and a control device monitoring and controlling the plurality of control-target devices through only a connection with the home server inside or outside a home.

In general, the home server is implemented in a home residential gateway (RG) or a wall pad, and the control device is implemented in a wall pad, a television (TV), a cellular phone, a computer, and so on. The home server and the control device may be implemented in one device in an integrated fashion.

In this home network system, the home server may automatically recognize the control-target devices, for example, a TV, a refrigerator, an electric lamp, a microwave, a sensor, a boiler, and a washing machine, connected to the home network through various physical media (e.g., a power cable, serial communication conforming to RS-232, etc., and Ethernet) in the home, and displays the recognized home network devices on a screen so that a user may control a desired control-target device.

The control device performs monitoring and control of the plurality of control-target devices through communication with the home server.

The home server in this home network exchanges data with an external network that is mainly implemented as the Internet.

Outside the home, the user connects to the home server using a mobile device, such as a PC, a laptop computer, a personal digital assistant (PDA), and a tablet PC, capable of connecting to the Internet, and then accesses the plurality of home appliances connected to the home network in the home.

When the control-target devices in the home are monitored and controlled using the mobile device, use of the mobile device involves selecting a control-target device, establishing a network connection with the control-target device, undergoing authentication, and then monitoring or controlling the control-target device, and thus is complicated.

For example, home appliances, such as an air conditioner or an air cleaner for air conditioning and a humidifier for adjusting humidity, are frequently operated and controlled together. To this end, a user separately gives operation control instructions to the respective home appliances every time, which is inconvenient and inefficient.

SUMMARY

An aspect provides a mobile device including icons of electrical devices in home, a speech bubble that displays operation status of the electrical devices, and an overview part having a movement button for moving the screen on which the icons are displayed to right and left sides when an application for a home network is executed.

Another aspect provides a mobile device including a master key part having a plurality of buttons for collectively controlling electrical devices in home based on a previously set operation command when an application for a home network is executed.

Still another aspect provides a mobile device including a chatting part that performs chat with an electrical device in home using a shortcut button having a chatting word set in advance when an application for home networks is executed.

According to an aspect, a mobile device includes a storage unit that stores information of previously registered electrical devices and an application for monitoring and controlling the previously registered electrical devices; a communication unit that communicates with the previously registered electrical device; a user interface unit that includes an overview part and a widget part, outputs an operation status of the previously registered electrical device, and receives an operation command of at least one of the previously registered electrical devices; a control unit that controls the user interface unit so that the operation status of the previously registered electrical device is output when the application is executed, and controls an operation of the at least one electrical device based on the operation command input to the user interface unit, wherein the overview part of the user interface unit includes an icon of the previously registered electrical device, and a movement button for moving the icon to change a display position, and the widget part of the user interface unit includes at least one of a master key part for causing the previously registered electrical device to operate based on a previously set operation command, a chatting part for performing chat with the at least one previously registered electrical device, and a home view part that outputs an image in home.

The user interface unit includes a dashboard screen in which the overview part and the widget part are set; and at least one plugin screen switched by a sliding touch input to the dashboard screen and inputting and outputting a registration item and a service item of the electrical device. The plugin screen includes a device confirmation button having registration information for the previously registered electrical device; and a registration setting button for registering a new device.

The plugin screen includes a setting changing button for changing settings of the master key part, the chatting part, and the home view part of the widget part; a service button for receiving a service for the previously registered electrical device; and a management button for each previously registered electrical device.

The overview part further includes a speech bubble arranged around the icon of the previously registered electrical device and guiding an ON/OFF state and a progress state of the previously registered electrical device.

When the icon of any one of the electrical devices is touched, the control unit changes the operation status of the touched electrical device, and performs control so that the changed operation status is displayed as a speech bubble.

When the icon of any one of the electrical devices is touched in a state in which the electrical devices is ON, the control unit confirms a progress status of the electrical device corresponding to the touched icon, and controls the user interface unit so that the confirmed progress status is displayed in the speech bubble.

The control unit confirms at least one of update, an error and a reservation status of the previously registered electrical device, and controls the user interface unit so that the confirmed status is displayed in the speech bubble.

The control unit changes the operation status of the previously registered electrical device in response to touch input of the master key part and chat command input of the chatting part, and controls the user interface unit so that the changed operation status is displayed in the speech bubble.

The movement button includes a first direction button for instructing movement from a current screen displayed currently in the overview part to a screen extending in a first direction; and a second direction button for instructing movement from the current screen to a screen extending in a second direction that is a direction opposite to the first direction, and the overview part shifts the icons of a predetermined number of electrical devices within the current screen by one column in the second direction to rearrange the icons when the first direction button is selected, and shifts the icons of the predetermined number of electrical devices within the current screen by one column in the first direction to rearrange the icons when the second direction button is selected.

The overview part rearranges an icon of a new electrical device in an outermost column of the screen in the selected direction, and causes the icon of the electrical device arranged in an outermost column in a direction opposite to the selected direction to disappear.

The control unit causes a screen of the widget part to be kept in a current state when the movement button of the overview part is touched.

The master key part includes a Going Out button, a Coming Home button, and a Good Night button for collectively controlling previously registered electrical devices, and the control unit confirms the button touched in the user interface unit and causes an operation command to be transferred to the registered electrical device based on the confirmed button.

The master key part further includes a setting button for setting and changing the operation command of the previously registered electrical device for each of the Going Out button, the Coming Home button, and the Good Night button.

The master key part further includes a setting button for adding and deleting a button for collectively controlling the previously registered electrical devices.

The home view part outputs an image of the inside of the home of the user at previously set time intervals, and enlarges and outputs a home view image on a dashboard screen when a touch command is input.

The catting unit includes an icon selection window including the icons of the previously registered electrical devices and used to select at least one of the icons; a conversation display windows that displays conversation with the at least one electrical device; and a conversation input window for selecting a method of inputting conversation with the at least one electrical device, and inputting conversation.

The conversation input window includes a keypad having characters; and a transfer button that transfers conversation input.

The conversation input window includes a plurality of shortcut buttons in which the operation commands of the respective registered electrical devices are set.

The conversation input window includes a button for instructing to input voice.

The conversation input window further includes a target window that displays the icon of the electrical device that is a conversation target.

The conversation input window further includes an all-device selection icon that causes all of the previously registered electrical devices to be conversation targets.

The control unit determines whether the operation status of at least one of the electrical devices is changed in a state in which the application is not executed, and causes notice information corresponding to the change of the operation status to be displayed as a popup window on a home screen when determining that the operation status of the at least one electrical device is changed.

The control unit causes notice information for update, an error, and management time of at least one of the electrical devices to be displayed as a popup window on a home screen in a state in which the application is not executed.

According to another aspect, a mobile device includes: a storage unit that stores information of previously registered electrical devices and an application for monitoring and controlling the previously registered electrical devices; a communication unit that communicates with the previously registered electrical device; a user interface unit that outputs icons of the previously registered electrical devices, a movement button for moving the icon to change a display position, and a speech bubble arranged around the icon and guiding an operation status of the previously registered electrical device, and receives an operation command of at least one of the previously registered electrical devices; and a control unit that controls the user interface unit so that the operation status of the previously registered electrical device is output when the application is executed, changes the operation status of the electrical device corresponding to a touched icon when the icon of any one of the electrical devices displayed on the user interface unit is touched, and controls the user interface unit so that an operation status of the speech bubble corresponding to the touched icon is changed.

The control unit confirms an ON/OFF state of the previously registered electrical device, transfers an OFF command to the any one of the electrical devices when the icon is touched in a state in which the electrical device is ON, transfers an ON command to the electrical device when the icon is touched in a state in which the electrical device is OFF, and controls displaying of the speech bubble of the interface unit based on the changed operation status.

When the icon of any one of the electrical devices is touched in a state in which the electrical device is ON, the control unit confirms a progress status of the electrical device corresponding to the touched icon, confirms update, an error, and a reservation status of the previously registered electrical device, and controls displaying of the speech bubble of the interface unit based on each of the confirmed information.

According to still another aspect, a mobile device includes a storage unit that stores information of previously registered electrical devices and an application for monitoring and controlling the previously registered electrical devices; a communication unit that communicates with the previously registered electrical device; a user interface unit that includes icons of the previously registered electrical devices, an overview part having a movement button for moving the icon to change a display position, and a master key part that operates the previously registered electrical device based on a previously set operation command, outputs an operation status of the previously registered electrical device, and receives an operation command of at least one of the previously registered electrical devices; and a control unit that controls the user interface unit so that the operation status of the previously registered electrical device is output when the application is executed, and controls the operation of the at least one electrical device based on the operation command input to the user interface unit, wherein the master key part of the user interface unit includes a Going Out button, a Coming Home button, and a Good Night button, and respective operation commands of the previously registered electrical device corresponding to the Going Out button, the Coming Home button, and the Good Night button are set.

The master key part further includes a setting button for setting and changing an operation command of the previously registered electrical devices for each of the Going Out button, the Coming Home button, and the Good Night button, and adding and deleting a button for collectively controlling the previously registered electrical devices.

According to still another aspect, a mobile device includes a storage unit that stores information of previously registered electrical devices and an application for monitoring and controlling the previously registered electrical devices; a communication unit that communicates with the previously registered electrical device; a user interface unit that includes a chatting part for performing chat with at least one of the previously registered electrical devices, and outputs an operation status of the at least one previously registered electrical devices and receives an operation command of the at least one previously registered electrical devices via the chatting part; and a control unit that controls the user interface unit so that the operation status of the previously registered electrical device is output when the application is executed, and controls an operation of the at least one electrical device based on the operation command input to the user interface unit, wherein the chatting part of the user interface unit includes an icon selection window that displays icons of the previously registered electrical devices and used to select at least one of the icons; a conversation display windows that displays conversation with the at least one electrical device; and a conversation input window used to input a conversation using a shortcut button in which the operation command of each of the registered electrical device is set.

The conversation input window further includes at least one of a keypad for inputting characters and a button for instructing to input voice.

The conversation input window further includes a target window that displays the icon of the electrical device that is a conversation target or an all-device selection icon for setting all of the previously registered electrical devices as conversation targets.

According to an aspect, the plurality of electrical devices in home are displayed as the icons to be easily identified, and the operation status of the electrical device is displayed as the speech bubble around the icon so that the operation status of the electrical device in the home can be easily confirmed. That is, it is possible to provide convenience to a user.

Further, since the operation status of the electrical device can be changed through only the icon touch, it is possible to easily control the operation of the electrical device, simultaneously collectively control the electrical devices using the plurality of buttons of the master key, improve convenience and effectiveness of the control of the electrical devices, and confirm the state information of the electrical device rapidly and easily by outputting an event in which the state of the electrical device is changed, as a popup window.

Further, it is possible to transfer the operation command to at least one electrical device simply and easily using the shortcut button of the chatting part.

DETAILED DESCRIPTION

Hereinafter, the present invention will be described in detail with reference to the accompanying drawings.

Figure 1:
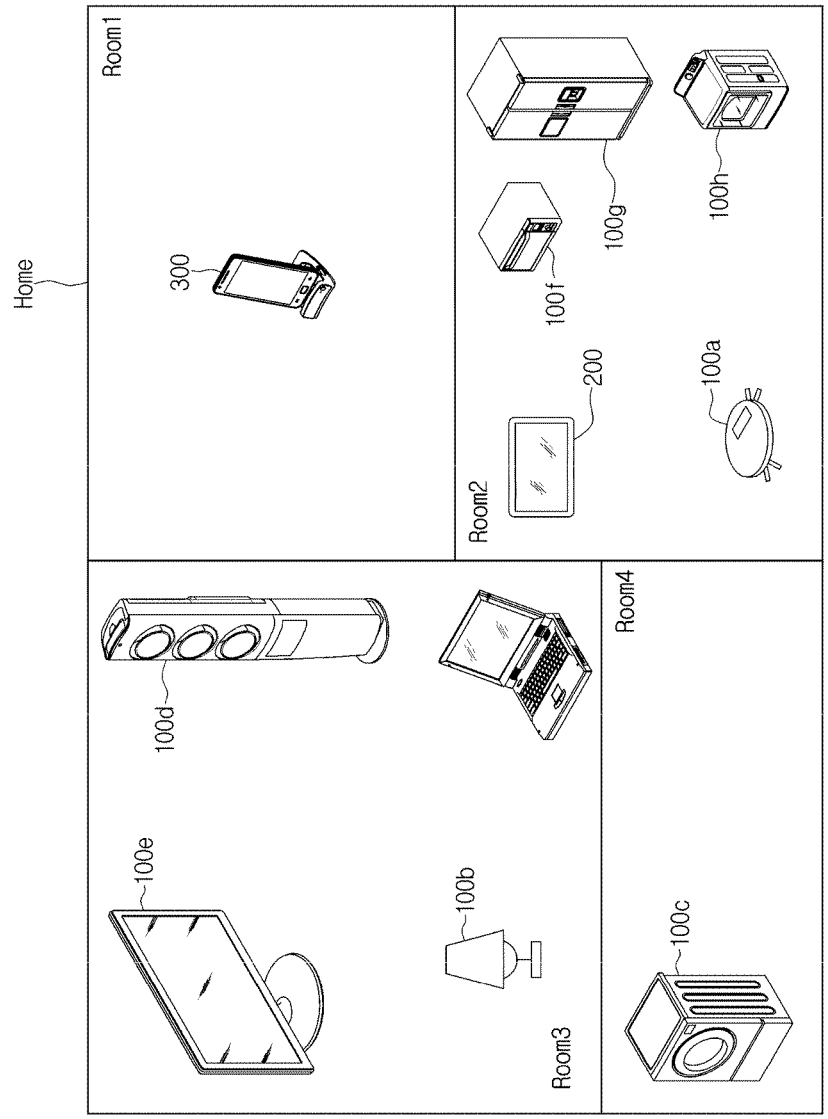
FIG. 1 is a diagram illustrating a home network system communicating with a mobile device according to an embodiment.
Figure 2:
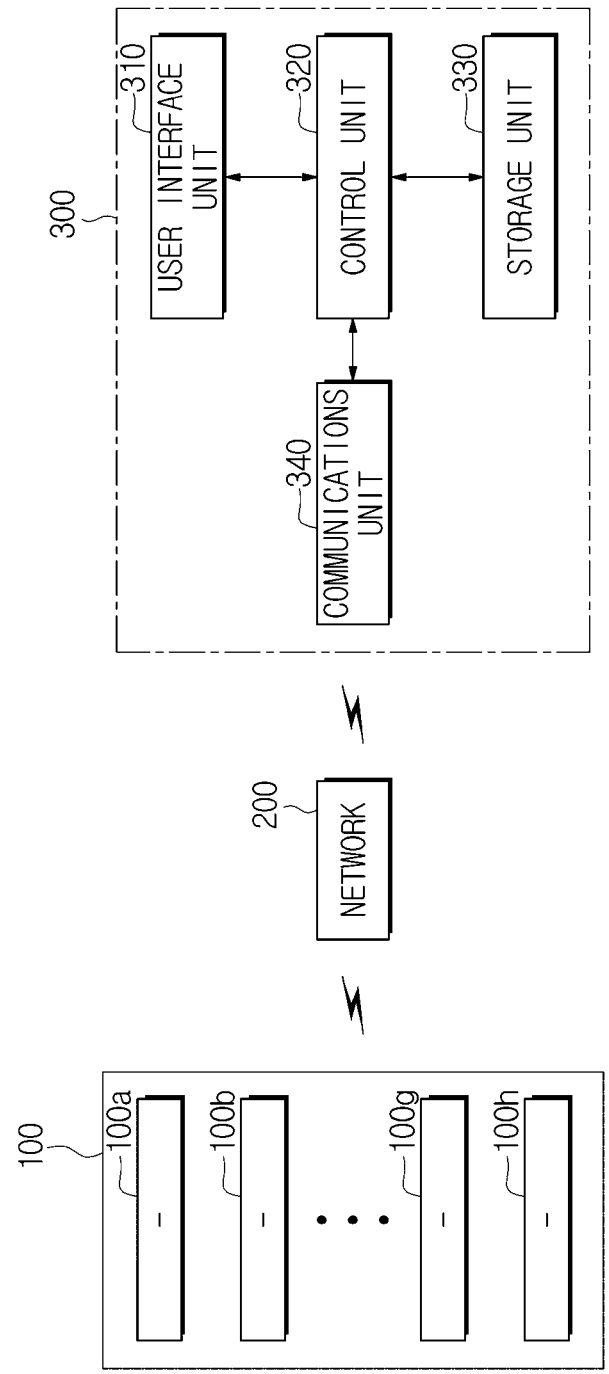
FIG. 2 is a diagram illustrating a configuration of a home network system communicating with the mobile device according to an embodiment.

FIG. 1 is a diagram illustrating a home network system communicating with a mobile device according to an embodiment, and FIG. 2 is a diagram illustrating a configuration of the home network system communicating with a mobile device according to an embodiment. The home network system communicating with a mobile device includes a plurality of electrical devices 100a to 100h and a network 200.

The electrical devices 100a to 100h are devices that perform predetermined unique functions, transmit operation information corresponding to operation status to an external device by performing communication with the external device over a network 200, and perform an operation corresponding to an operation command transmitted from the external device, as additional functions. Here, the external device includes the mobile device 300.

The electrical devices may further include household appliances that cannot be carried, such as a cleaning robot 100a, an illumination device 100b, a washing machine 100c, an air conditioner 100d, a television 100e, a cooking device 100f, a refrigerator 100g, and a dish washer 100h arranged in a home. The electrical devices may further include terminals used in the home, such as a laptop PC, a PC, or a tablet PC. The electrical devices may further include a security device in which a camera, a microphone or the like is provided.

The network 200 is a home network that enables all electrical and electronic devices used in the home to be connected to one system and perform two-way communication.

More specifically, the network 200 enables information to be shared between a plurality of electrical devices and the mobile device 300 over a wired/wireless Internet.

Schemes of transferring information in home can be divided into wired and wireless transfer schemes. Representative wired transfer schemes include a home PNA (Home Phoneline Networking Alliance) using an existing phone line, IEEE1394, and a power line, and the wireless schemes include a home RF (Home Radio Frequency), Bluetooth, IrDA (Infrared Data Association), and wireless LAN (Wifi).

The network 200 can perform a function of a home server that manages and controls the plurality of electrical devices. This network 200 can be implemented on a residential gateway (RW) or a wall pad.

In other words, the network 200 performing the home server function displays the operation status of the plurality of electrical devices in the home, receives the operation command of at least one of the plurality of electrical devices from a user, and transmits an operation command to the at least one electrical device when the operation command of the at least one electrical device is input.

The mobile device 300 performs communication with the at least one of the plurality of electrical devices through wired or wireless communication.

Further, the mobile device 300 can perform communication with the plurality of electrical devices in the home, and can transmit and receive the information of the plurality of electrical devices through communication with the home server.

The mobile device 300 includes an application for monitoring and controlling the plurality of electrical devices in the home by performing the communication with the network in the home. When the application is executed by the user, the mobile device 300 outputs the operation status of the at least one of the plurality of electrical devices in the home, receives the operation command from the user, and controls the operation of the at least one electrical device based on the input operation command.

The mobile device 300 is a terminal device that can move to outside of the home, such as a smartphone, a tablet PC, and a laptop PC, and is a terminal device in which an application provided by a content provider can be installed.

The mobile device 300 includes a user interface unit 310, a control unit 320, a storage unit 330, and a communications unit 340, as illustrated in FIG. 2.

The user interface unit 310 outputs the operation status of the previously registered electrical devices of a plurality of electrical devices arranged in a home, and receives an operation command of the at least one of the previously registered electrical devices.

Such a user interface unit 310 includes a display unit for displaying the operation status of the previously registered electrical device, and an input unit for receiving an operation command from the user.

Here, the input unit is a touch panel that receives an operation command in a touch manner, and the user interface unit 310 can be implemented as a touch screen in which a display panel of the display unit and the touch panel of the input unit are integrally formed.

The user interface unit 310 includes a home screen on which icons of various applications are displayed, and further includes a popup window which informs the user of, for example, update information of at least one of the applications.

The user interface unit 310 displays an icon of the application for monitoring and controlling the electrical devices on the home screen, transmits an application selection signal to the control unit 320 when an icon of the application is selected by the user, and displays a screen corresponding to execution of the application based on a command of the control unit 320. A screen display configuration of such a user interface unit will be described below.

The control unit 320 controls the user interface unit 310 so that the operation status of the previously registered electrical device is output when the application is executed, and controls transmission of the signal corresponding to the operation command of the at least one electrical device based on the operation command is input to the user interface unit 310 through touch.

The control configuration of the control unit 320 will be described below in connection with the screen display configuration of the user interface unit.

The storage unit 330 stores identification information of electrical devices in home registered by the user, and the application for monitoring and controlling the previously registered electrical devices.

The storage unit 330 stores an operation command of the previously registered electrical device for each button of the master key part, and stores an operation command of the electrical device for each shortcut button in the chatting part.

The communications unit 340 communicates with the previously registered electrical device.

Further, the communications unit 340 can perform communication with a home server in the home.

The user interface unit 310 will be described in detail with reference to FIGS. 3A to 20F. Further, a control operation of the control unit 320 will be described together.

Figure 3A:
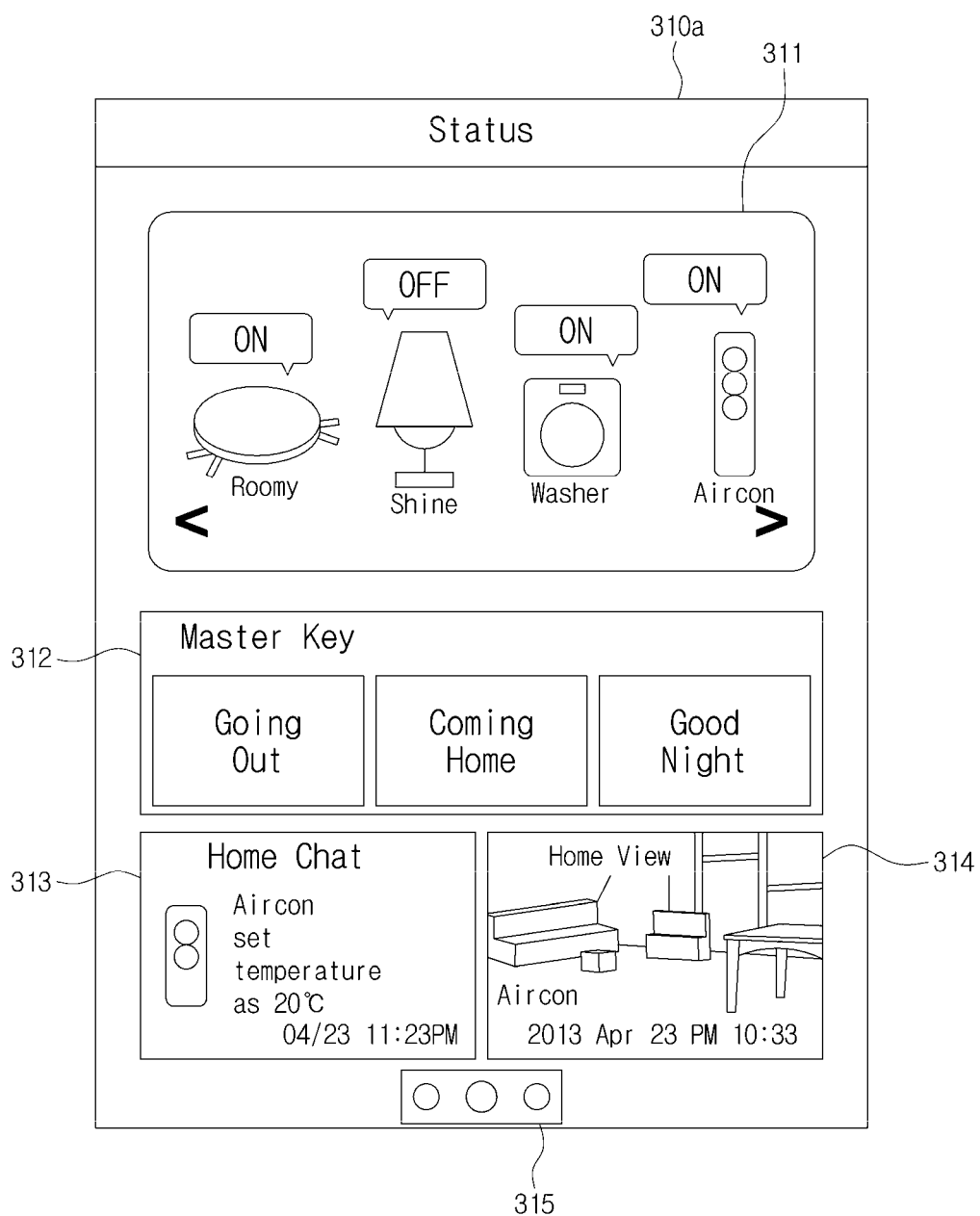
FIGS. 3A to 3C are a diagram illustrating a dashboard screen and a plugin screen of the mobile device according to an embodiment.
Figure 3B:
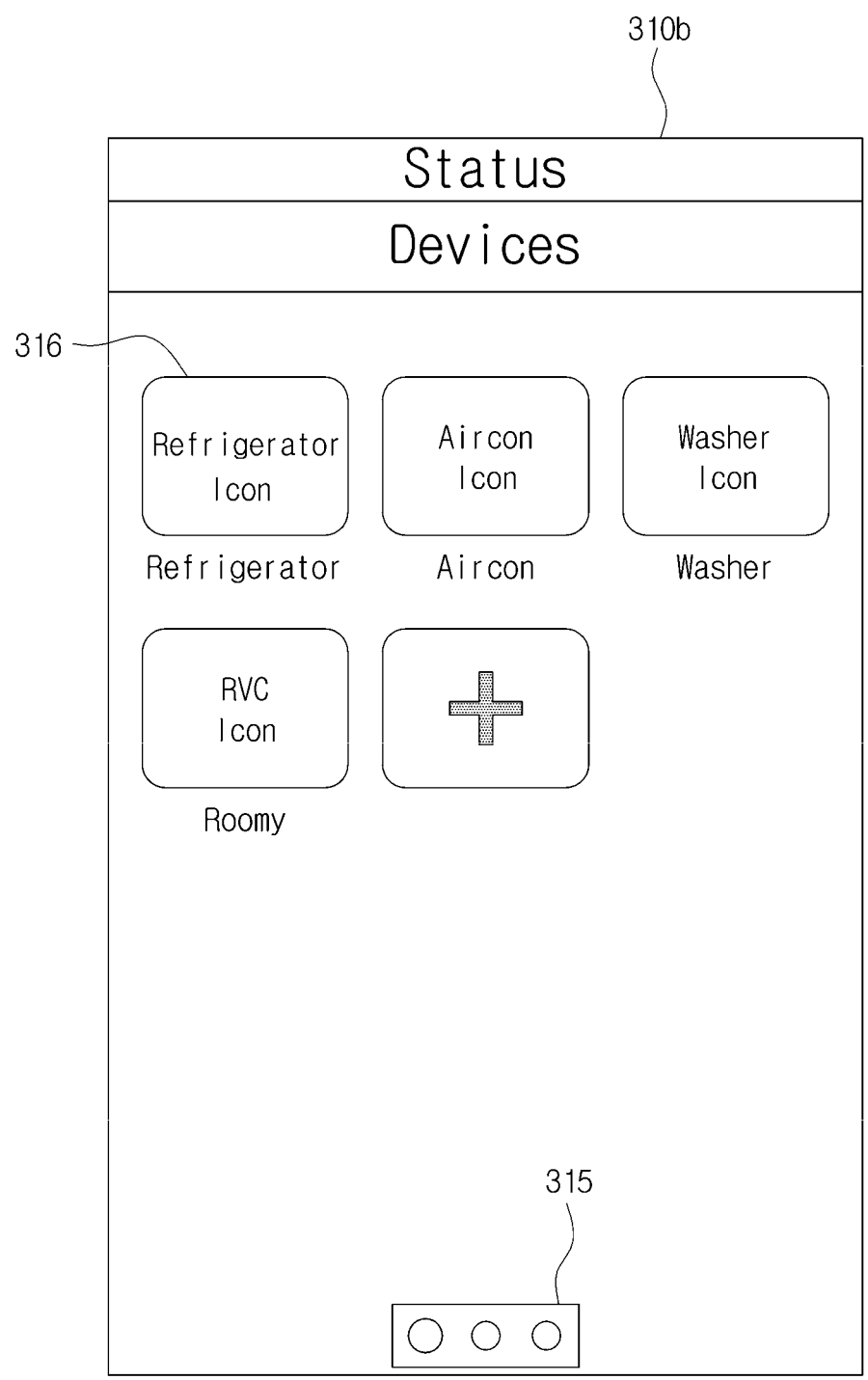

FIG. 3A and FIG. 3B are a diagram illustrating a dashboard screen and a plugin screen of a mobile device according to an embodiment.

As illustrated in FIG. 3A, when an application is executed, the user interface unit 310 displays a dashboard screen as a first screen 310a.

Here, the dashboard screen 310a is a screen in which basic information for the plurality of electrical devices connected through a home network, information for controlling an operation, and the like are displayed.

Figure 3C:
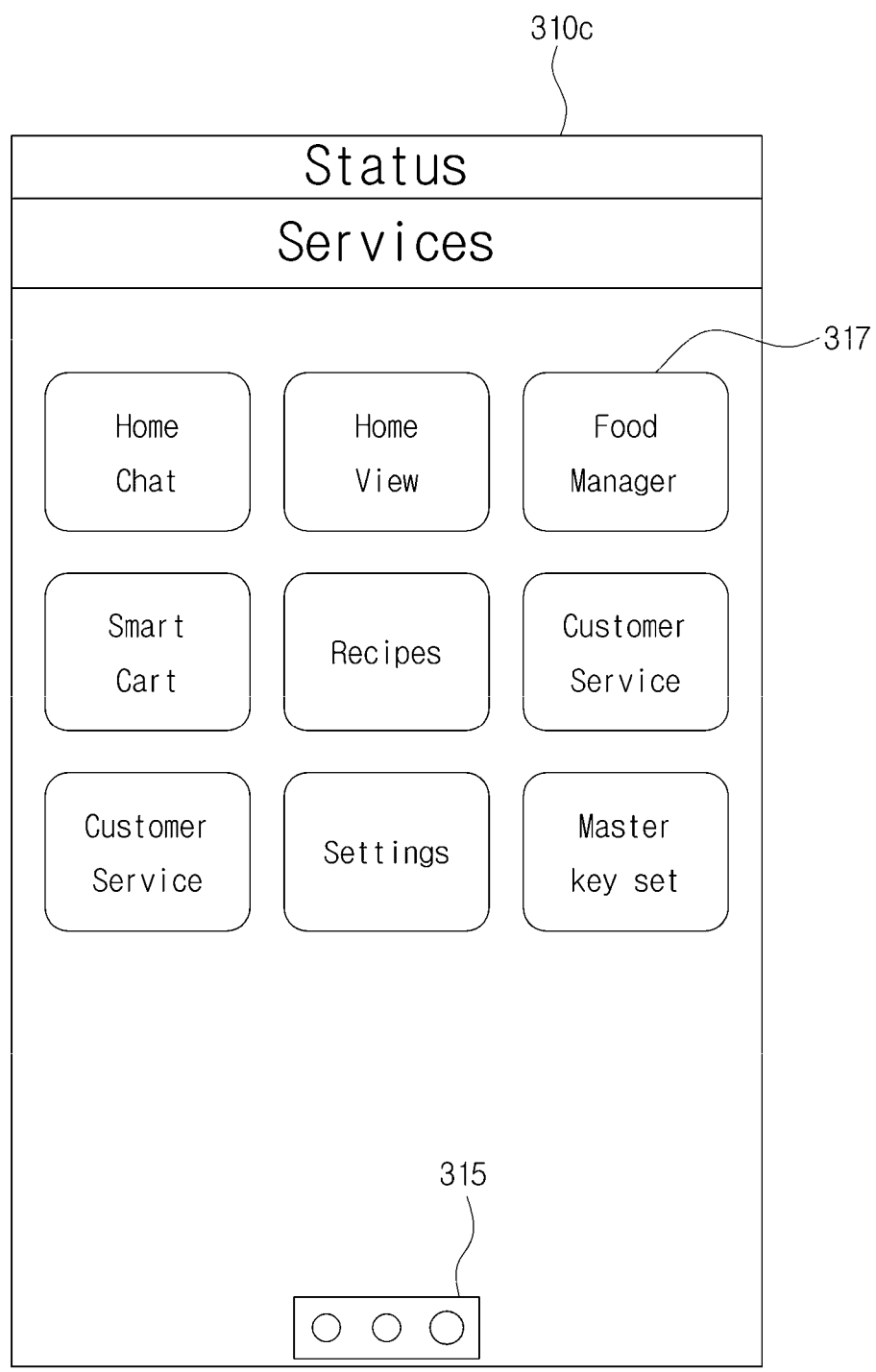

As illustrated in FIG. 3B and FIG. 3C, when a sliding touch is input to the dashboard screen 310a, the user interface unit 310 switches the screen from the dashboard screen 310a to plugin screen 310b or 310c.

In other words, the user interface unit 310 displays the first plugin screen 310b displaying a device registration item for registering an electrical device when a sliding touch sliding from left to right is input to the dashboard screen 310*a*, and displays the second plugin screen 310*c* displaying a service item for the service and setting of the electrical device when a sliding touch sliding from right to left is input to the dashboard screen 310*a*.

Further, when the sliding touch sliding from right to left is input in a state in which the first plugin screen is displayed, the user interface unit displays the dashboard screen 310*a*.

In this embodiment, the number of plugin screens is 2, but may be 1, or 3 or more.

The control unit 320 confirms the currently displayed screen, controls screen switching so that the screen arranged on the right side of the current screen is displayed when the sliding touch sliding from right to left is input, and controls screen switching so that the screen arranged on the left side of the current screen is displayed when the sliding touch sliding from left to right is input.

For example, when the sliding touch is input in a state in which the dashboard screen 310*a* is displayed, the control unit 320 confirms a direction of the input sliding touch. The control unit 320 controls switching to the first plugin screen 310*b* when the confirmed sliding touch direction is from the left direction to the right direction, and controls switching to the second plugin screen 310*c* when the confirmed sliding touch direction is from the right direction to the left direction.

As illustrated in FIG. 3A, the dashboard screen 310*a* includes an overview part 311 that displays list information and operation information of the previously registered electrical devices, and widget parts 312, 313, and 314 that display execution command information and monitoring information for rapidly and easily controlling the operation of the previously registered electrical device.

Further, the dashboard screen 310*a* includes a screen switching unit 315 for direct switching from the dashboard screen to the plugin screen, direct switching from the plugin screen to the dashboard screen, and direct switching from one plugin screen to the other plugin screen.

Here, direct switching includes switching of the screen by single touch, not the sliding touch.

In other words, the screen switching unit 315 includes a plurality of page buttons corresponding to a plurality of screens, an arrangement of the plurality of page buttons corresponds to an arrangement of the plurality of screens, and the page button corresponding to a position of the currently displayed screen is displayed differently from the other page buttons. This enables the user to recognize the position of the currently displayed screen.

Further, arrangement information of the plurality of screens is set in advance, and an arrangement between the screens can be changed by the user.

For example, the user interface unit in this embodiment includes a total of three screens such as a dashboard screen, a first plugin screen, and a second plugin screen. In an arrangement of a total of three screens, the first plugin screen is arranged on the left side of the dashboard screen, and the second plugin screen is arranged on the right side.

Accordingly, a total of three page buttons of the screen switching unit 315 are included, the page button arranged on the left side among the three page buttons is in conjunction with the first plugin screen 310*b*, the page button arranged at a center is in conjunction with the dashboard screen, and the page button arranged on the right side is in conjunction with the second plugin screen.

As illustrated in FIG. 3B, when the page button arranged on the left side is touched, the first plugin screen 310*b* is displayed in the user interface unit. In this case, the page button arranged on the left side has a different color from the other buttons.

When the page button arranged at the center is touched, the dashboard screen 310*a* is displayed in the user interface unit. In this case, the page button arranged at the center has a different color from the other buttons.

As illustrated in FIG. 3C, when the page button arranged on the right side is touched, the second plugin screen 310*c* is displayed in the user interface unit. In this case, the page button arranged on the right side has a different color from the other buttons.

In other words, the control unit 320 confirms the touched page button among the plurality of page buttons of the screen switching unit 315, confirms the screen corresponding to the confirmed page button, and then performs control so that the confirmed screen is displayed in the user interface unit 310.

The first plugin screen 310*b* and the second plugin screen 310*c* are screens for changing setting information of the main function, setting an additional function, or receiving the service.

More specifically, the first plugin screen 310*b* includes a device confirmation button having registration information for the previously registered electrical device, and a registration setting button 316 for registering a new device.

The second plugin screen 310*c* includes a setting changing button for changing settings of the master key part, the chatting part, and the home view part of the widget part, a service button for receiving the service for the previously registered electrical device, and a management button 317 for each previously registered electrical device.

FIGS. 4A to 6B are diagrams illustrating execution of the overview part within the dashboard screen of a mobile device according to an embodiment. The overview part 311 will be described in detail with reference to FIGS. 4A to 6B.

The overview part 311 displays a list of previously registered electrical devices, and displays an icon A1 of the previously registered electrical device, as illustrated in FIG. 4A to FIG. 4D.

Further, the overview part 311 further includes a movement button A2 for moving a screen in which the icons of the previously registered electrical device are arranged.

That is, the movement button A2 is a button for moving the currently displayed icons in order to display the icons of other electrical devices that are not displayed on one screen in the overview and concealed, to change a display position of the icon.

In this case, the movement button A2 is concealed when the number of icons of the previously registered electrical device is smaller than a certain number of icons that can be displayed on one screen, and is displayed when the number of icons of the previously registered electrical device is smaller than the certain number of icons that can be displayed on the screen.

The movement button A2 includes a first direction button (<) for instructing movement from a screen currently displayed on the overview part 311 to a screen extending in a first direction, and a second direction button (>) for instructing movement from the current screen to a screen extending in a second direction. Here, the second direction is a direction opposite to the first direction.

The overview part 311 shifts the icons of a certain number of electrical devices within the current screen by one column in the second direction to rearrange the icons when the first direction button (<) is selected, and shifts the icons of the certain number of electrical devices within the current screen by one column in the first direction to rearrange the icons when the second direction button (>) is selected.

In this case, when the first direction button (<) is selected, the overview part 311 rearranges the icon of a new electrical device in the column of the left outermost column of the screen, and causes the icon of the electrical device arranged in the right outermost column to disappear. When the second direction button (>) is selected, the overview part 311 arranges an icon of a new electrical device in a right outermost column and causes the icon of the electrical device arranged in the left outermost column to disappear.

Further, the overview part 311 can display a left screen of the current screen to display the icon of the electrical device arranged on the left screen when the first direction button (<) is selected, and displays a right screen of the current screen to display the icon of the electrical device arranged in the right screen when the second direction button (>) is selected.

Figure 4A:
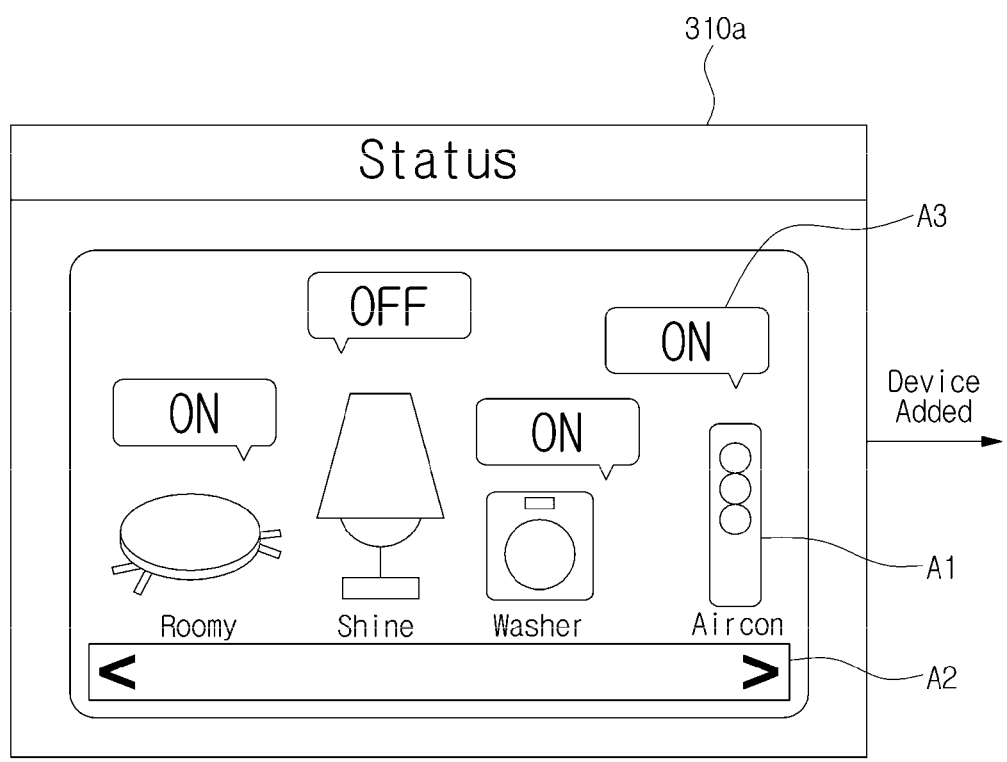
FIGS. 4A to 6B are diagrams illustrating execution of an overview part within the dashboard screen of the mobile device according to an embodiment.
Figure 4B:
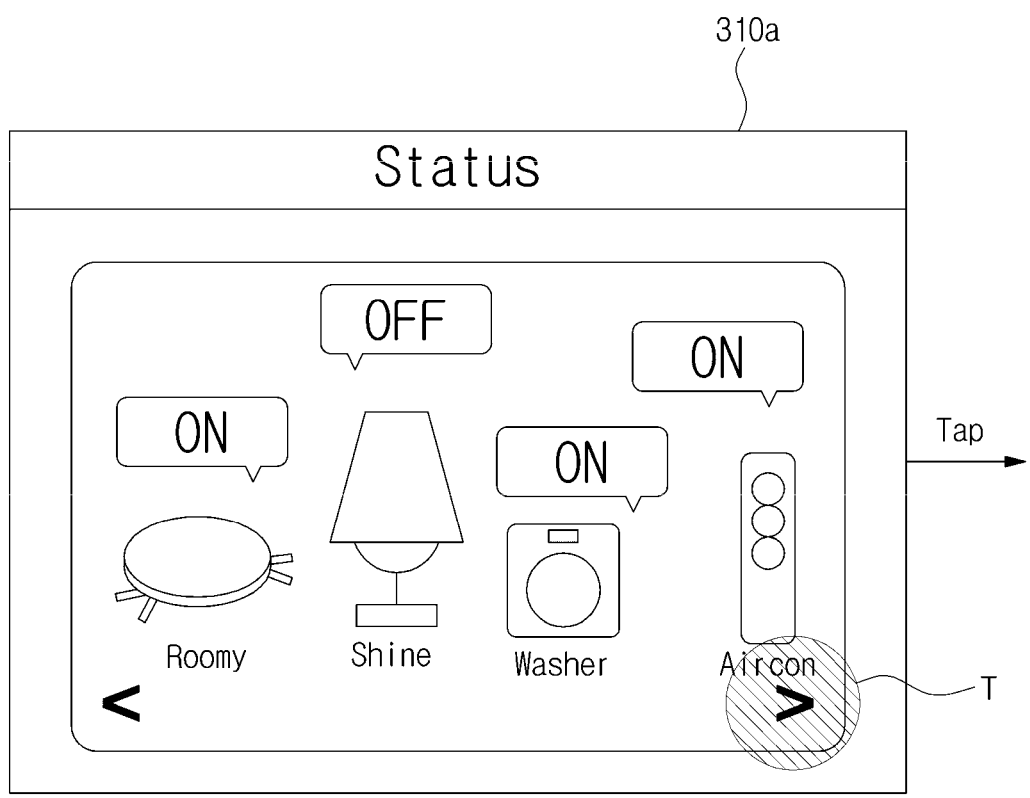
Figure 4C:
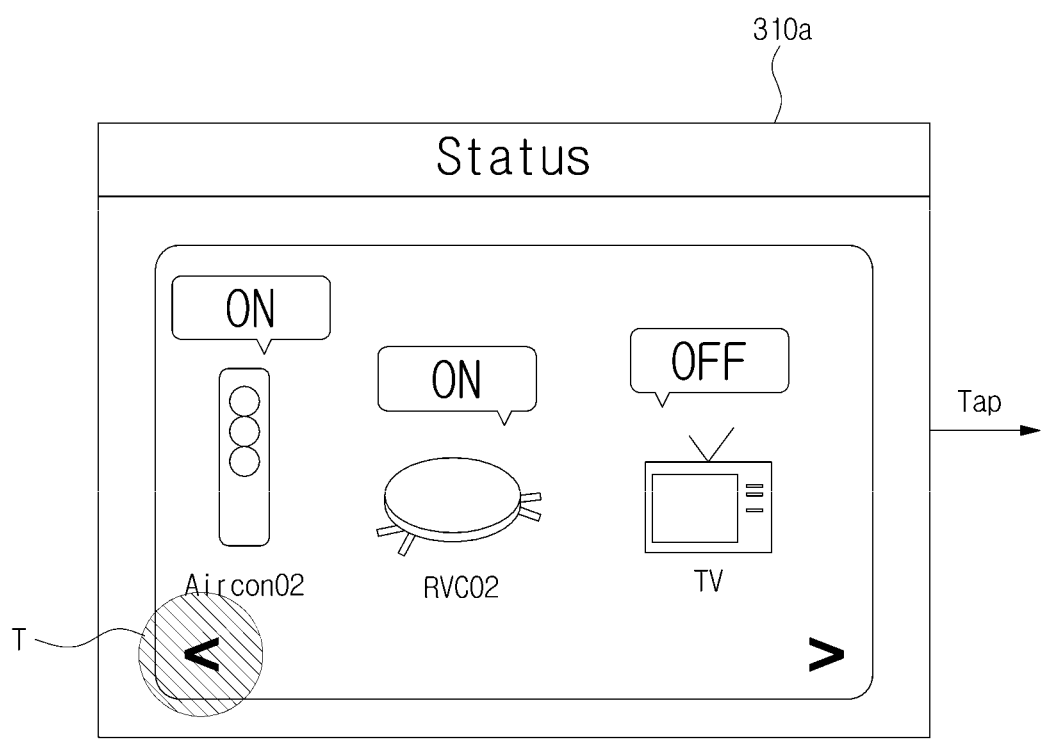

As illustrated in FIG. 4B and FIG. 4C, when the second direction button (>) is touched in a state in which the icons of the vacuum cleaner, the illumination device, the washing machine, and the air conditioner are arranged on the current screen of the overview part 311, the icons of the air conditioner 2, the cleaning robot 2 and the television arranged on the right screen of the current screen are displayed.

Figure 4D:
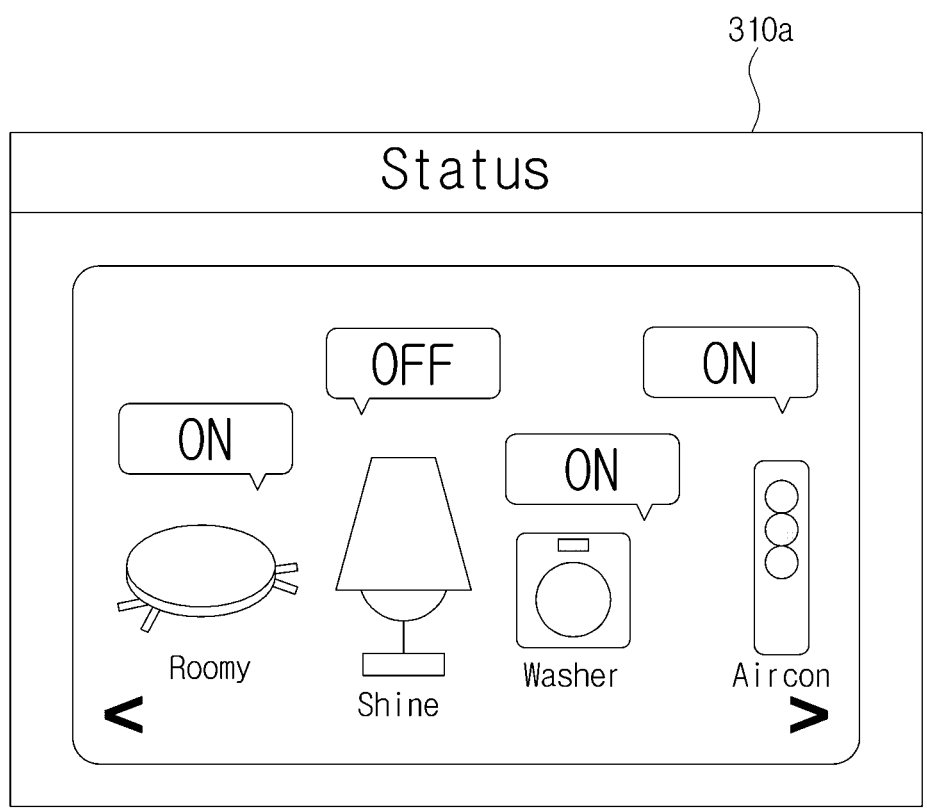
Figure 5A:
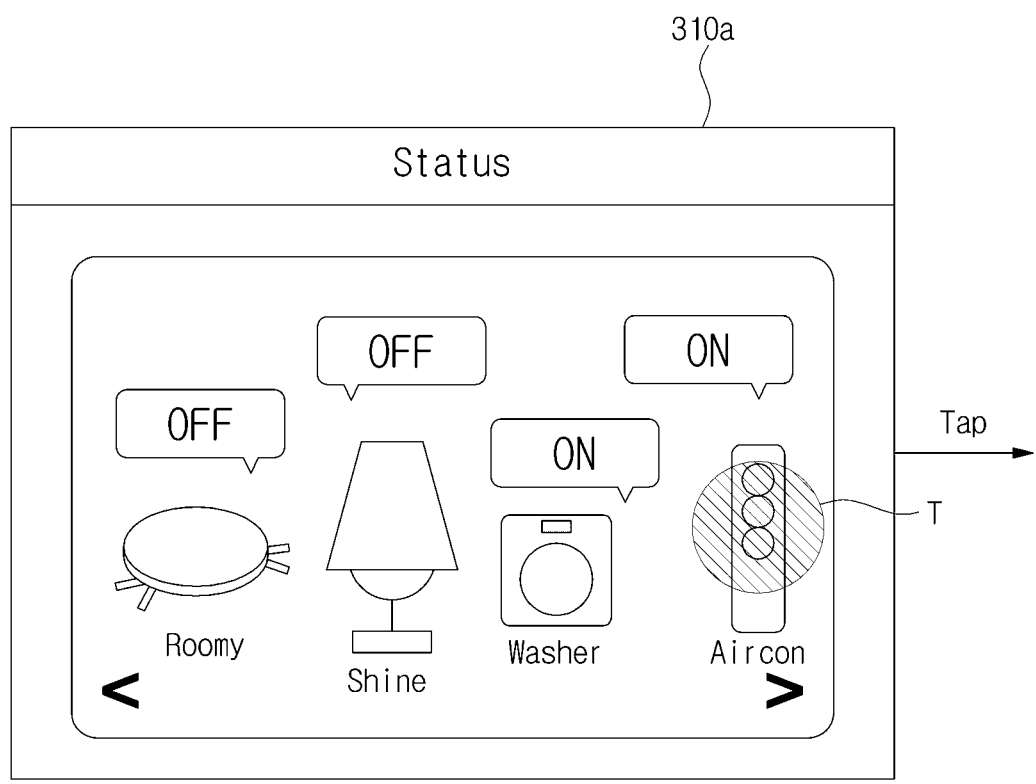
Figure 5B:
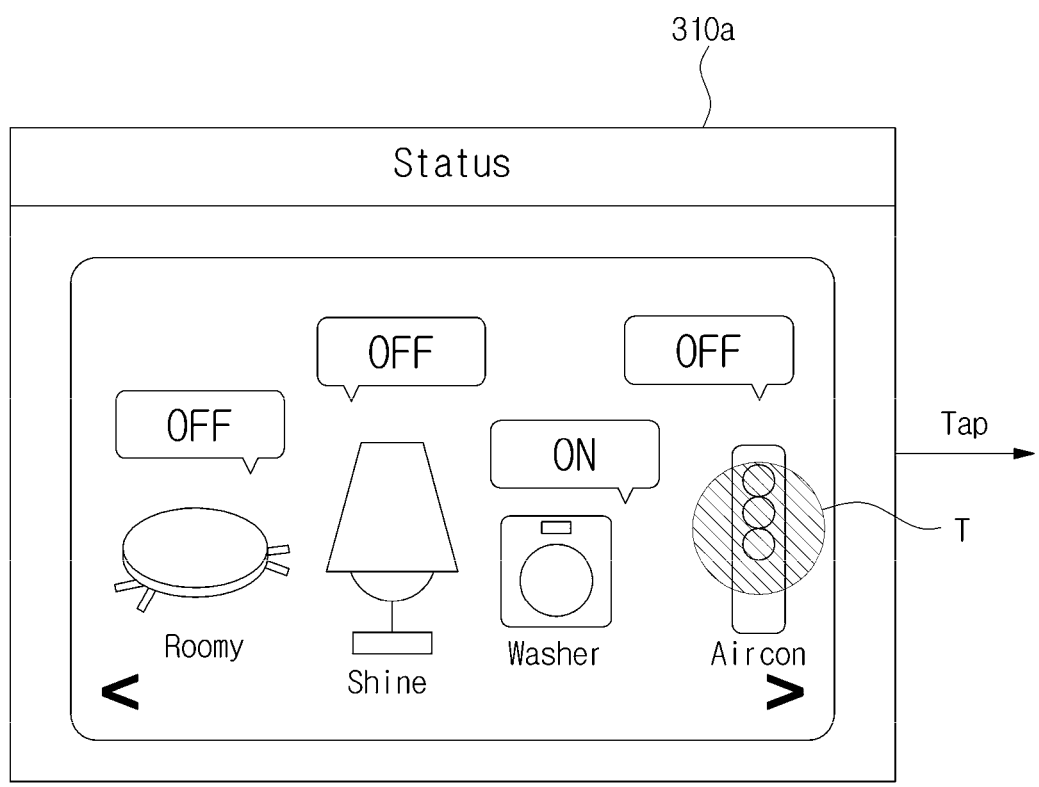
Figure 5C:
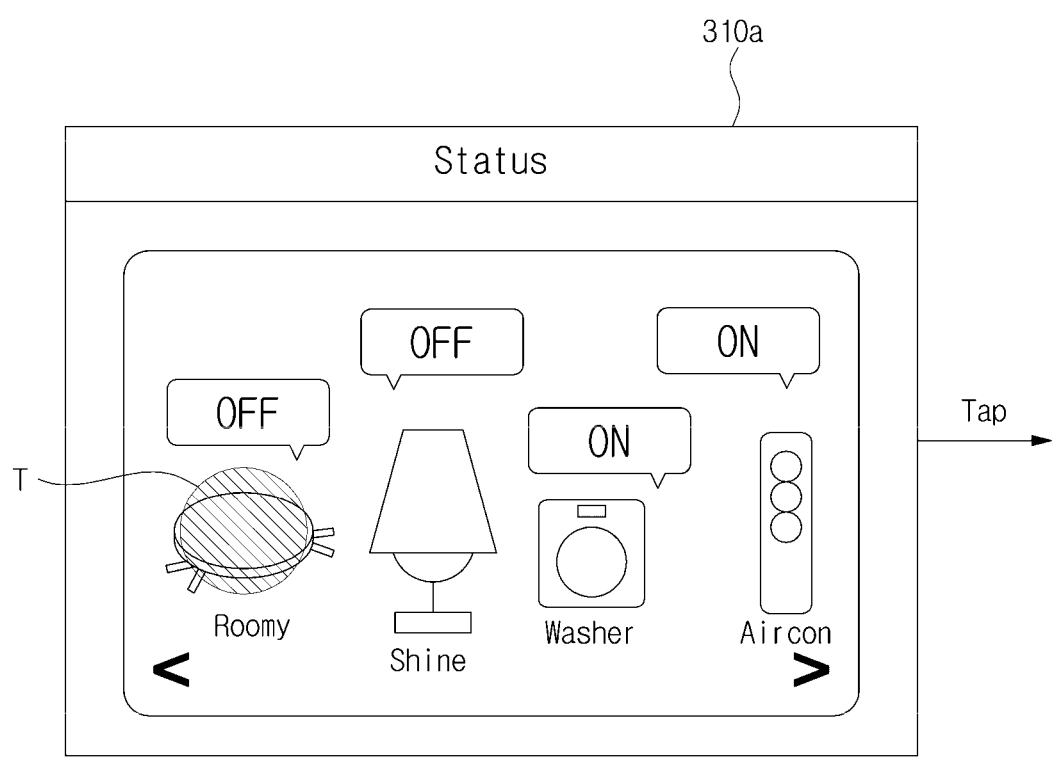
Figure 5D:
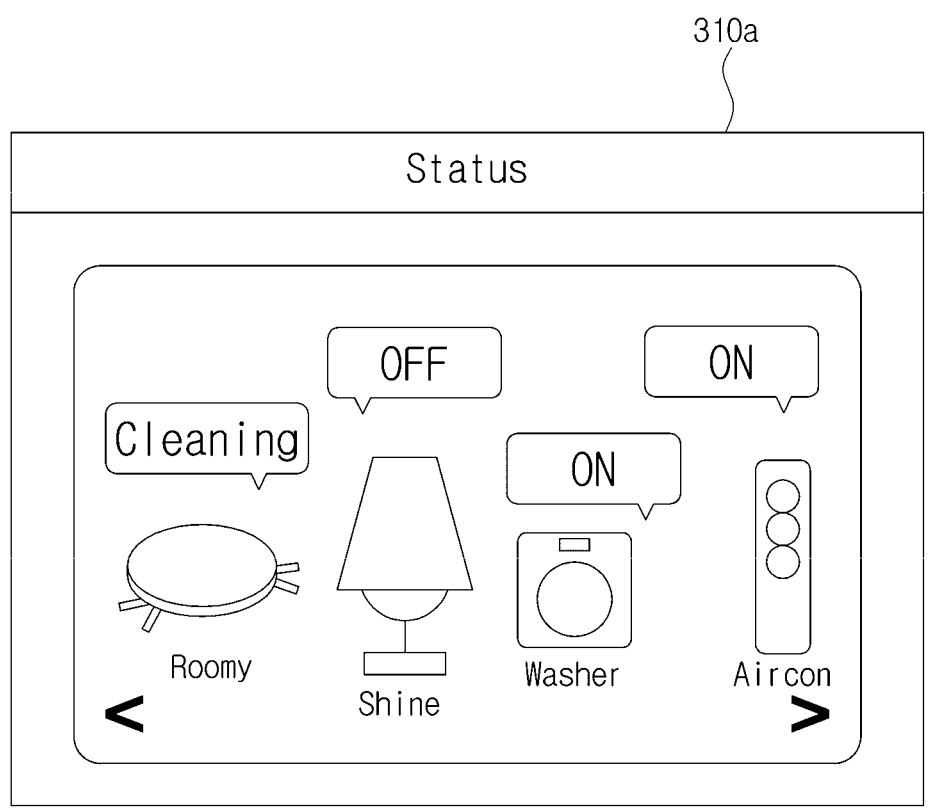

Also, as illustrated in FIG. 4C and FIG. 4D, when the first direction button (<) is touched in a state in which the icons of the air conditioner 2, the cleaning robot 2, and the television are displayed, the screen is moved to the screen arranged on the left side of the currently displayed screen, and the icons of the vacuum cleaner, the illumination device, the washing machine, and the air conditioner arranged in this screen are displayed again.

The control unit 320 controls the user interface unit 310 so that the screen of the widget parts 312, 313, and 314 remains in a current state even when the movement button of the overview part 311 is touched.

The overview part 311 further includes a speech bubble A3 that guides the ON/OFF state and a progress state that are current operation status of the previously registered electrical device. This speech bubble A3 is arranged around the icon A1 to be easily recognized by a user.

The speech bubble A3 changes a guide sentence indicating the operation status of the electrical device based on the command of the control unit 320.

In other words, when any one of the icons displayed in the overview part 311 is touched, the control unit 320 changes the operation status of the electrical device corresponding to the touched icon, and controls the user interface unit 310 so that the changed operation status is displayed in the speech bubble.

For example, when the icon of the air conditioner is touched in a state in which the air conditioner is ON, the control unit 320 controls the air conditioner to be OFF, and controls the user interface unit 310 so that the OFF state of the air conditioner is displayed in the speech bubble. When the icon of the air conditioner is touched in a state in which the air conditioner is OFF, the control unit 320 controls the air conditioner to be ON, and controls the user interface unit 310 so that the ON state of the air conditioner is displayed in the speech bubble.

As illustrated in FIGS. 5A to 5D, when the operating the air conditioner is touched in a state in which the icons of the cleaning robot, the illumination device, the washing machine, and the air conditioner are displayed, the overview part 311 guides that the air conditioner is "OFF" through the speech bubble. When the cleaning robot in an OFF state is touched, the overview part 311 guides that the cleaning robot is "cleaning" through the speech bubble.

Further, when the icon of the washing machine is touched in a state in which the washing machine is ON, the control unit 320 confirms an operation progress state of the washing machine, and controls the user interface unit 310 so that the operation progress state of the washing machine is displayed in the speech bubble.

Figure 6A:
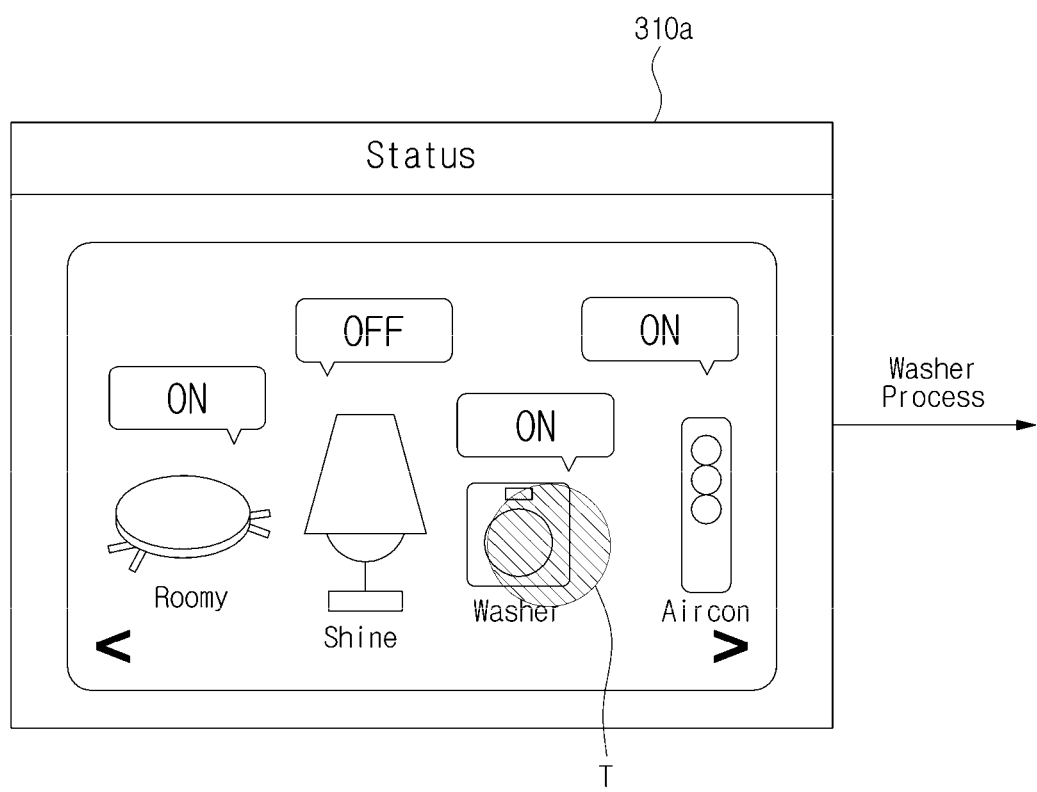
Figure 6B:
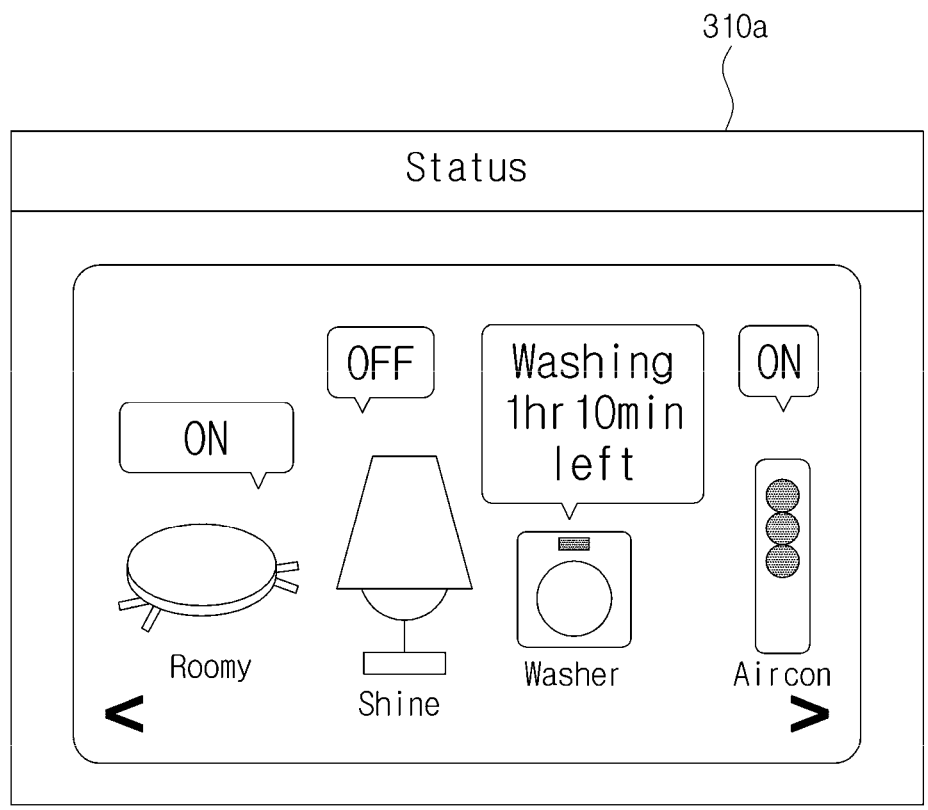

As illustrated in FIG. 6A and FIG. 6B, when the operating washing machine is touched in a state in which the icons of the cleaning robot, the illumination device, the washing machine, and the air conditioner are displayed, the overview part 311 guides that the washing machine "operates for one hour ten minutes" through the speech bubble.

Further, the control unit 320 can confirm at least one of update, error and reservation states of the previously registered electrical device, and control the user interface unit so that the confirmed state information is displayed in the speech bubble.

In other words, the speech bubble A3 guides any one of update information, error information, and reservation information of the electrical device.

Further, when the operation status of the at least one electrical device is changed in response to a touch input of the master key part 312 and a chat command input of the chatting part 313 in the widget part, the control unit 320 controls the user interface unit 310 so that the changed operation status is displayed in the speech bubble.

The widget part of the user interface unit 310 includes a master key part 312 for operating the previously registered electrical device based on a previously set operation command, a chatting part 313 for performing chat with at least one of the previously registered electrical devices, and a home view part 314 for outputting an image of the inside of the home. This will be described with reference to FIGS. 7 and 8.

Figure 7:
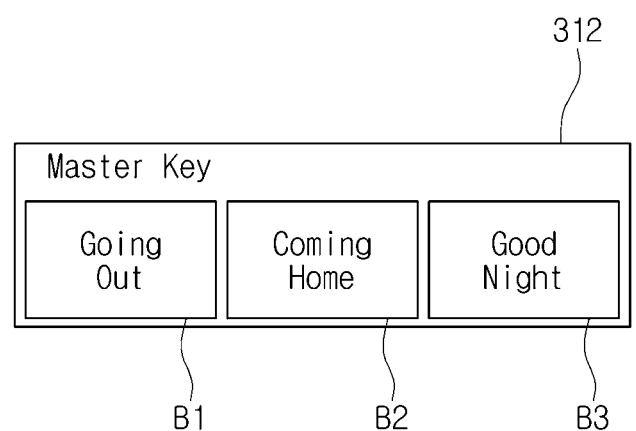
FIG. 7 is a diagram illustrating a master key part within the dashboard screen of the mobile device according to an embodiment.

FIG. 7 is a diagram illustrating the master key part within the dashboard screen of the mobile device according to an embodiment.

The master key part 312 includes a button for collectively controlling operations of the plurality of electrical devices. This button includes a pre-operation command for each electrical device.

The button of the master key part 312 can be set based on a schedule of the user.

As illustrated in FIG. 7, the master key part 312 includes a Going Out button B1, a Coming Home button B2, and a Good Night button B3.

When the master key part 312 of the user interface unit is touched, the control unit 320 confirms the touched button, and transmits the previously set operation command for each electrical device corresponding to the confirmed button to the previously registered electrical device, so that the previously registered electrical device operates based on the previously set operation command. In this case, the user interface unit 310 guides the operation status of the previously registered electrical device through the speech bubble.

A button for collective control of the master key part 312 can be added. This can be added using a "Master key setting button" of the second plugin screen.

Further, a "Master key setting button" may be arranged in the master key part.

Further, the operation command of the electrical device of each button of the master key part 312 can be changed. Further, this can be changed using the "Master key setting button" of the second plugin screen.

Further, the button set in the master key part 312 can be deleted. Further, this can be deleted using the "Master key setting button" of the second plugin screen.

FIGS. 8A to 8D are a diagram illustrating execution of the master key part in the dashboard screen of the mobile device according to an embodiment.

Figure 8A:
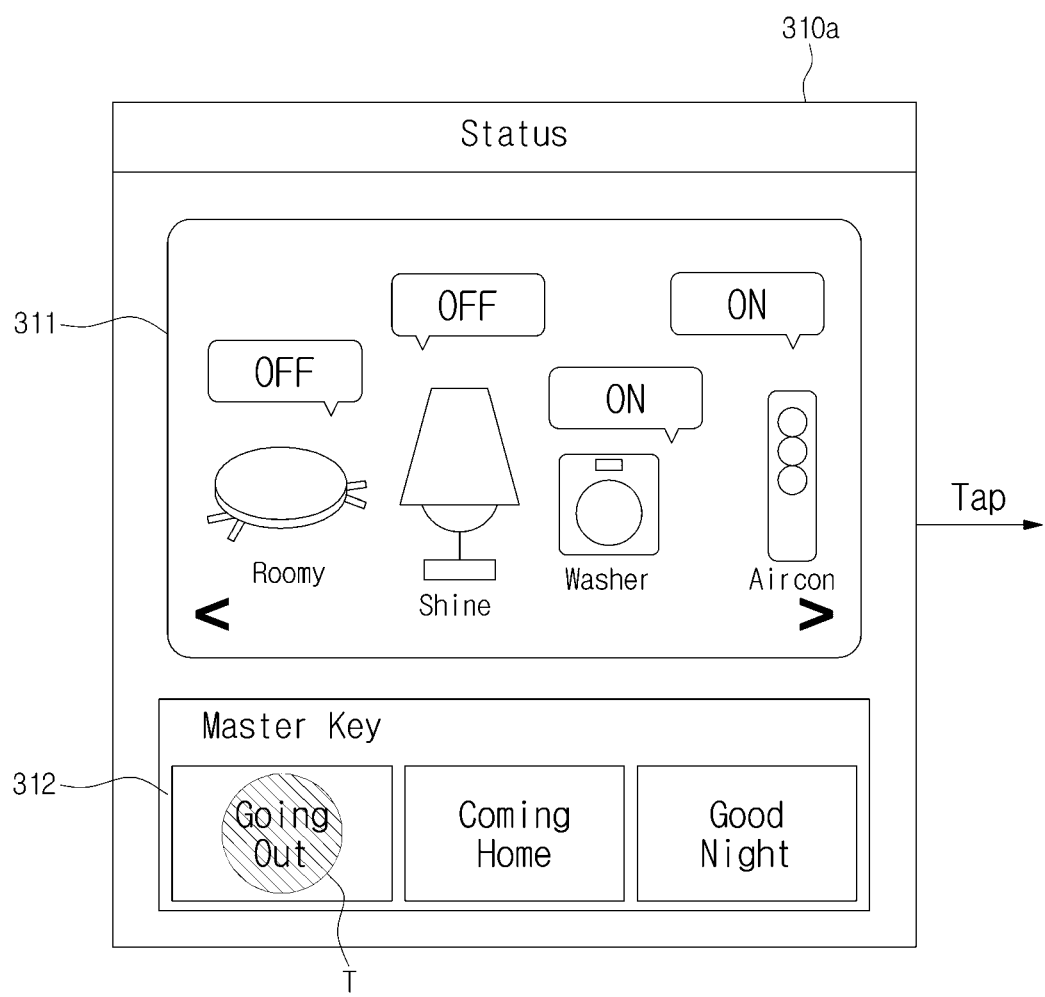
FIGS. 8A to 8D are a diagram illustrating execution of the master key part in the dashboard screen of the mobile device according to an embodiment.

As illustrated in FIG. 8A, the overview part 311 displays the icons of the cleaning robot, the illumination device, the washing machine, and the air conditioner, and displays a speech bubble guiding the operation status of each electrical device around each icon.

The operation command for the respective electrical devices corresponding to the Going Out button is assumed to be the illumination device OFF and the air conditioner OFF, and the operation command for the respective electrical devices corresponding to the Coming Home button is assumed to be the illumination device ON and the air conditioner ON.

As illustrated in FIG. 8A, when the Going Out button B1 of the master key part 312 is touched (T) in a state in which the operation status of the cleaning robot is OFF, the operation status of the illumination device is OFF, the operation status of the washing machine is ON, and the operation status of the air conditioner is ON, the user interface unit 310 causes the operation status of the cleaning robot and the illumination device to remain OFF, causes the operation status of the washing machine to remain ON to prevent the washing machine from stopping during operation, causes the operation status of the air conditioner to be OFF, and guides the operation status of each electrical device through the speech bubble.

Figure 8B:
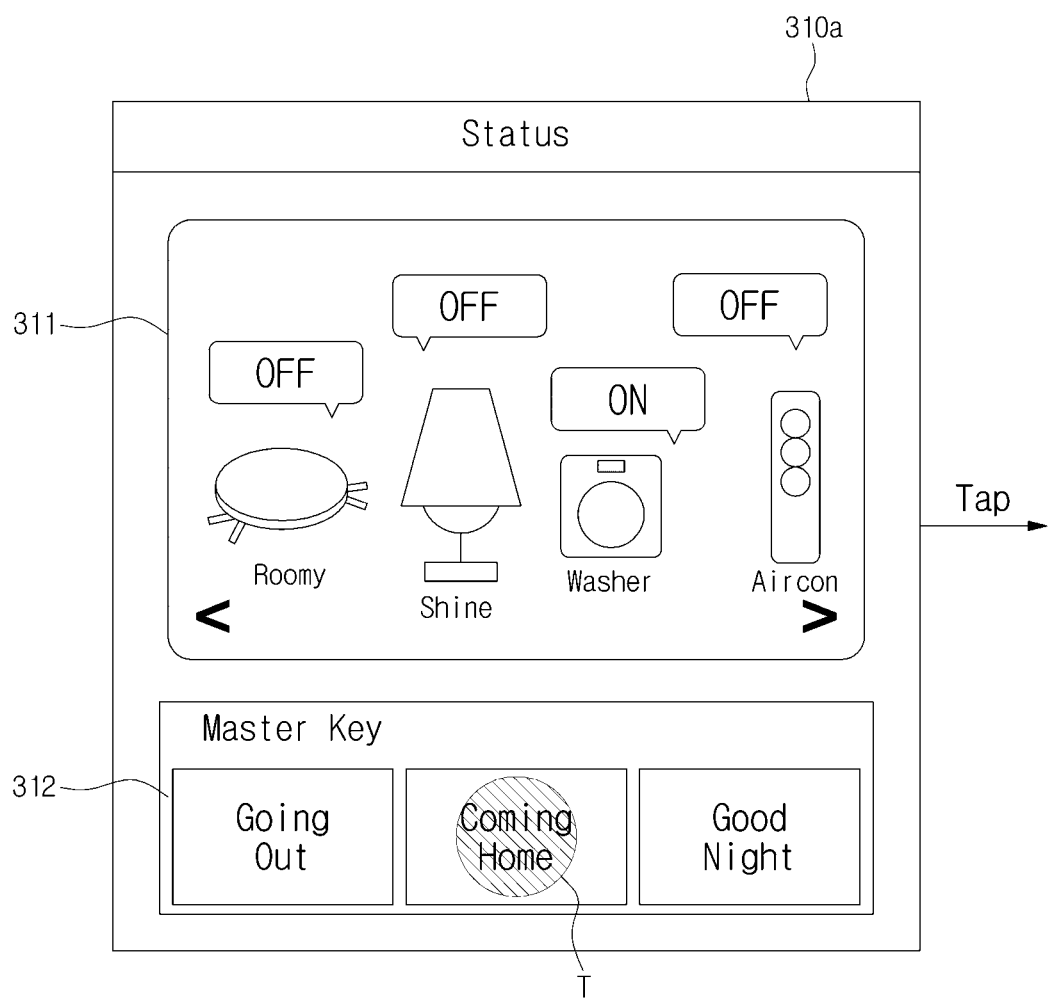

As illustrated in FIG. 8B, when the Coming Home button B2 of the master key part 312 is touched (T) in a state in which the operation status of the cleaning robot is OFF, the operation status of the illumination device is OFF, the operation status of the washing machine is ON, and the operation status of the air conditioner is ON, the user interface unit 310 causes the operation status of the cleaning robot and the washing machine to remain OFF, causes the operation status of the illumination device and the air conditioner to be ON, and guides the operation status of each electrical device through the speech bubble.

Figure 8C:
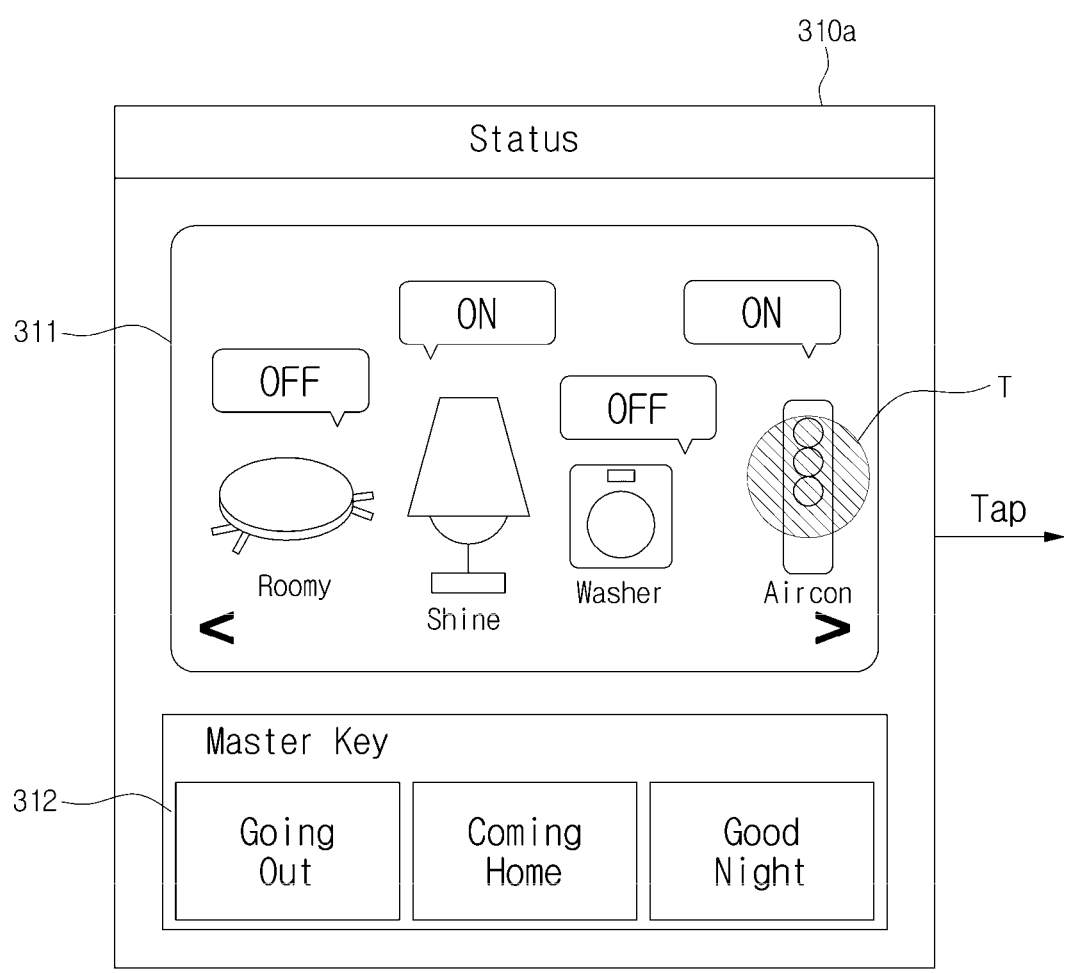
Figure 8D:
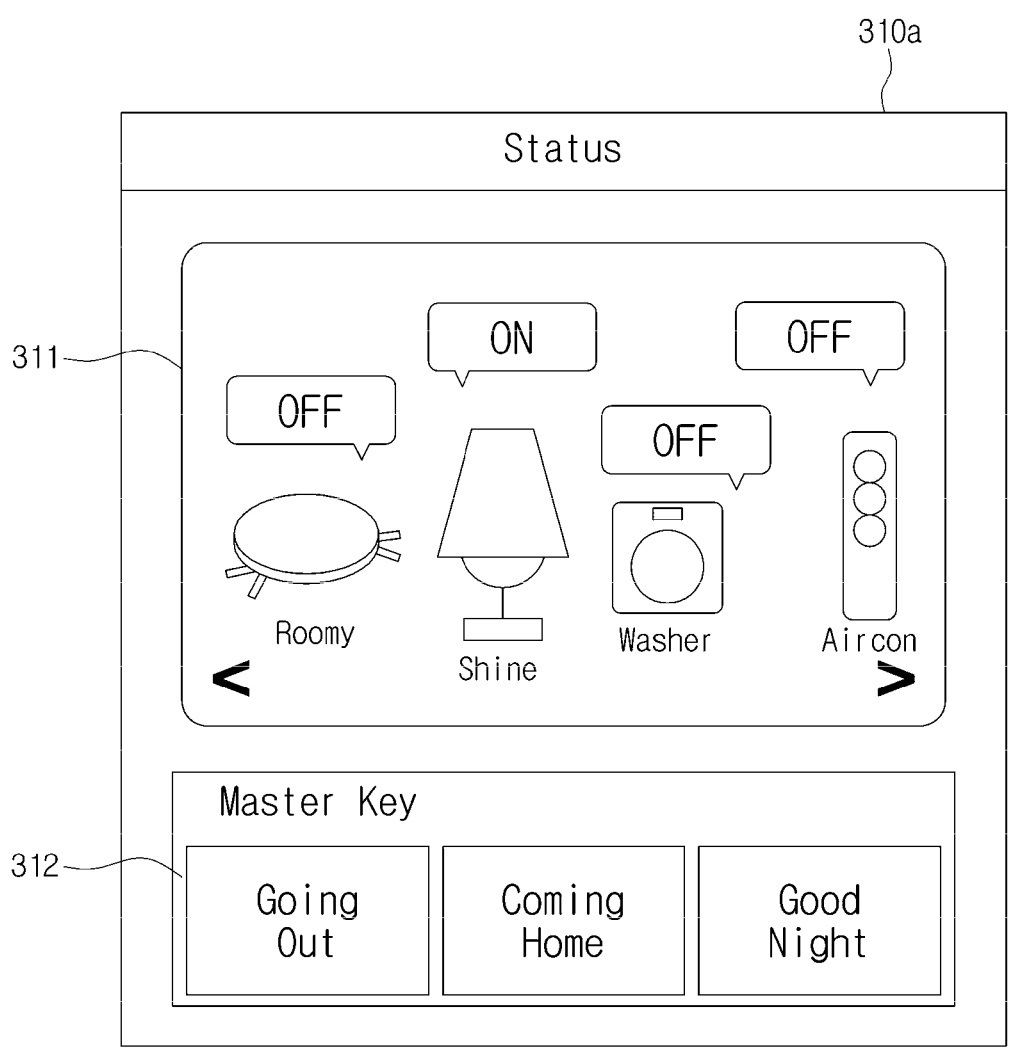

In this state, as illustrated in FIGS. 8C and 8D, when the user touches (T) the icon of the air conditioner, the user interface unit 310 causes the air conditioner to be OFF and guides this through the speech bubble.

Figure 9:
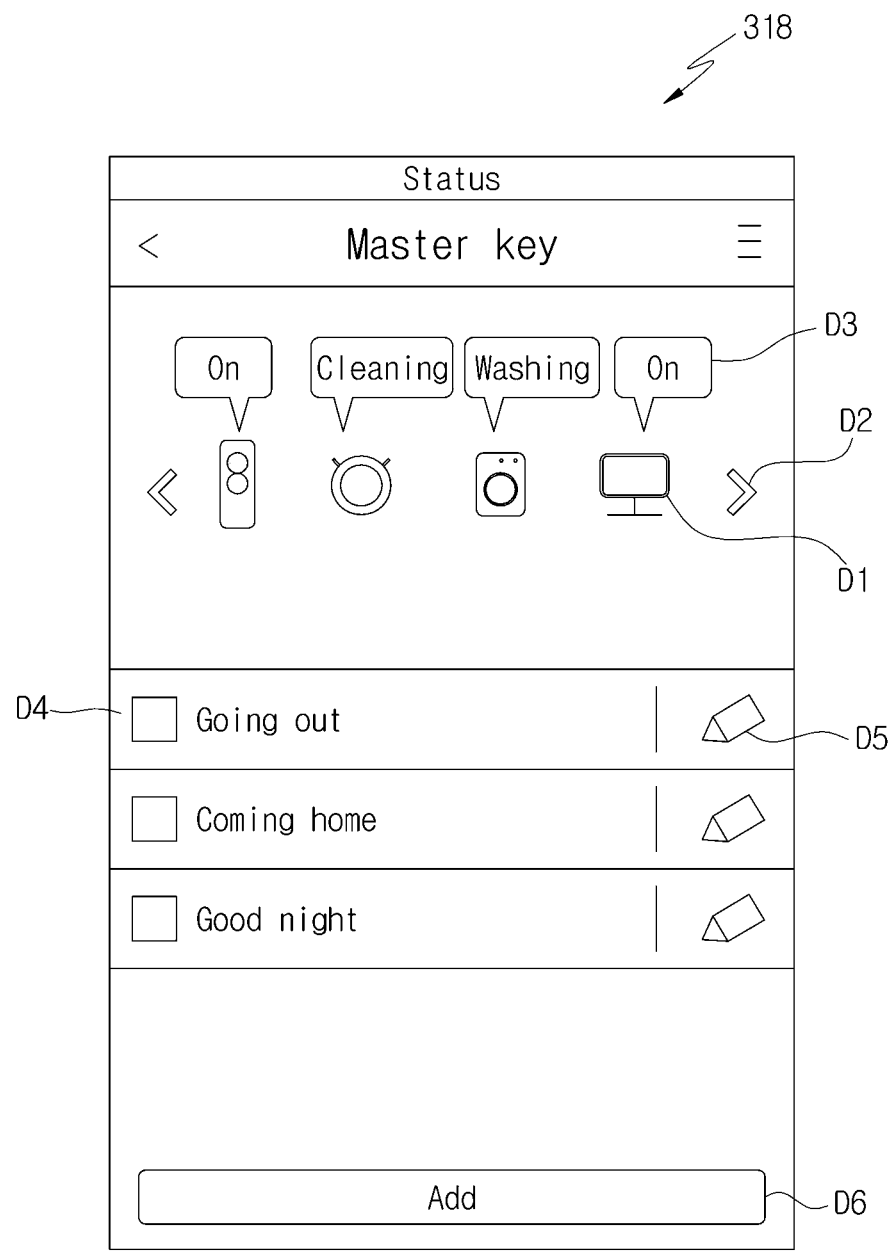
FIG. 9 is a diagram illustrating a master key part setting window 318 in a second plugin screen of the mobile device according to an embodiment.

FIG. 9 is a diagram illustrating a master key part setting window 318 in the second plugin screen of the mobile device according to an embodiment, and FIGS. 10 and 11 are diagrams illustrating a setting of the master key part in the second plugin screen of the mobile device according to the embodiment.

The user interface unit 310 switches the dashboard screen to the master key part setting window 318 when the master key part setting button in the second plugin screen is touched.

As illustrated in FIG. 9, the master key part setting window 318 includes icons D1 of the previously registered electrical devices, a movement button D2 for moving a list of the icons of the electrical devices, a speech bubble D3 for guiding a previously set operation command for each electrical device, a plurality of previously registered buttons D4, editing buttons D5 for the plurality of buttons, and an addition button D6 for adding a button for collective control.

Figure 10A:
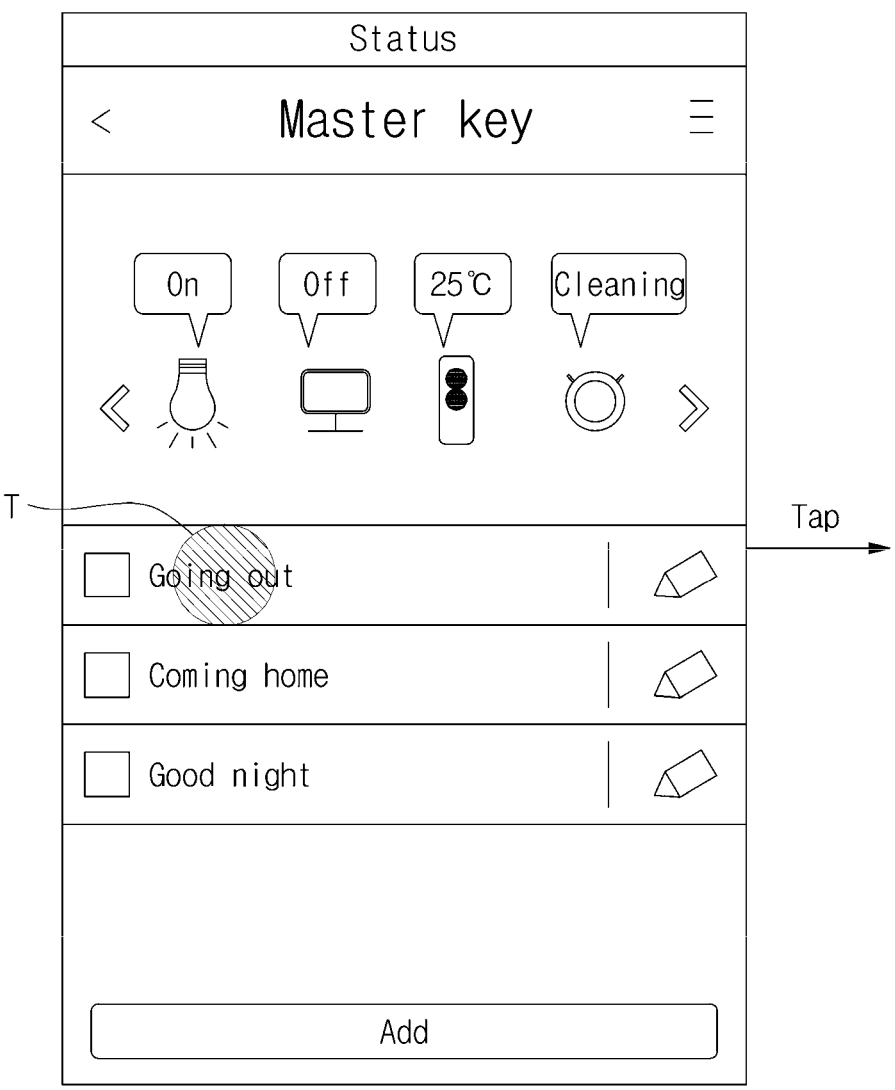
FIGS. 10A to 11D are diagrams illustrating a setting of a master key part in the second plugin screen of the mobile device according to the embodiment.
Figure 10B:
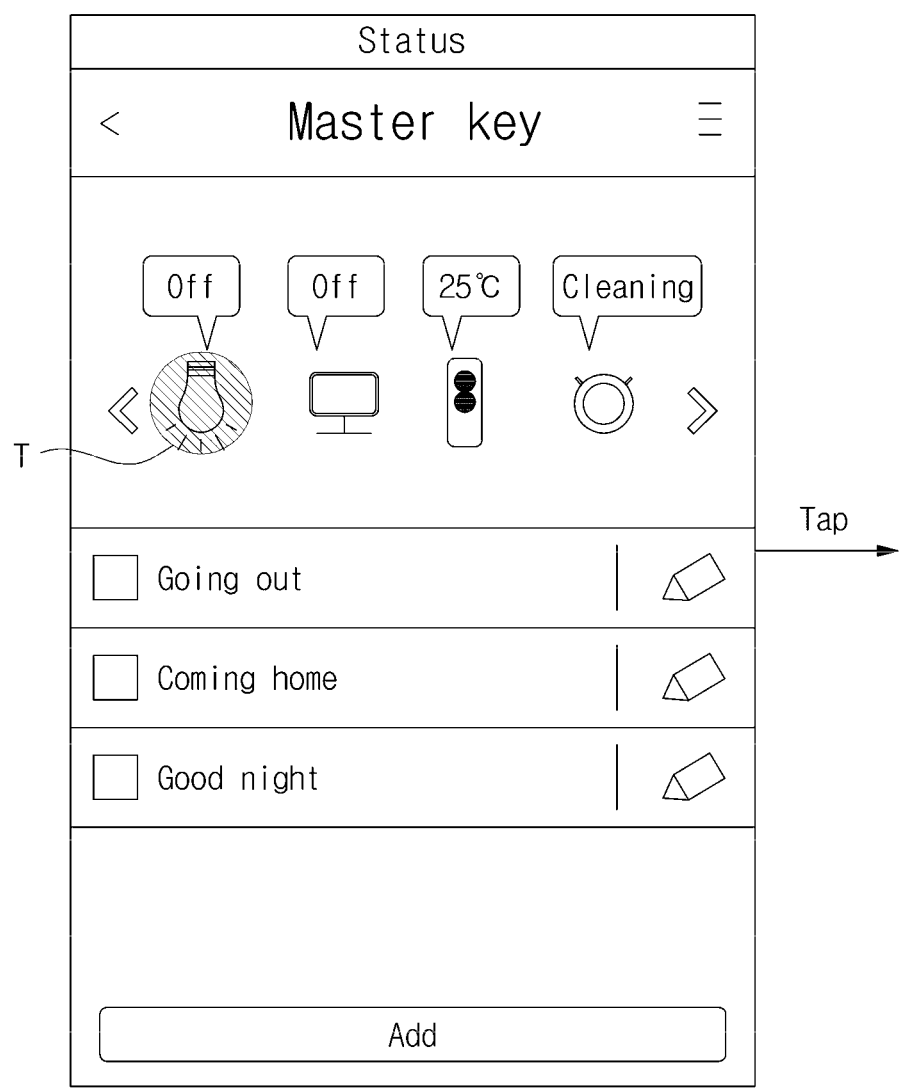

As illustrated in FIGS. 10A and 10B, when the Going Out button is selected and the icon of the illumination device is touched in a state in which it is set in advance that the television is OFF, a target temperature of the air conditioner is 25 C, and the vacuum cleaner is operating, the master key part setting window 318 changes the operation command of the illumination device to OFF and guides this through the speech bubble.

Figure 10C:
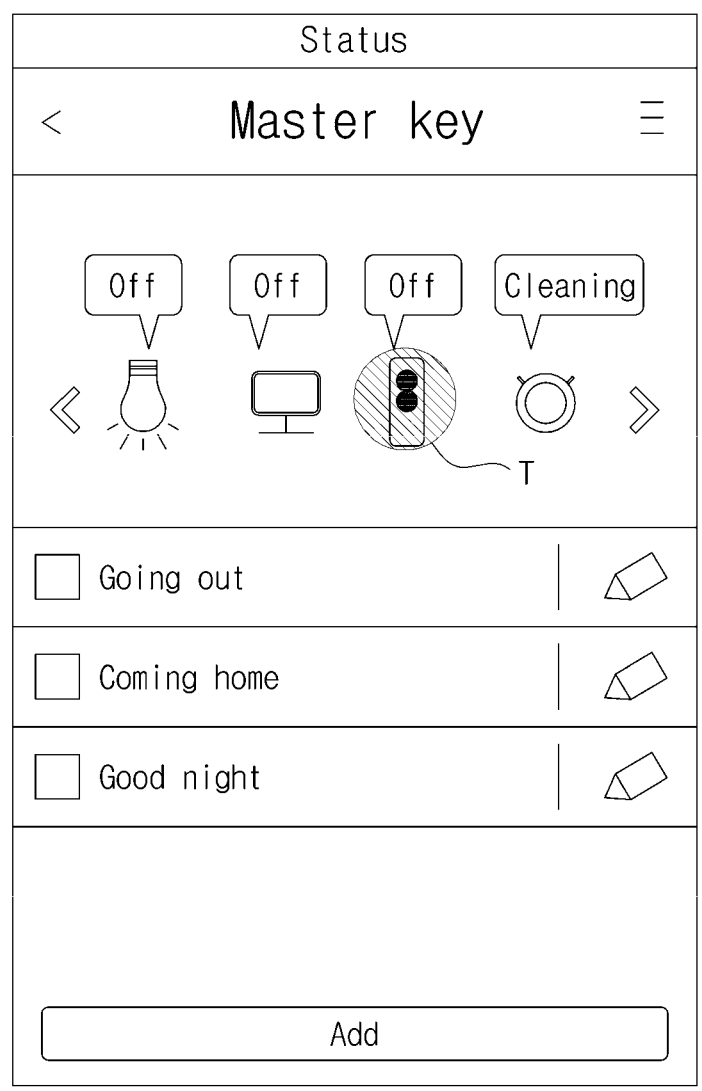

As illustrated in FIG. 10C, when the icon of the air conditioner is touched, the master key part setting window 318 changes the operation command of the air conditioner to OFF, and guides this through the speech bubble.

Accordingly, a command set for each electrical device corresponding to the Going Out button of the master key part in advance is a command to turn OFF the illumination device, the television, and the air conditioner, and turn on the vacuum cleaner.

Figure 11A:
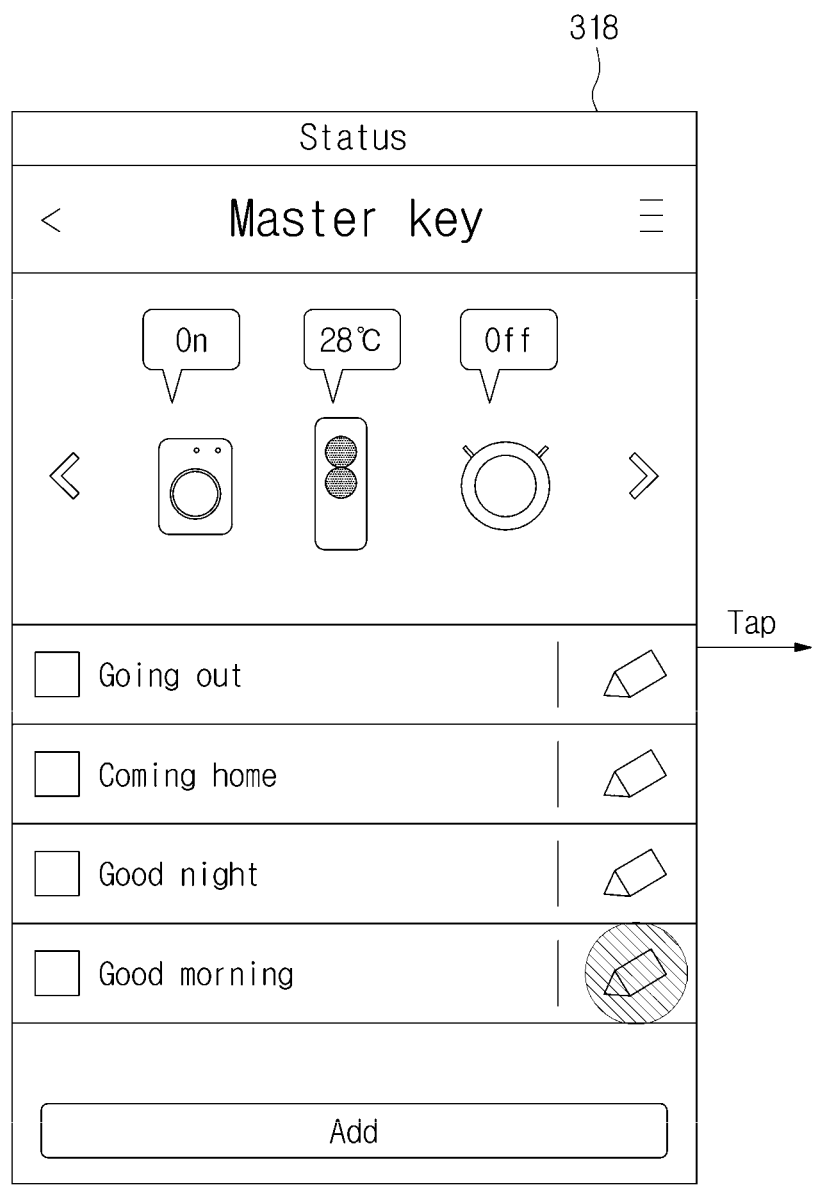

As illustrated in FIG. 11A, the master key part setting window 318 displays information of the previously set operation command for each electrical device corresponding to the wakeup button when the editing button of the wakeup button is touched in a state in which the Going Out button, the Coming Home button, the Good Night button, and the wakeup button are set using the button for collective control.

Figure 11B:
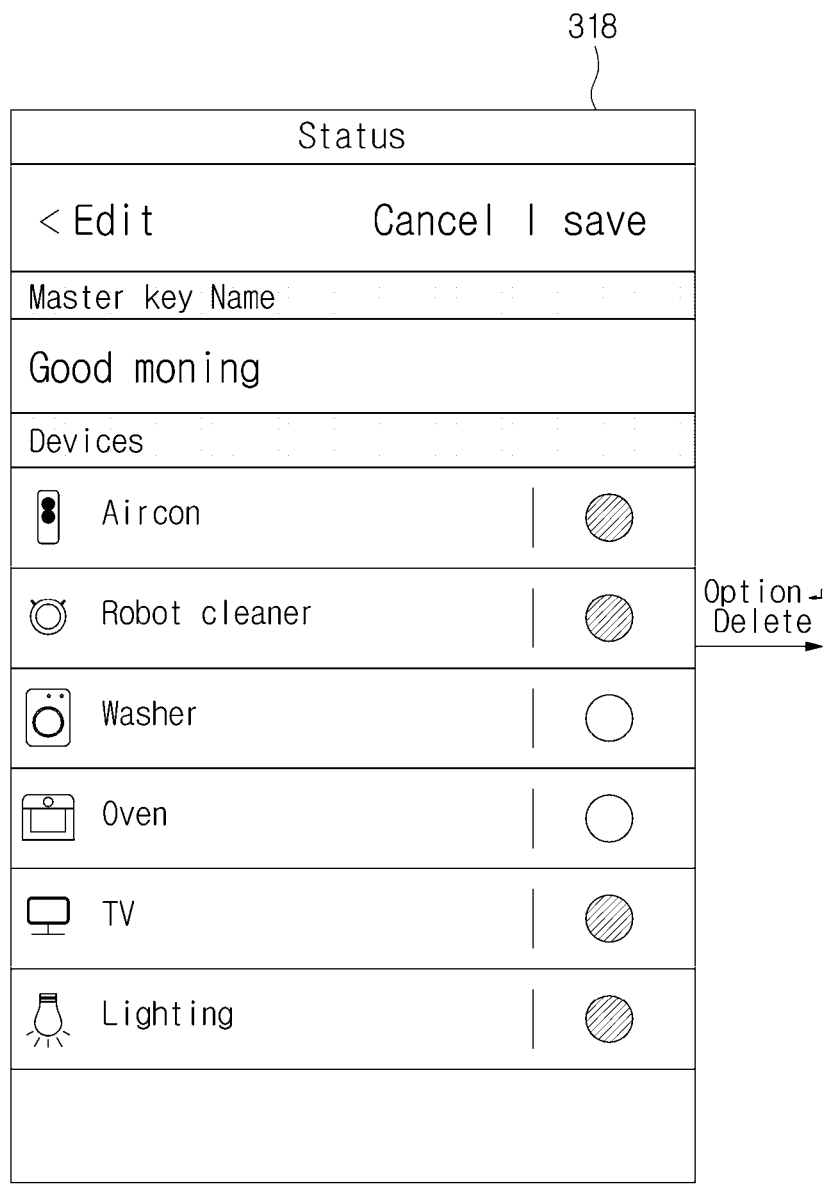
Figure 11B:
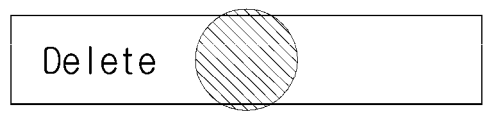
Figure 11C:
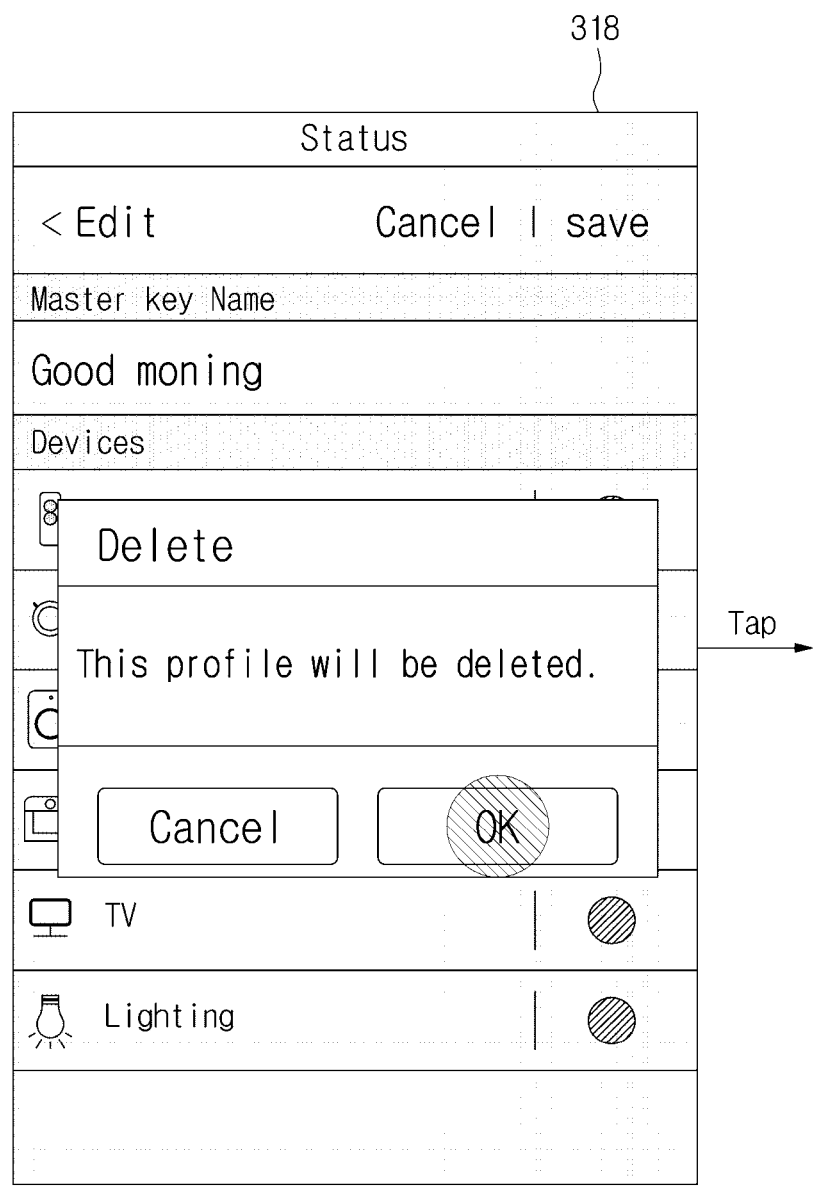
Figure 11D:
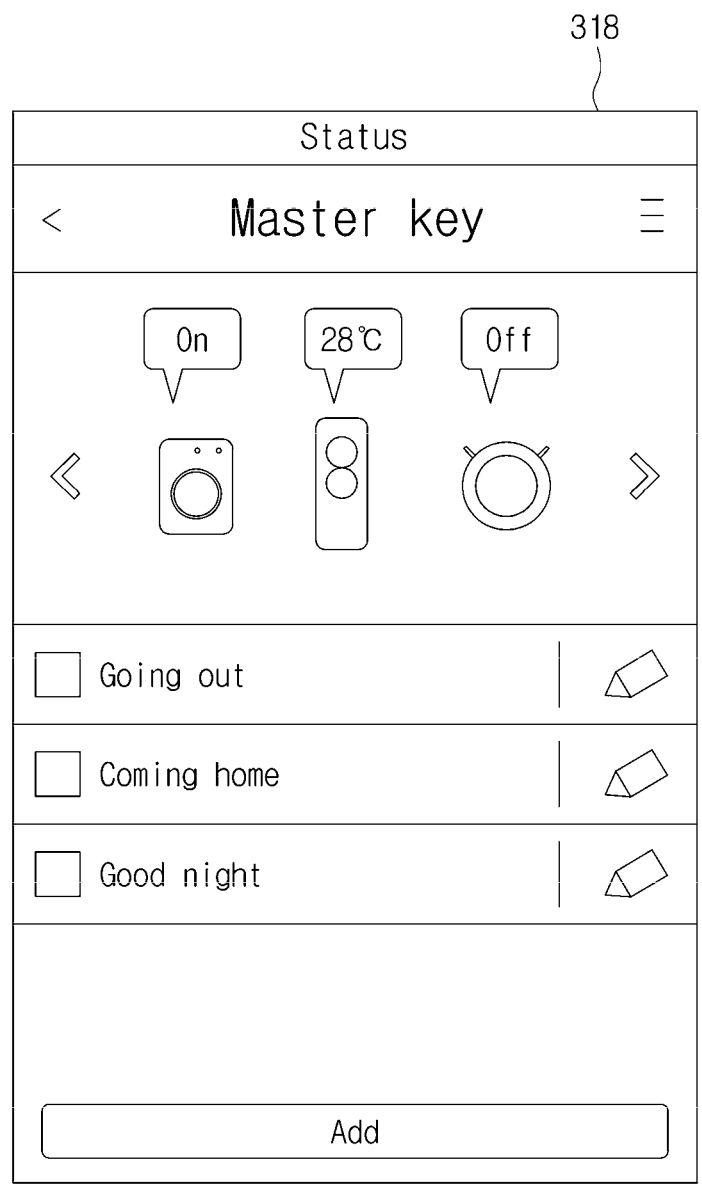

As illustrated in FIG. 11B to 11D, the deletion button of the option menu is touched, the master key part setting window 318 displays window informing that all information relating to the wakeup button is to be deleted when the deletion button is touched, and displays a plurality of buttons, in which the wakeup button is deleted when an "OK" button is touched.

FIGS. 12A to 12D are a diagram illustrating a chatting screen when the chatting part in the dashboard screen of the mobile device according to an embodiment is executed, and is a diagram illustrating a display change of the chatting screen corresponding to a conversation input method.

When the chatting part 313 is touched, the user interface unit 310 switches the dashboard screen to the chatting screen 319. This is the same as in FIG. 12.

Figure 12A:
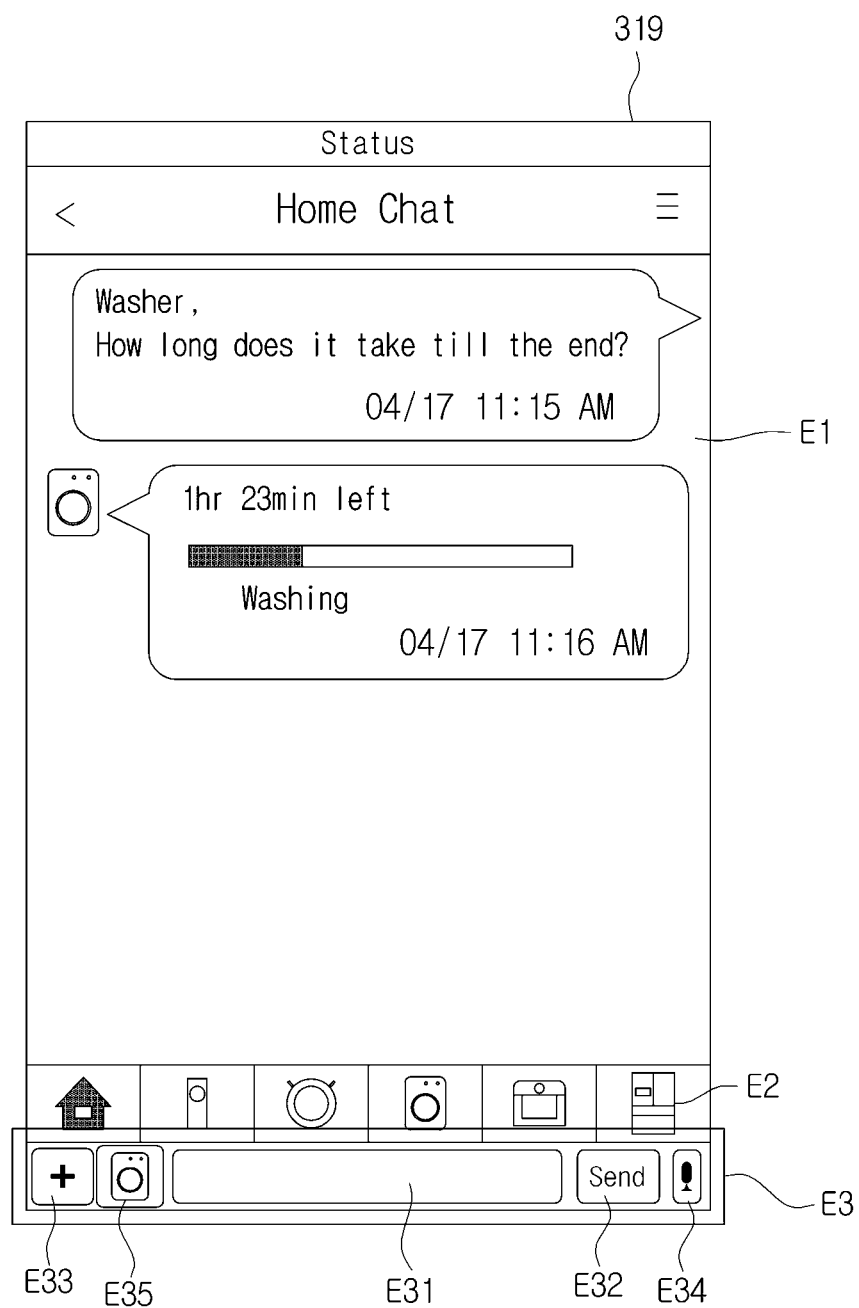
FIGS. 12A to 18G are diagrams illustrating execution of a chatting part in the dashboard screen of the mobile device according to an embodiment.

As illustrated in FIG. 12A, the chatting screen 319 includes a conversation display window E1 for displaying conversation with at least one of the electrical devices, an icon selection window E2 for selecting the icon of the at least one electrical device or an all-device selection icon, and a conversation input window E3 for selecting a conversation input method with the at least one previously registered electrical device and inputting conversation.

Here, the conversation input window E3 includes a text window E31 for selecting a character input method, a transmission button E32 for instructing transmission of a text sentence, a list button E33 for instructing to display a list of shortcut buttons having chat commands, a microphone button E34 for instructing to input voice, and a target window E35 for displaying the icon of the chatting electrical device.

When touch is made, the text window E31 displays a QWER type of keypad E36.

Further, the keypad E36 includes a button for switching to Hangul letters or figures, and can display the Hangul letters or the figures when the switching button is touched.

Figure 12B:
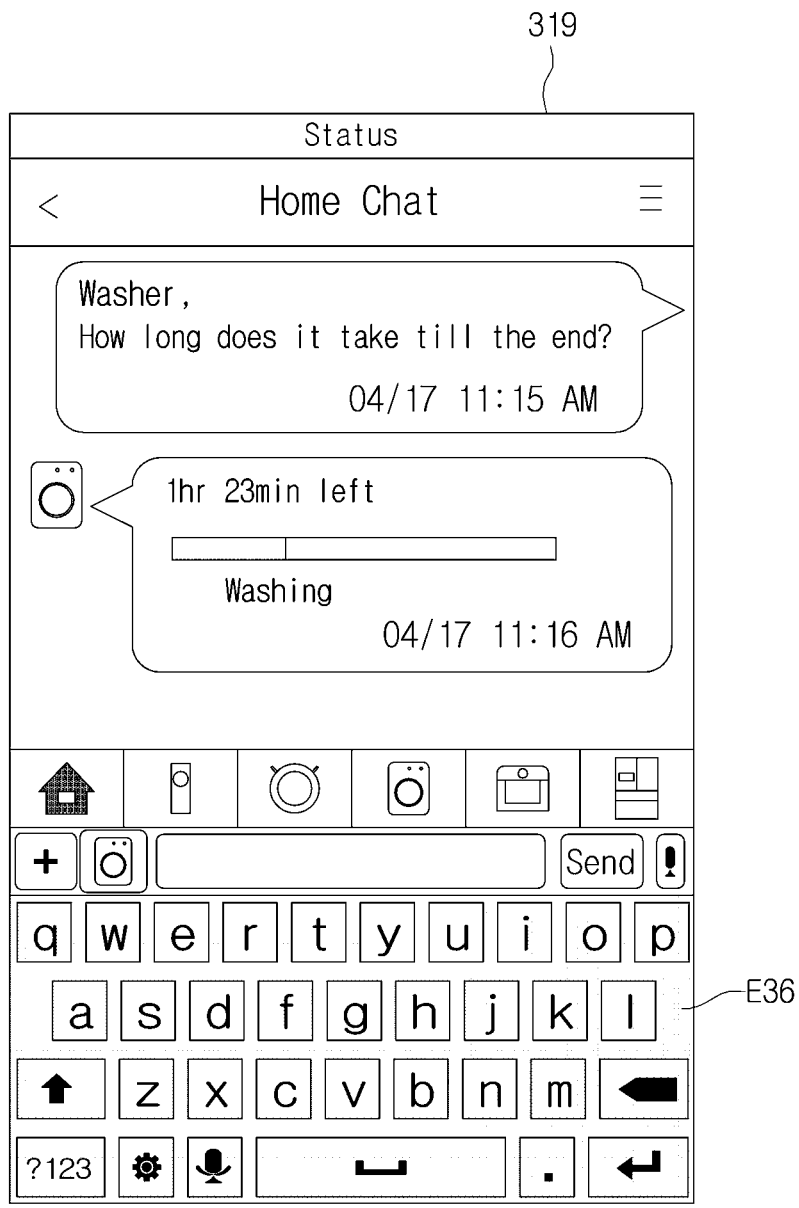
Figure 12D:
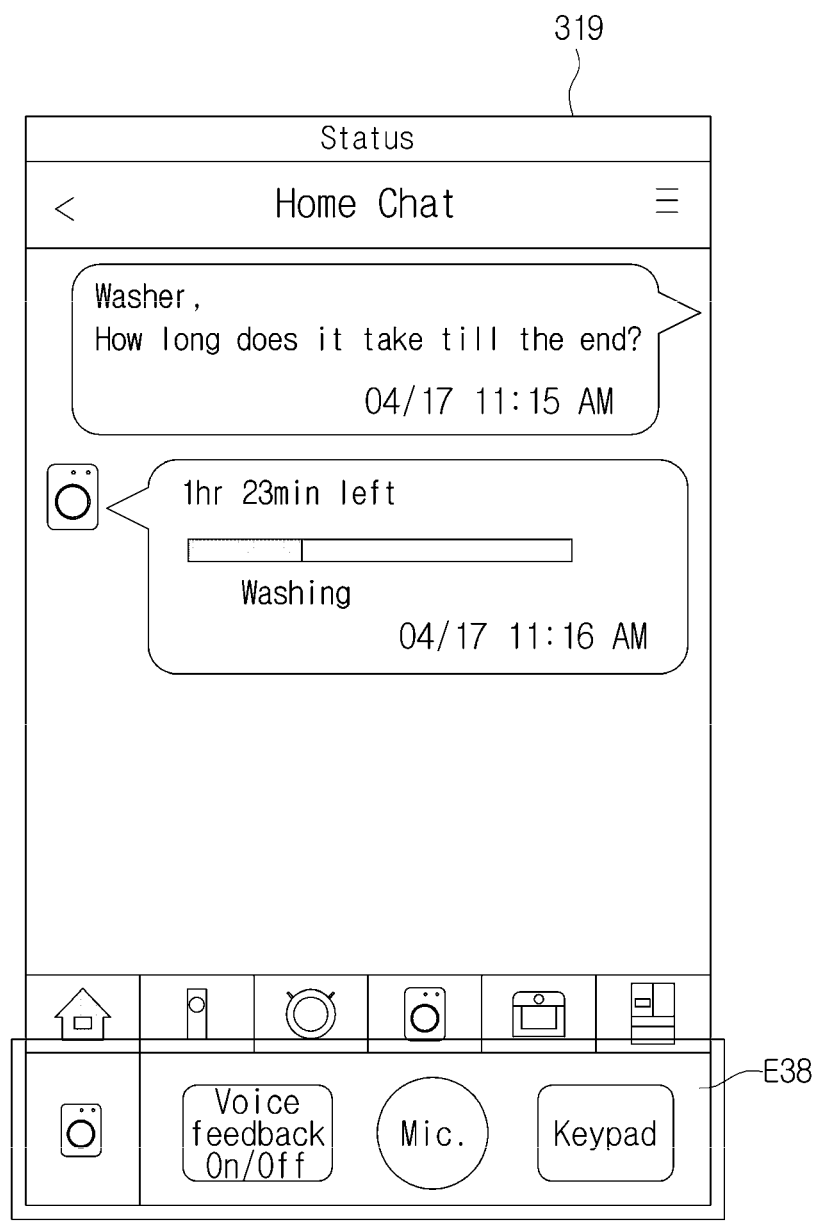
Figure 13A:
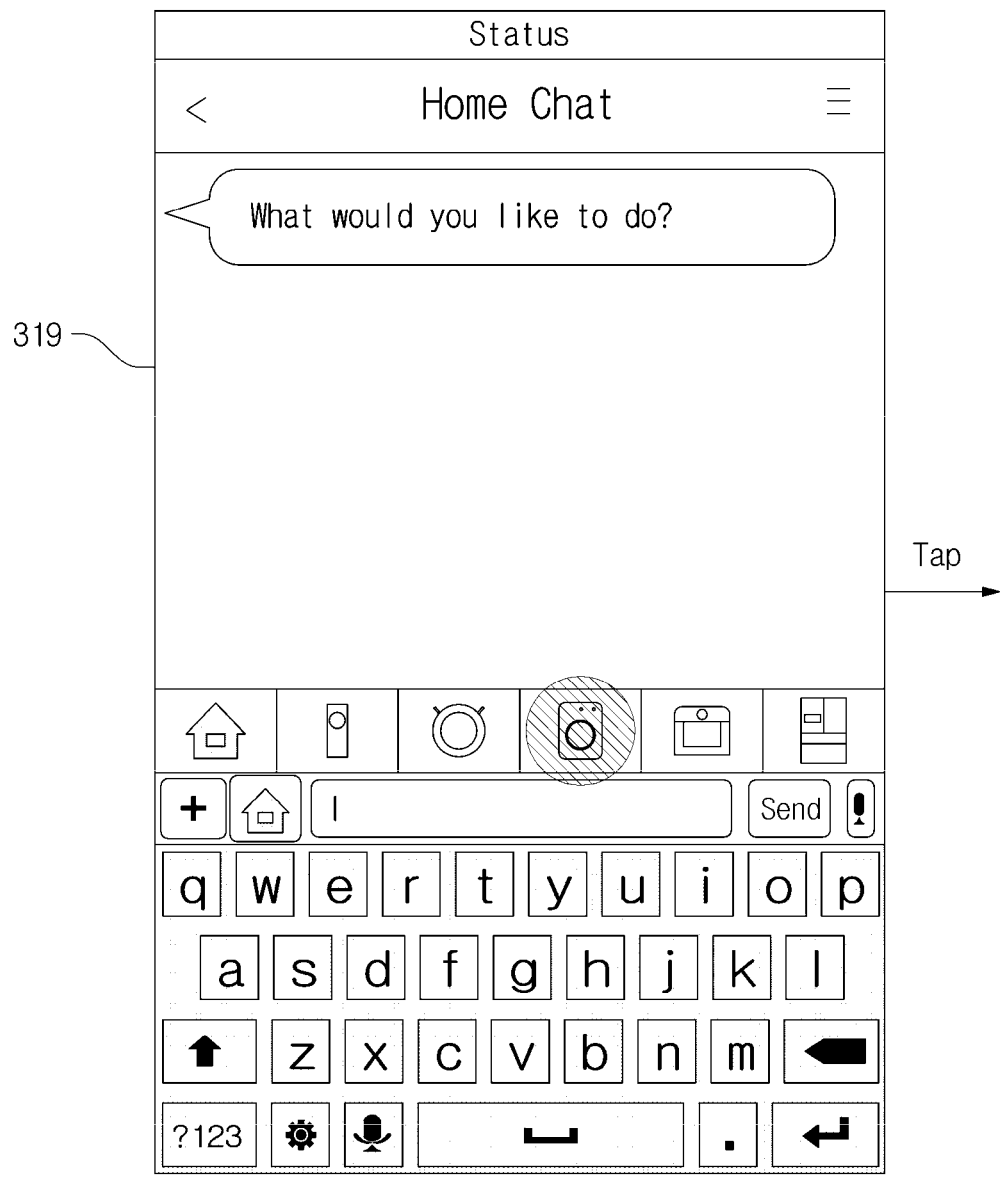
Figure 13B:
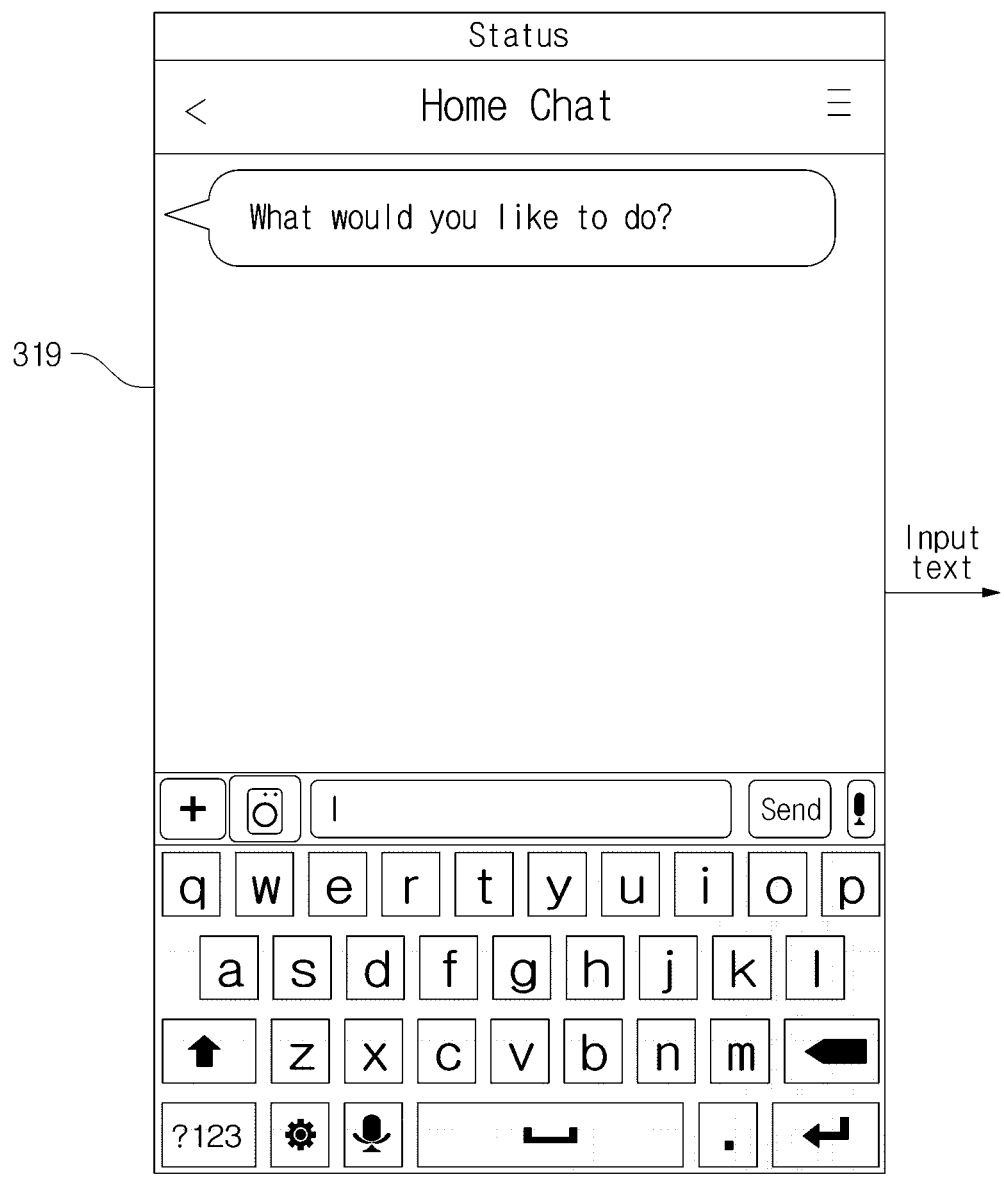
Figure 13C:
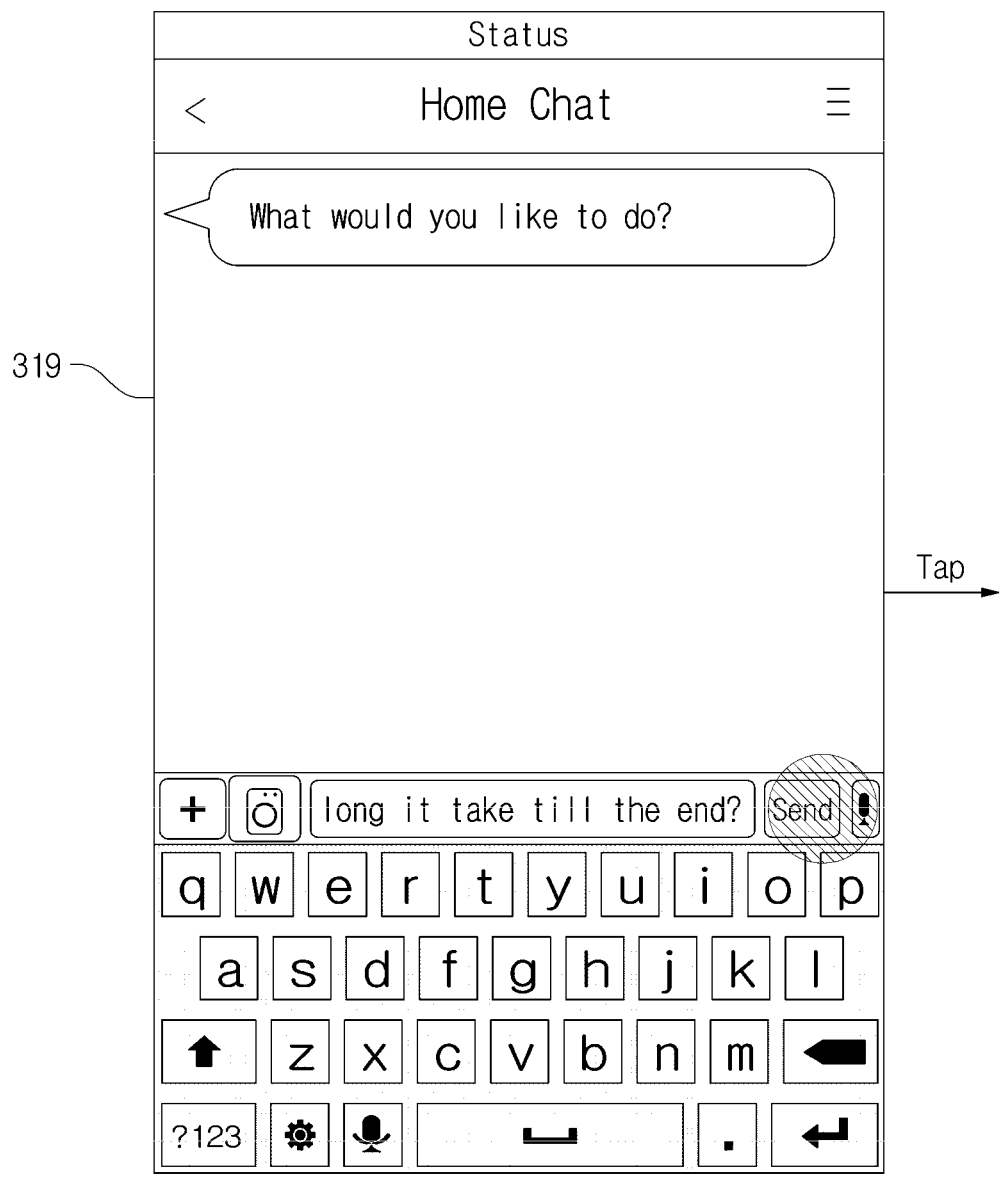
Figure 13D:
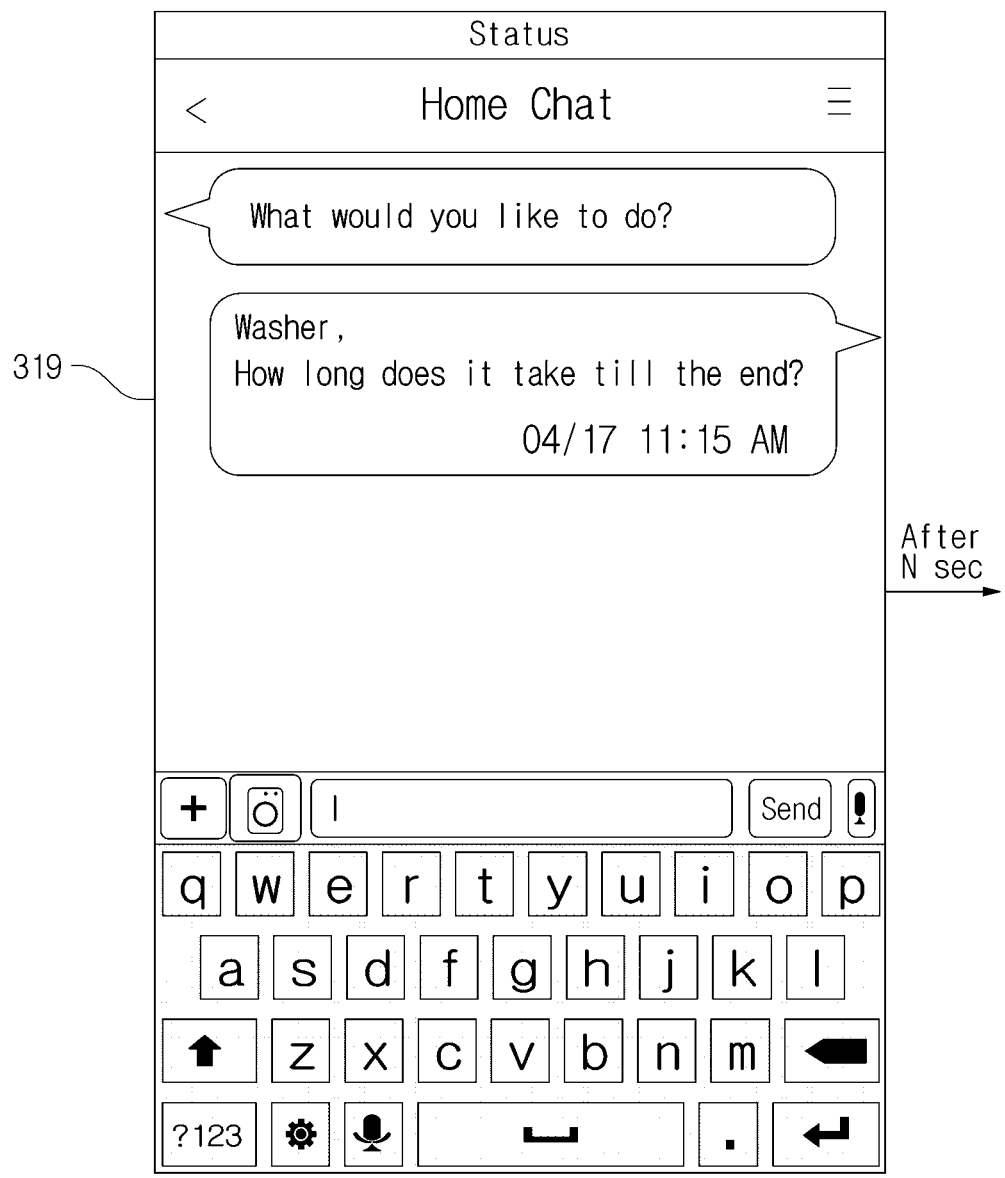
Figure 13E:
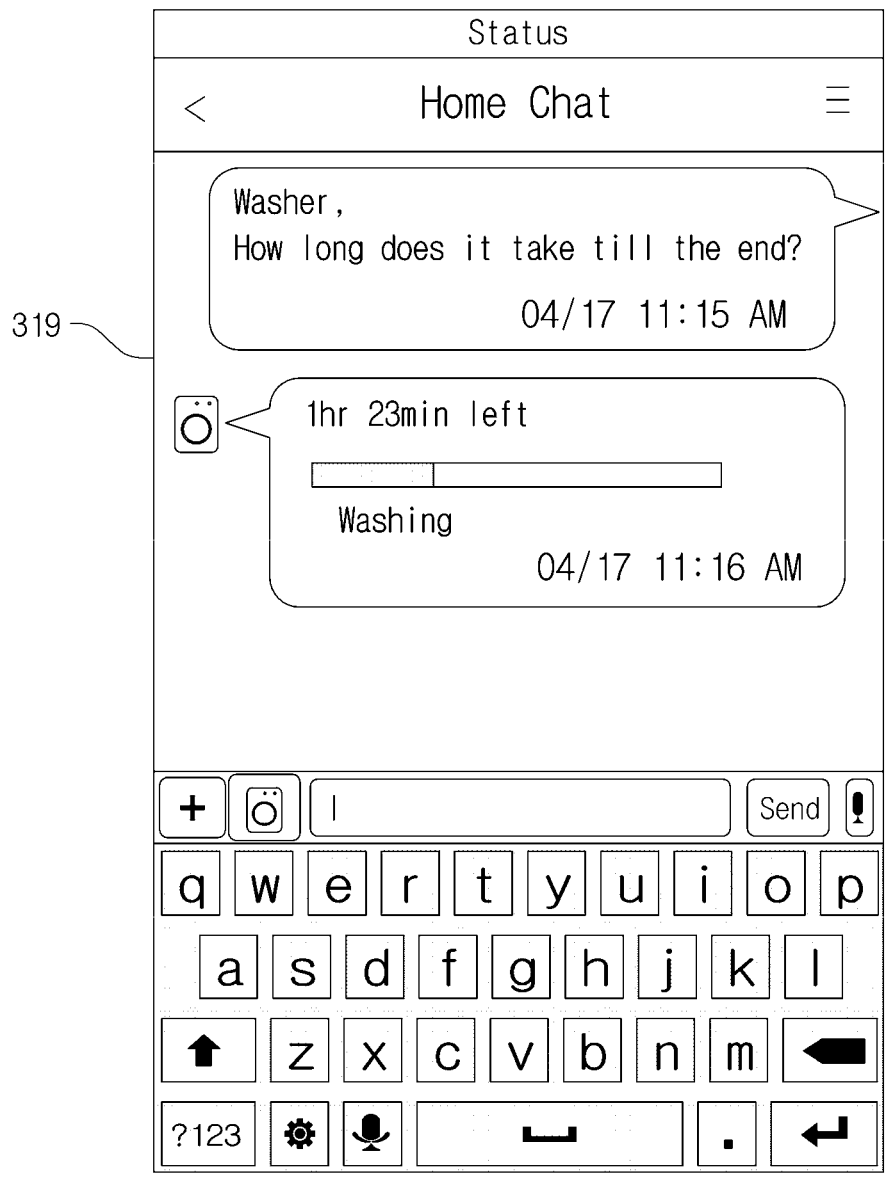
Figure 14A:
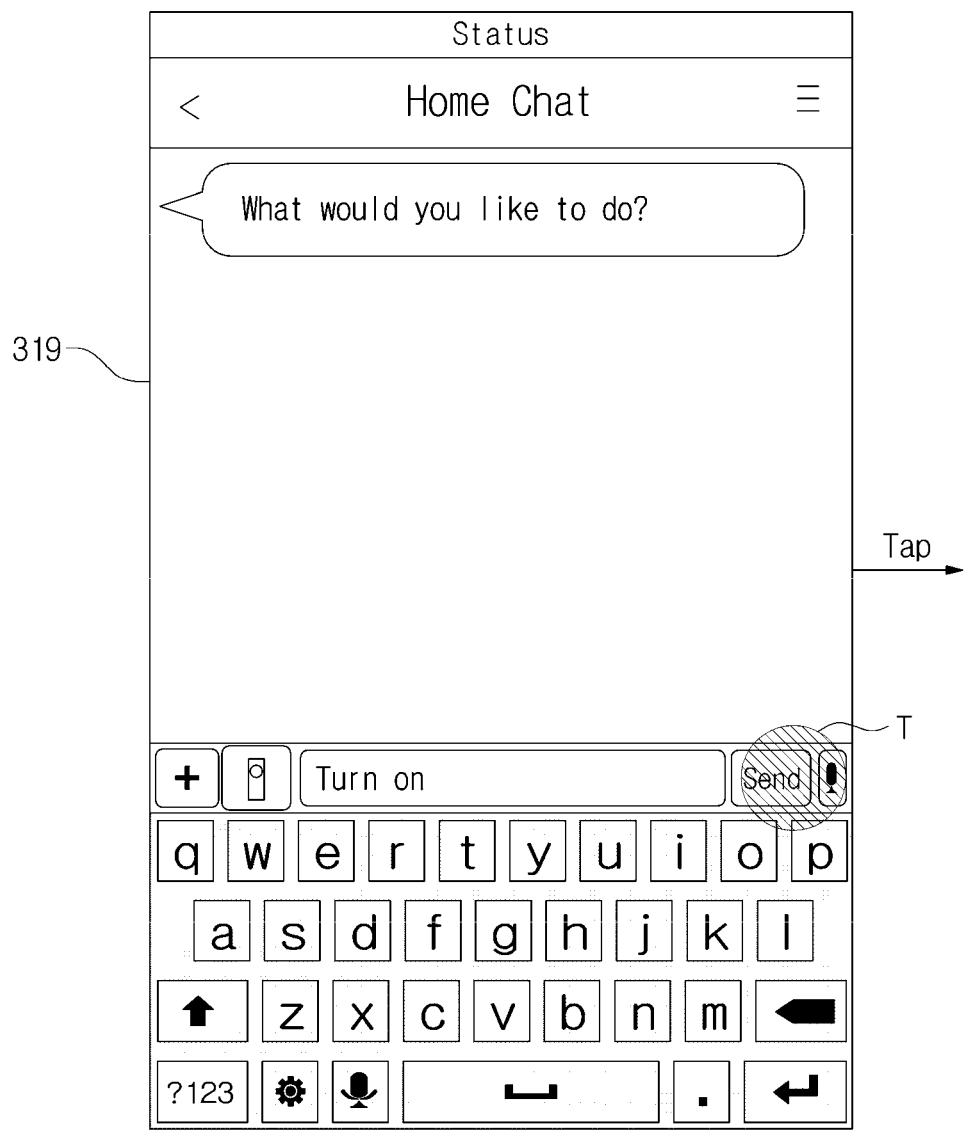
Figure 14B:
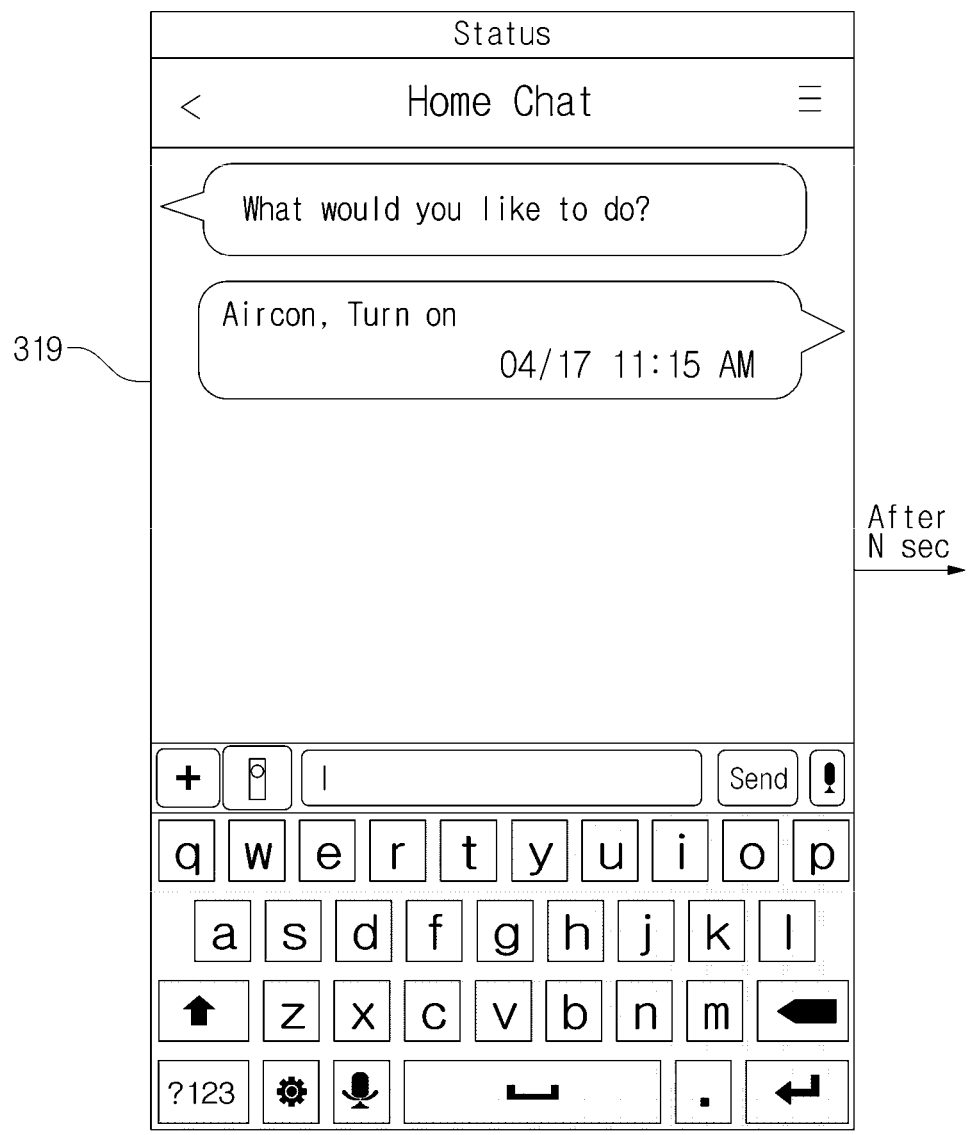
Figure 14C:
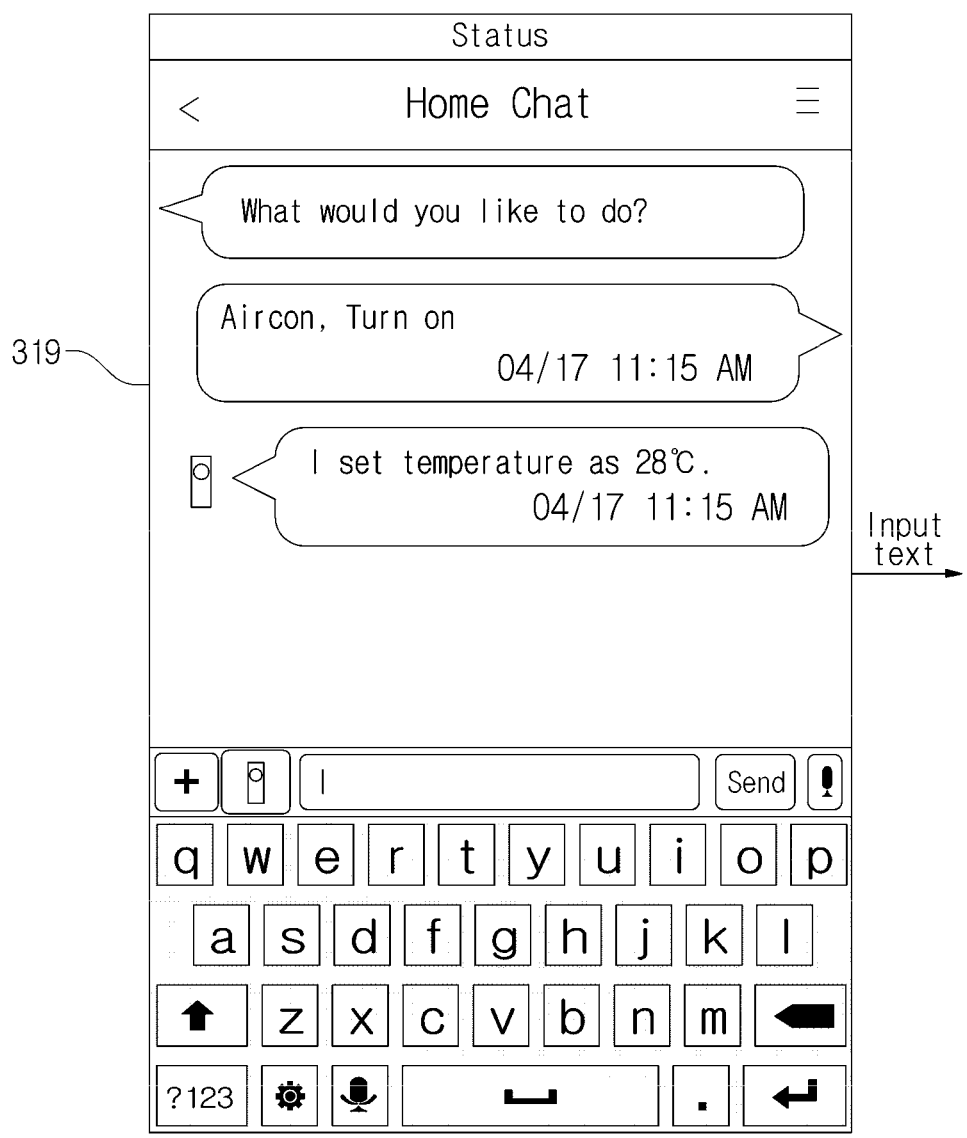
Figure 14D:
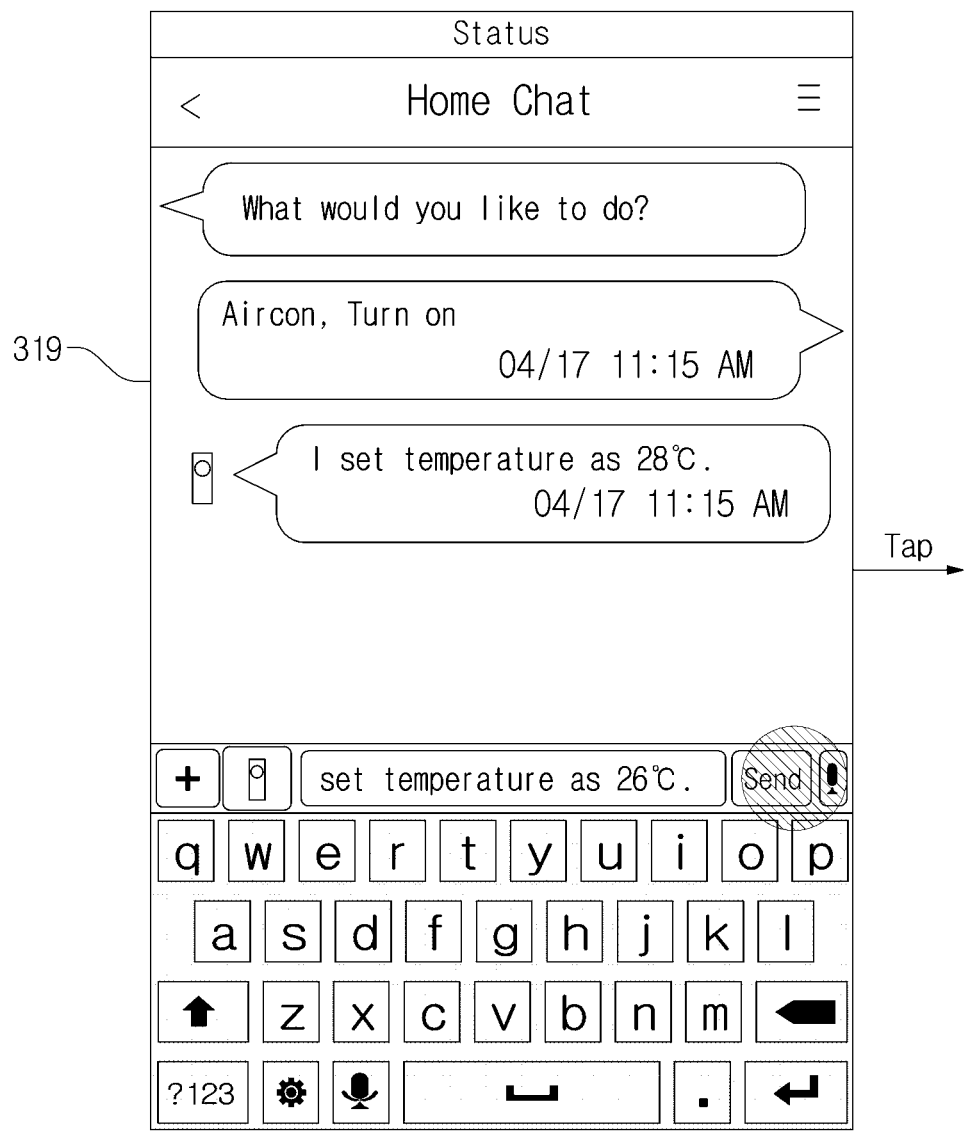
Figure 14E:
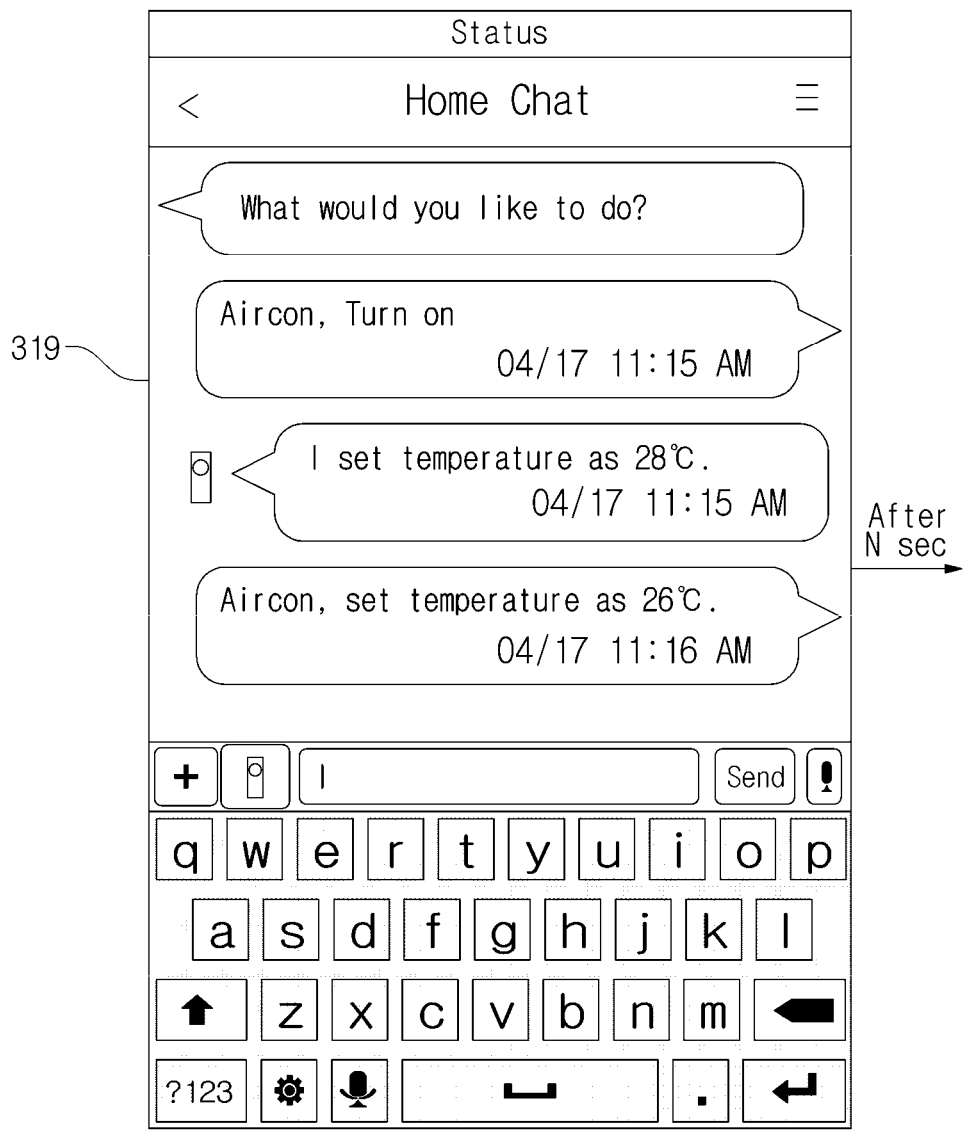
Figure 14F:
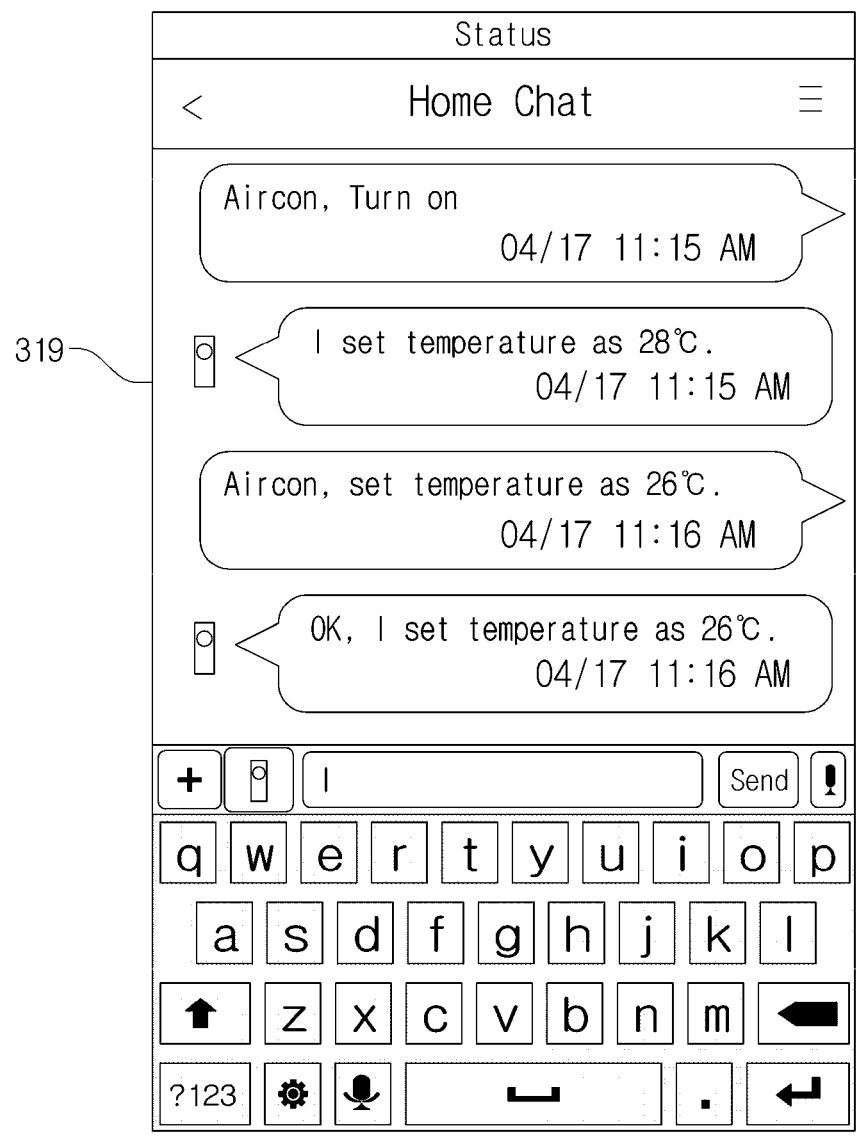
Figure 15A:
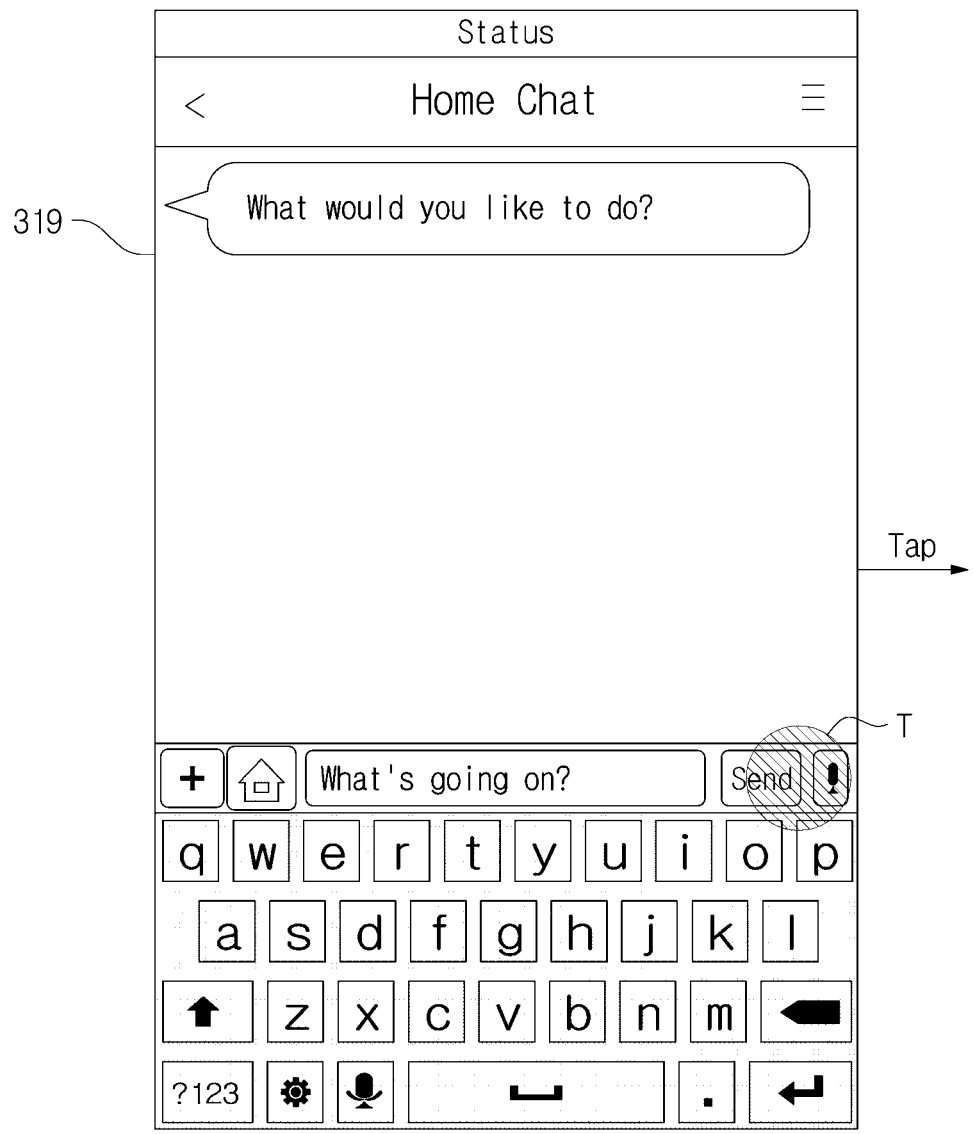
Figure 15B:
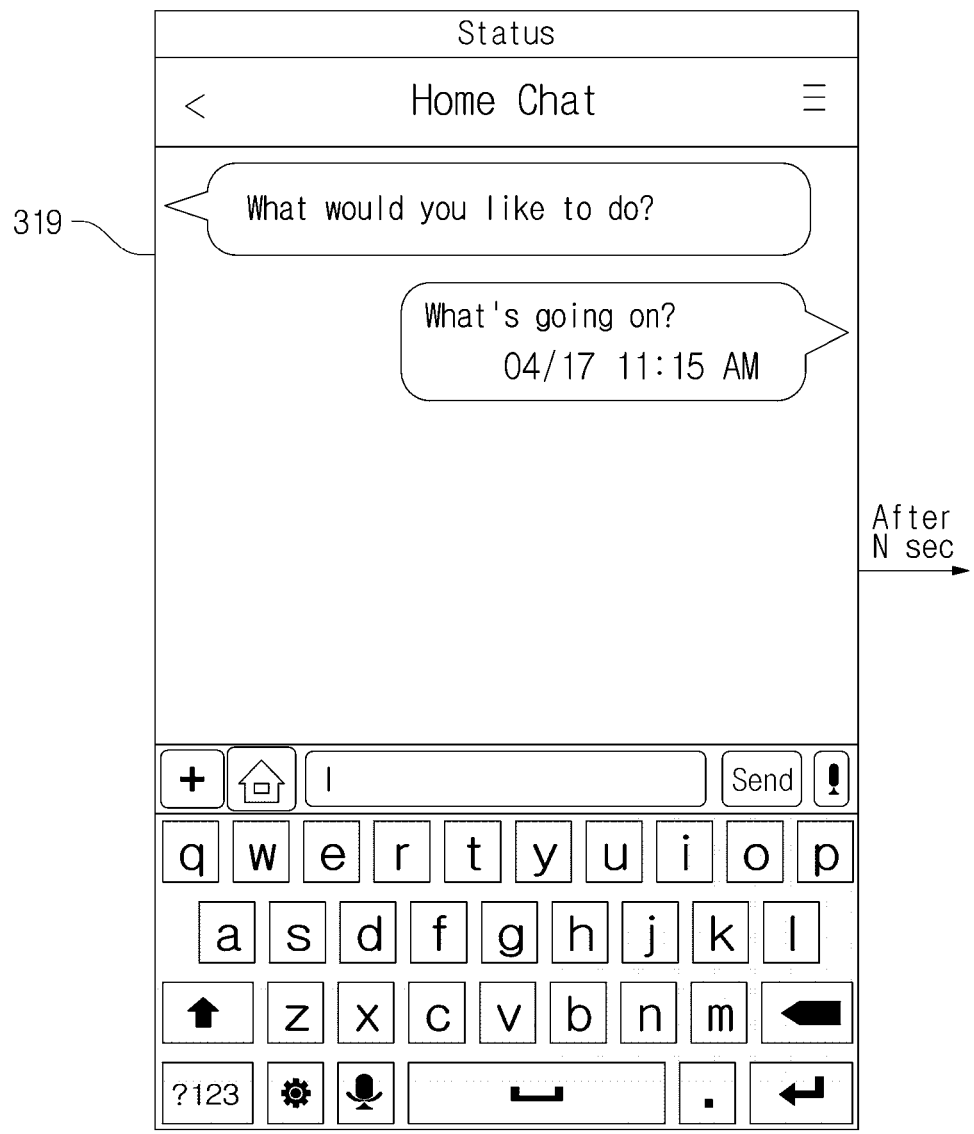
Figure 15C:
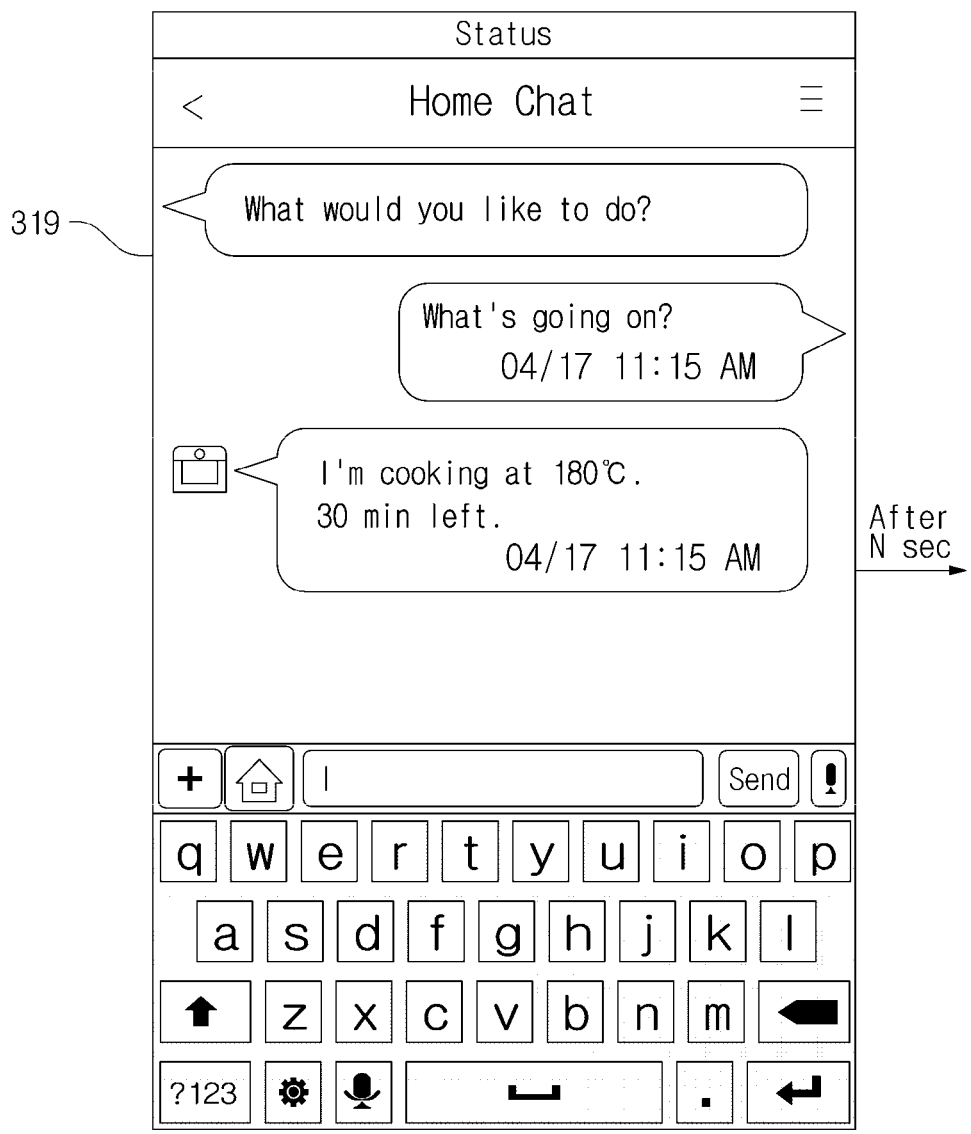
Figure 15D:
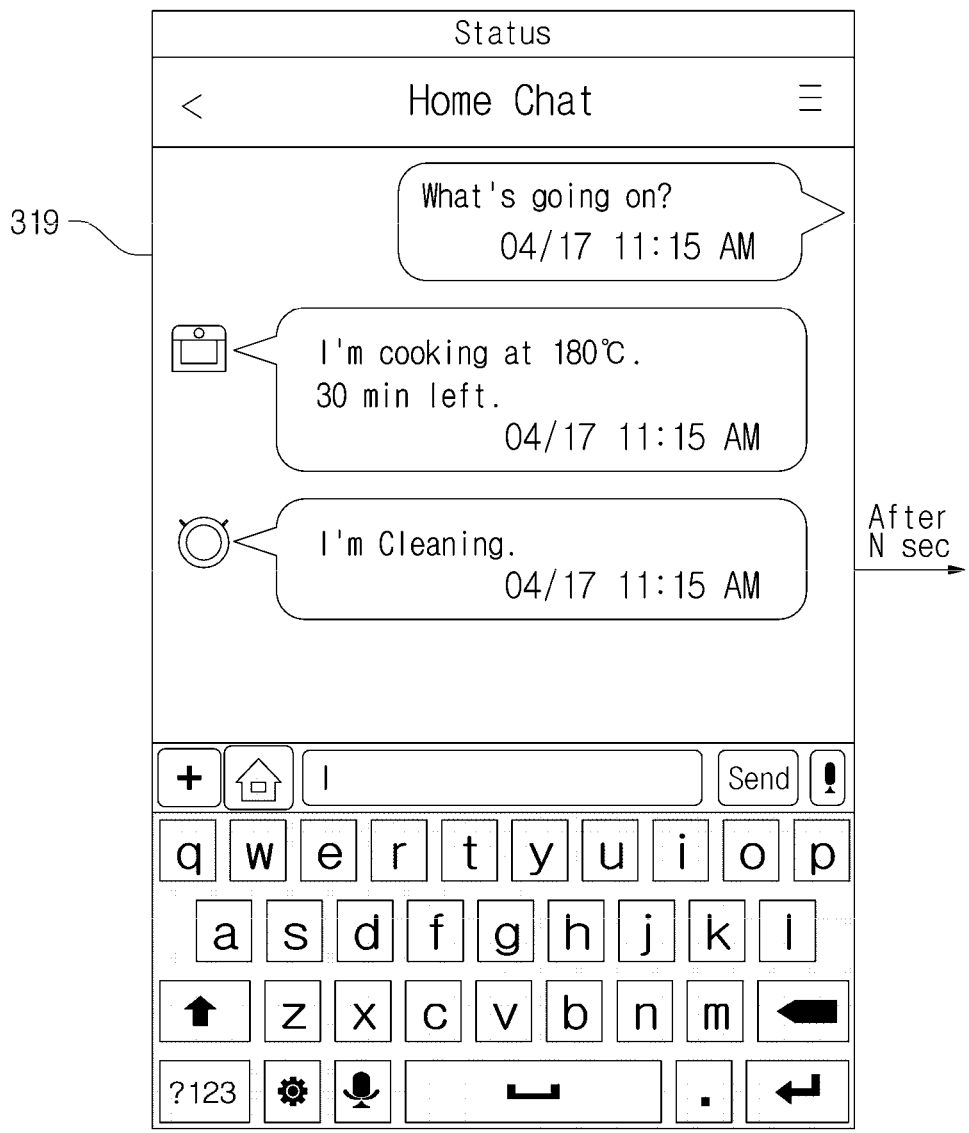
Figure 15E:
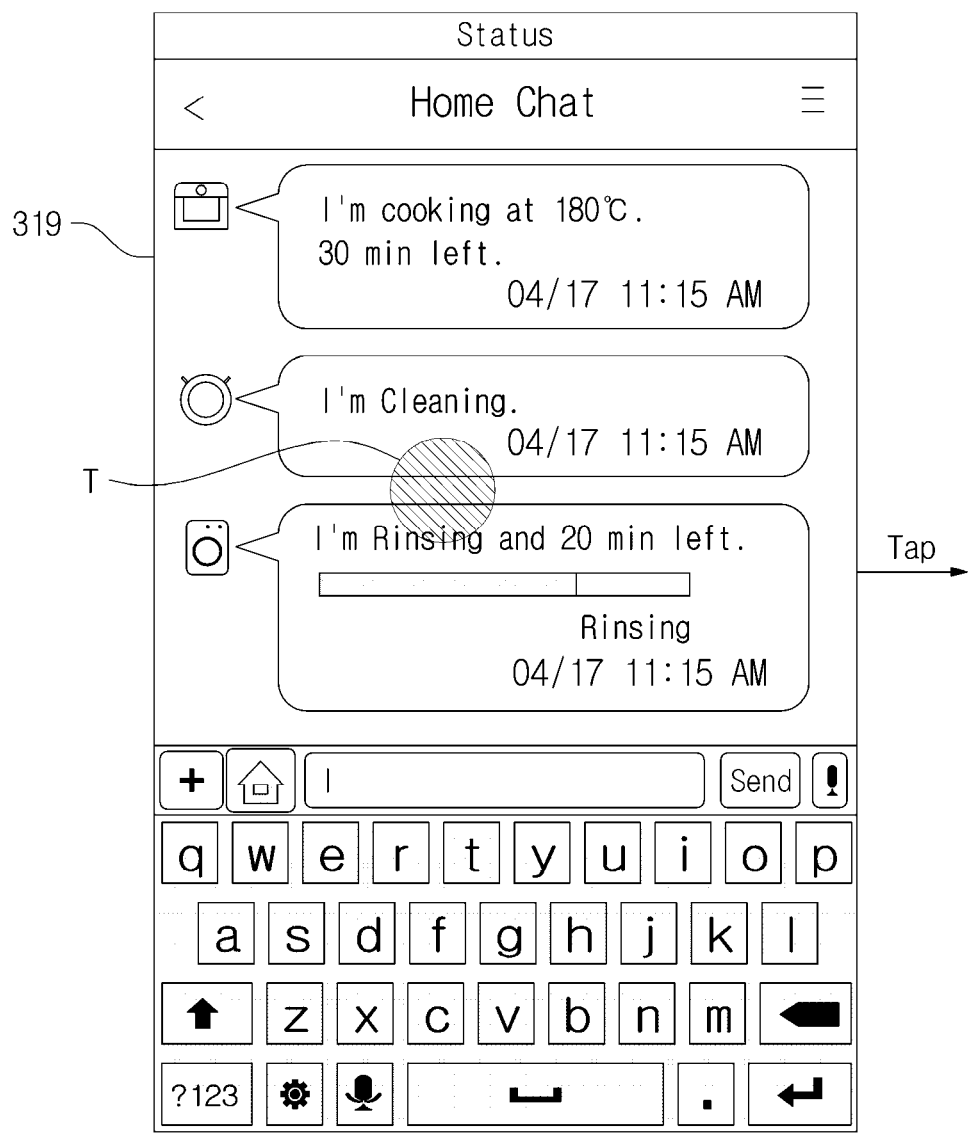
Figure 15F:
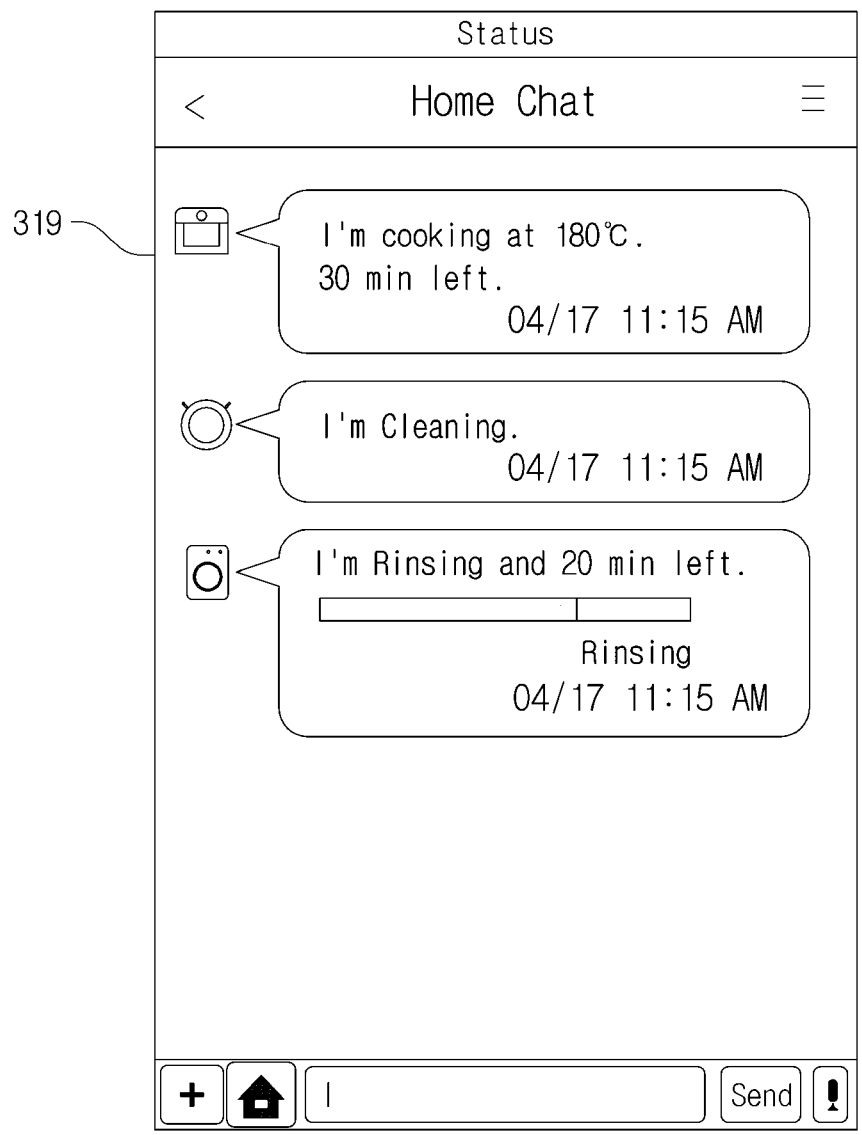
Figure 16A:
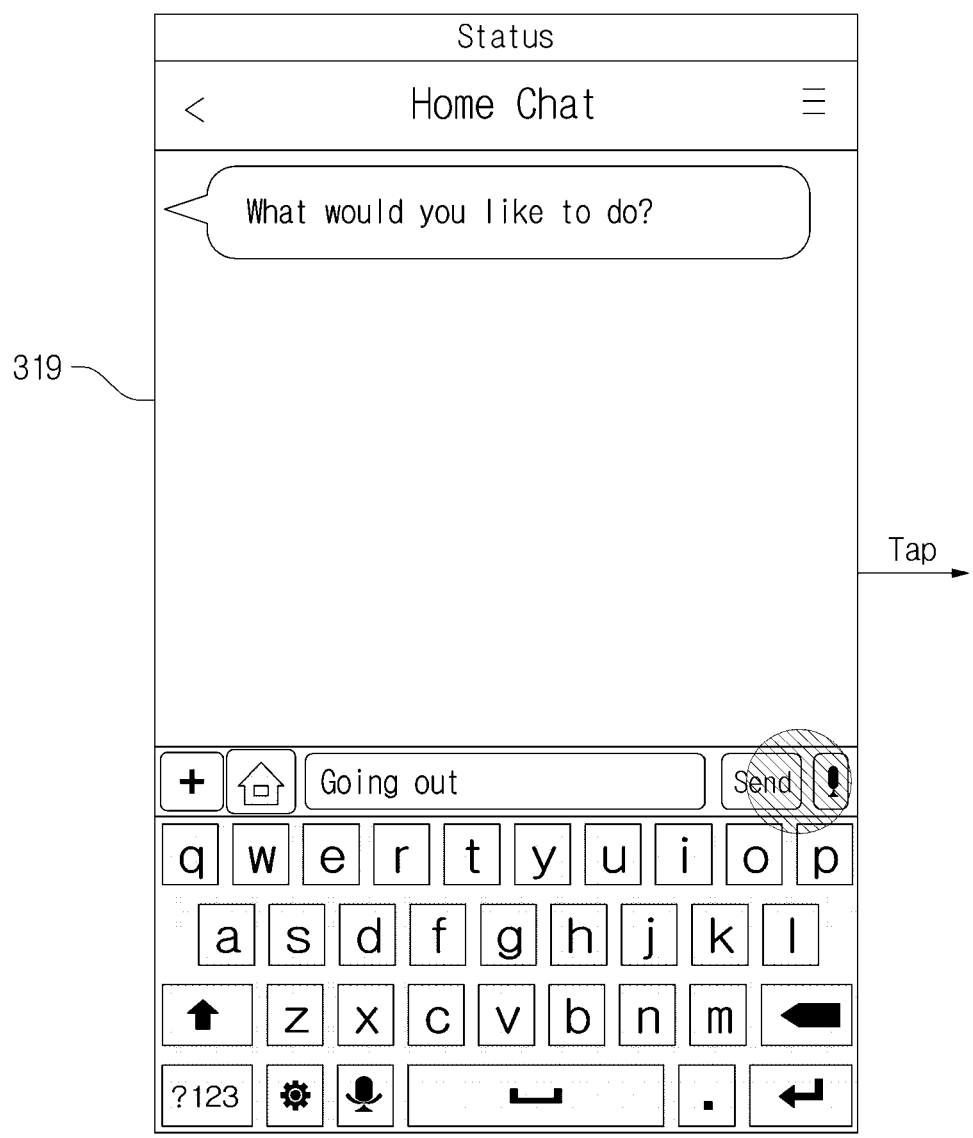
Figure 16B:
Figure 16C:
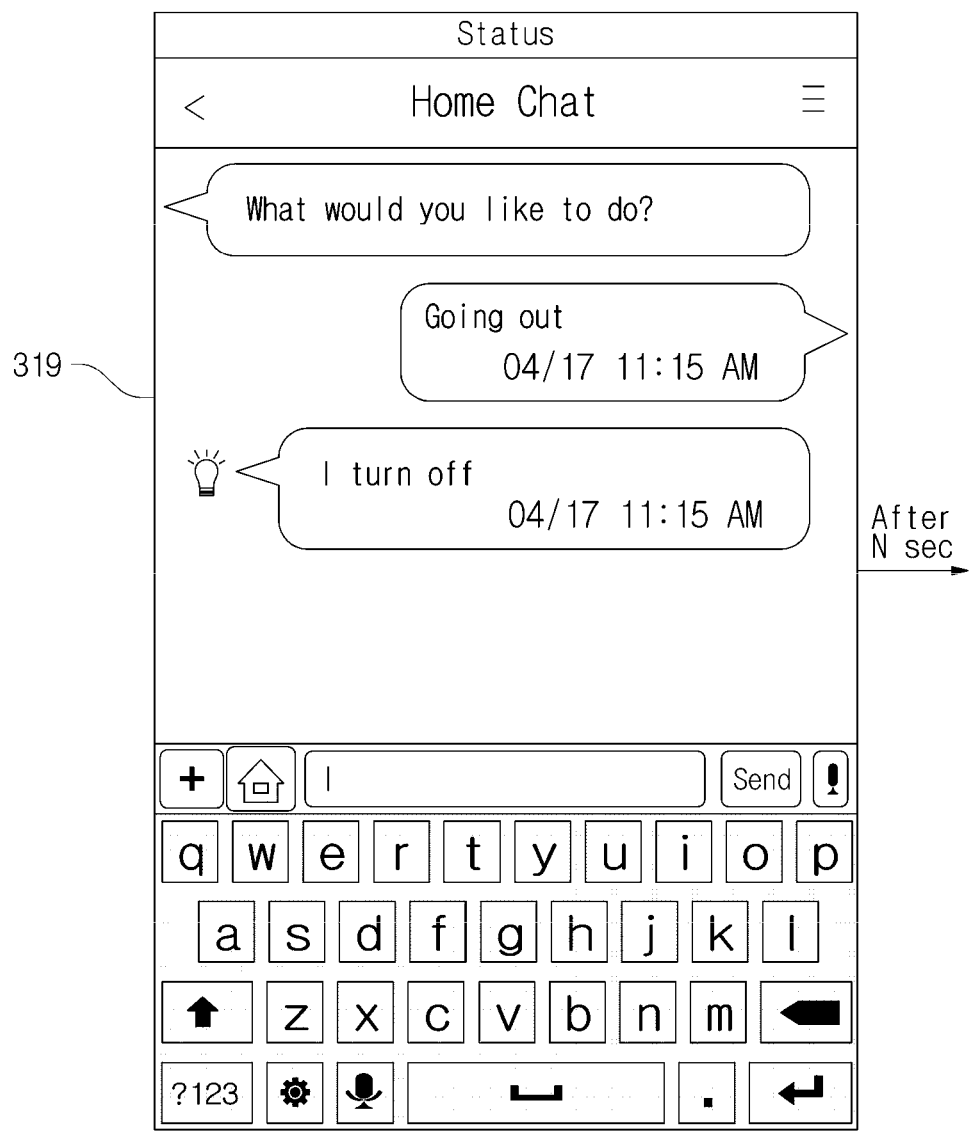
Figure 16D:
Figure 16E:
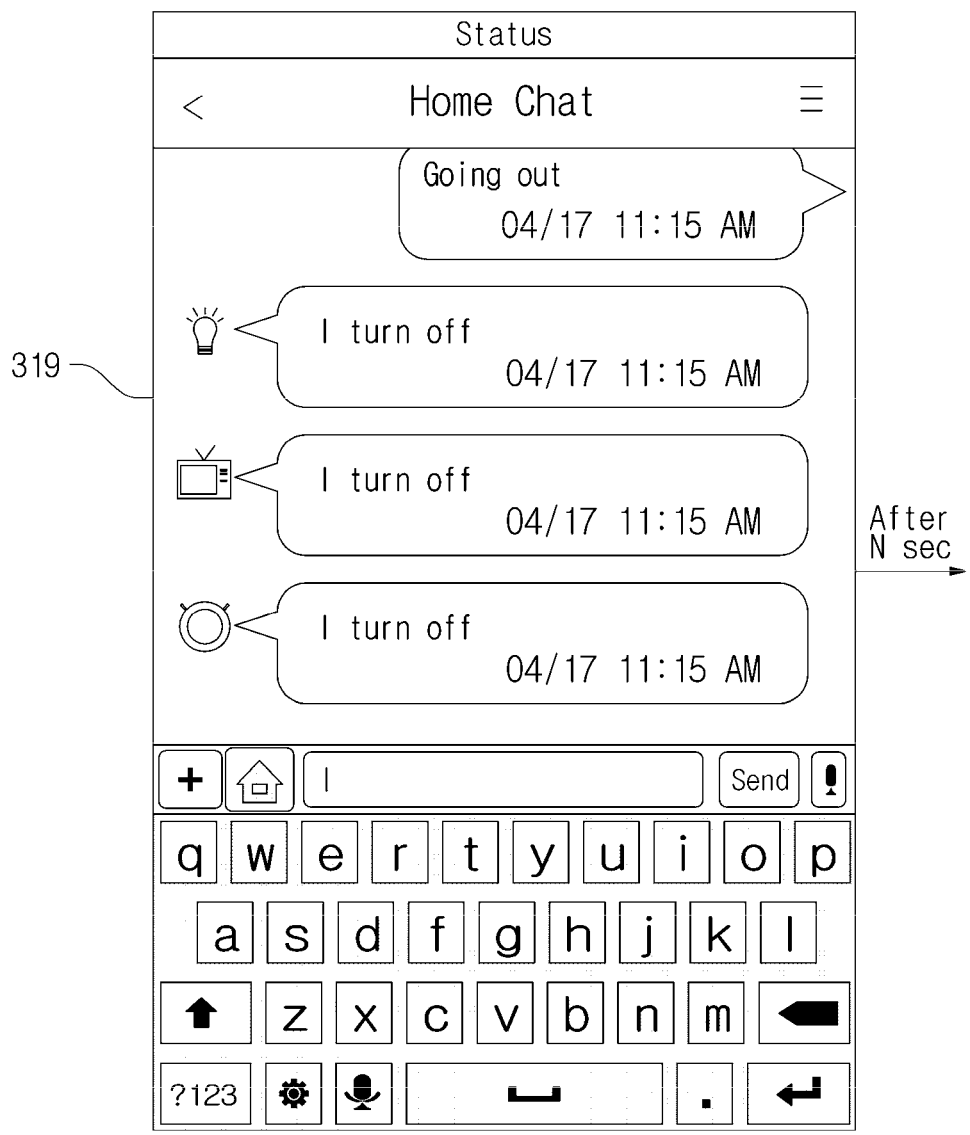
Figure 16F:
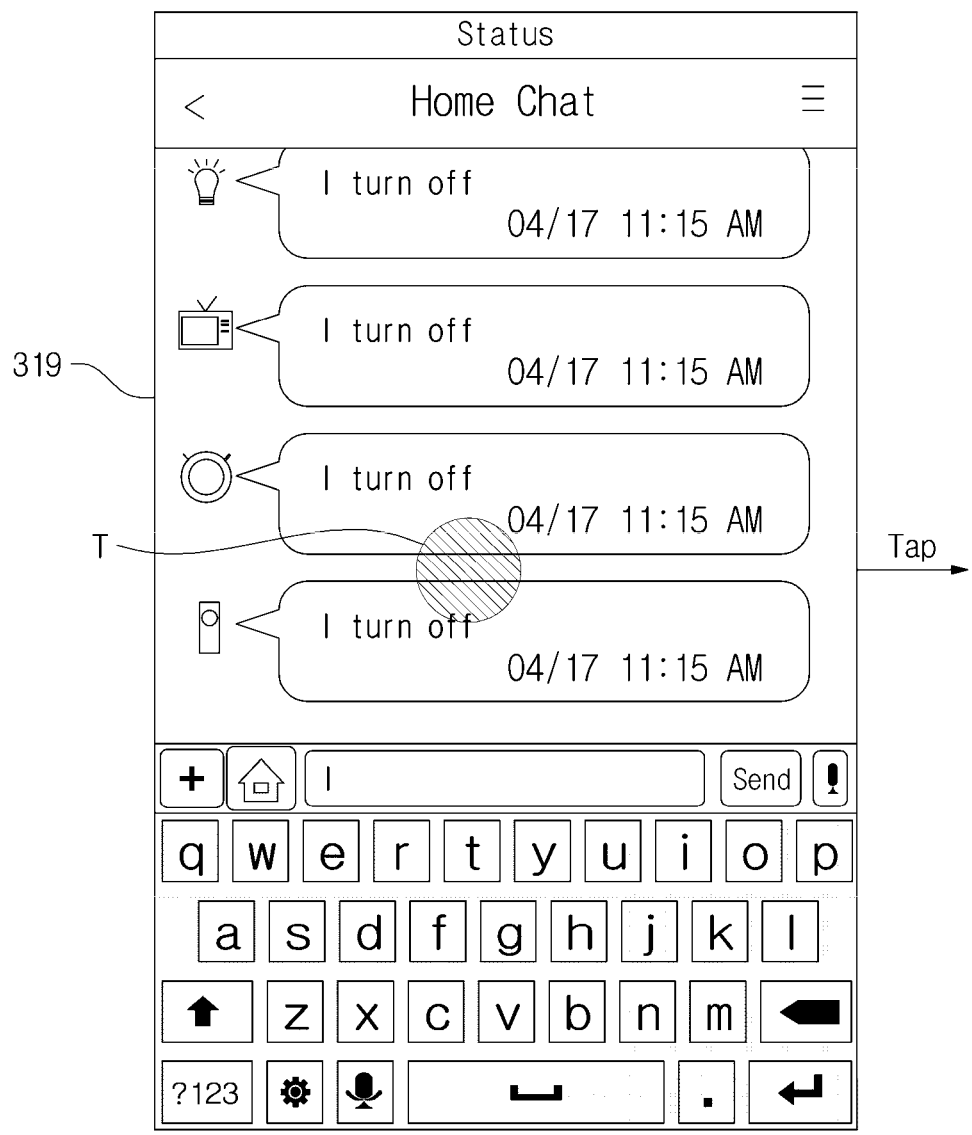
Figure 16G:
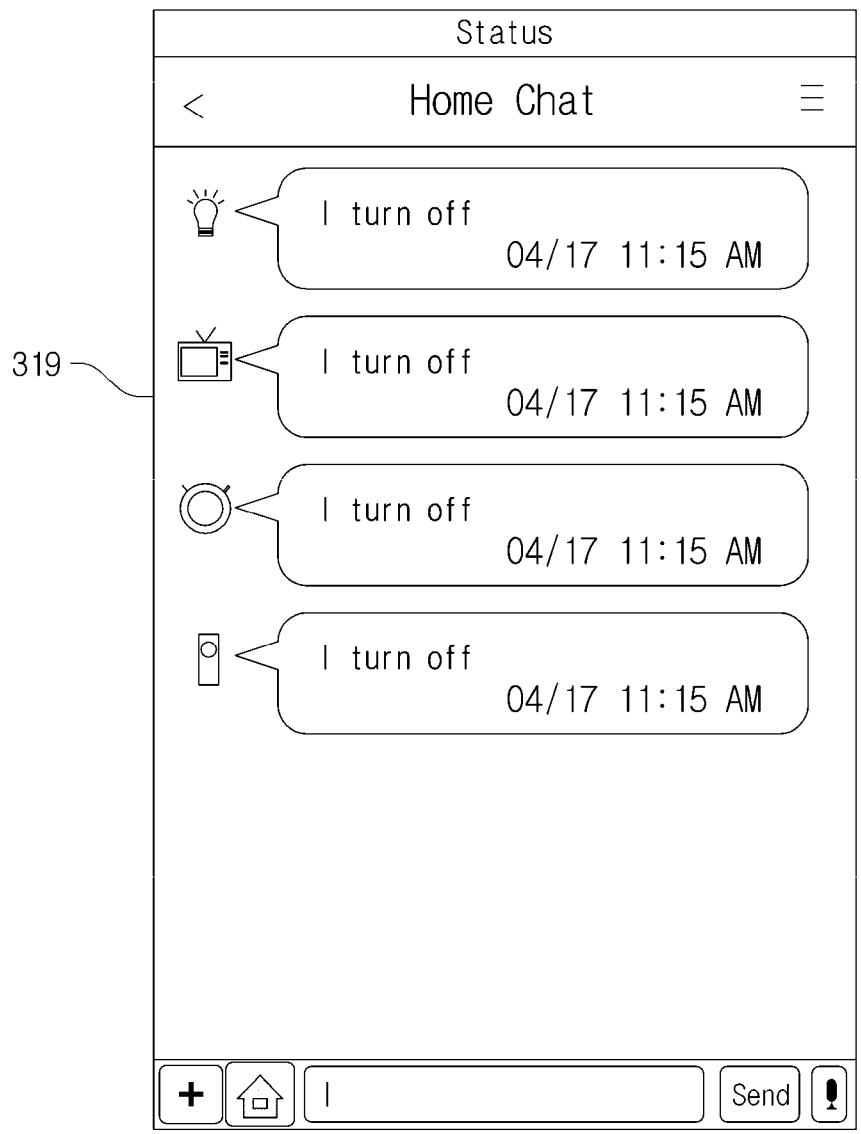

FIGS. 12B, 12C and 12D are diagrams illustrating a change in displaying of the chatting screen corresponding to the conversation input method. This will be described with reference to FIGS. 13 to 18.

As illustrated in FIG. 12B, when the text window is touched, the keypad E36 is displayed so that a user performs chatting.

As illustrated in FIGS. 13A to 13E, the chatting screen 319 displays the icon of a washing machine in a target window when the icon of a washing machine is touched, and performs a preparing process for a user to chat by displaying the keypad E36 when the text window is touched.

When the transmission button is touched after text inquiring of the washing machine about the state of progress is input, the chatting screen 319 displays the input text in a representative display window. Subsequently, the chatting screen 319 receives information on the current state of progress and displays the received information with a progress bar or so on.

In addition, the chatting screen 319 displays a time at which a chatting word is input in the conversation display window together.

Also, as illustrated in FIGS. 14A to 14F, the chatting screen 319 displays the icon of the air conditioner in the target window when the icon of the air conditioner is touched, and performs a preparing process for a user to chat by displaying the keypad E36 when the text window is touched.

When the transmission button is touched after an operation instruction is input using text, the chatting screen 319 displays the input on-operation instruction in the conversation display window, and displays a current room temperature provided by the air conditioner. When the transmission button is touched after a target room temperature is input using text, the chatting screen 319 displays the input target room temperature in the conversation display window, receives a response that the instruction will be carried out from the air conditioner, and displays received text in the conversation display window.

As illustrated in FIGS. 15A to 15F, the chatting screen 319 displays the entire device selection icon in the target window when the entire device selection icon is touched, and performs a preparing process for a user to chat by displaying the keypad E36 when the text window is touched.

When a chatting word for monitoring the entire devices is input through the keypad, the chatting screen 319 displays the input chatting word in the conversation display window. When monitoring information is received from previously registered electronic devices, the chatting screen 319 displays the received device-specific monitoring information in the conversation display window.

When the conversation display window is touched while the device-specific monitoring information is displayed, the chatting screen 319 hides the keypad.

As illustrated in FIGS. 16A to 16G, the chatting screen 319 displays the entire device selection icon in the target window when the entire device selection icon is touched, and performs a preparing process for a user to chat by displaying the keypad E36 when the text window is touched.

When a chatting word for notifying the entire devices of a going-out is input through the keypad, the chatting screen 319 displays the input chatting word in the conversation display window. When operation status information corresponding to going-out is received to previously registered electronic devices, the chatting screen 319 displays the received device-specific operation status information in the conversation display window.

When the conversation display window is touched while the device-specific operation status information is displayed, the chatting screen 319 hides the keypad.

The chatting screen 319 displays the icon of the air conditioner in the target window when the icon of the air conditioner is touched, and performs a preparing process for a user to chat by displaying the keypad E36 when the text window is touched.

When the transmission button is touched after an operation instruction is input using text, the chatting screen 319 displays the input on-operation instruction in the conversation display window, and displays a current room temperature provided by the air conditioner. When the transmission button is touched after a target room temperature is input using text, the chatting screen 319 displays the input target room temperature in the conversation display window, receives a response that the instruction will be carried out from the air conditioner, and displays received text in the conversation display window.

As illustrated in FIG. 12C, the chatting screen 319 performs a preparing process for a user to chat by displaying a plurality of short-cut buttons E37 in which chatting instructions are shown when the list button is touched.

FIGS. 17A to 17F shows examples of device-specific shortcut buttons registered in advance.

Figure 17A:
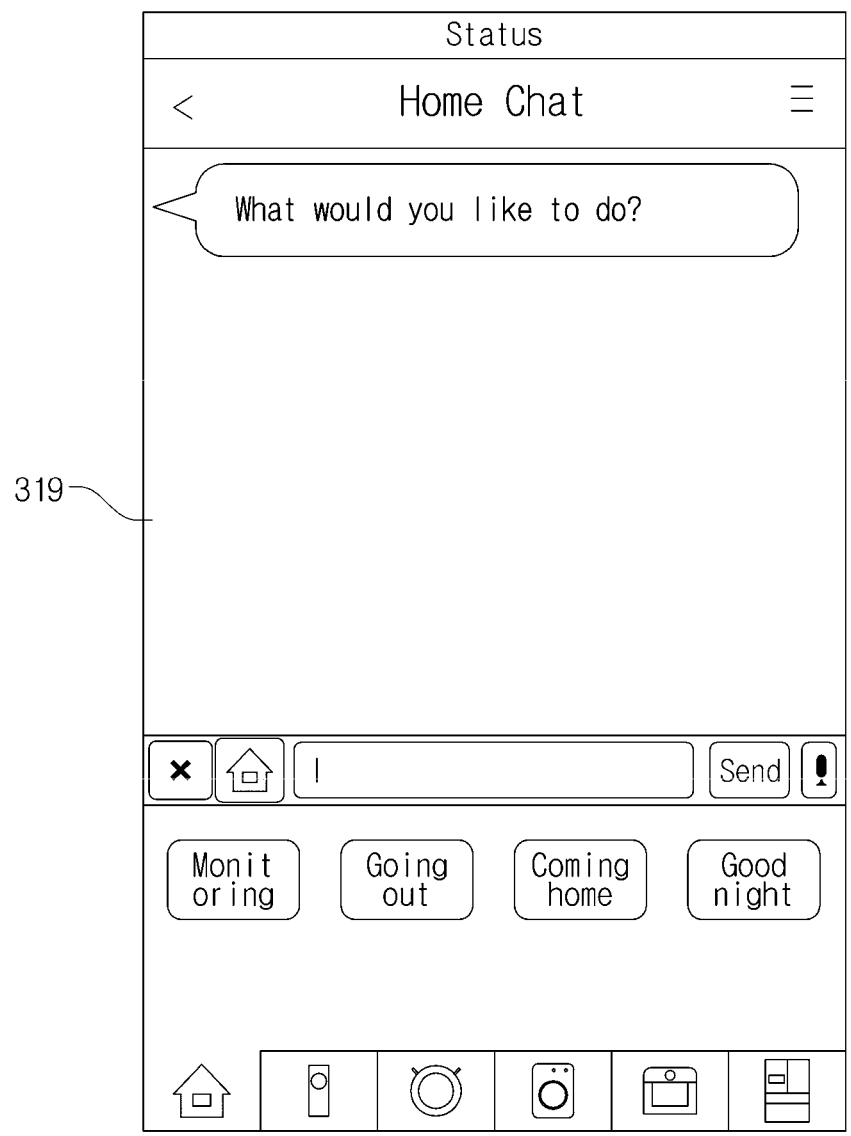

FIG. 17A is an example diagram of a shortcut button list corresponding to the entire device selection icon, and a plurality of shortcut buttons have respective operation instructions for controlling all the previously registered electronic devices in an integrated fashion upon selection of the entire device selection icon. Also, the plurality of short-cut buttons for transmitting control instructions to the entire devices correspond to buttons in the master key unit.

Figure 17B:
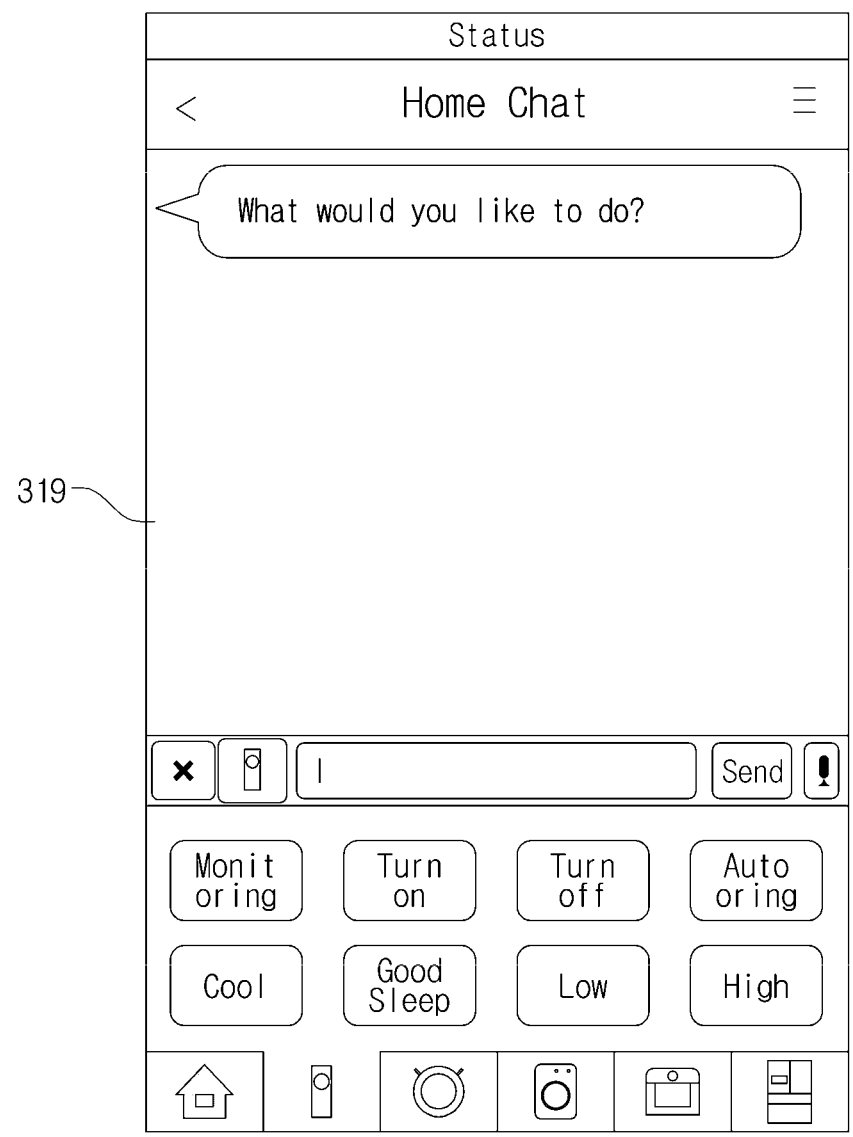
Figure 17C:
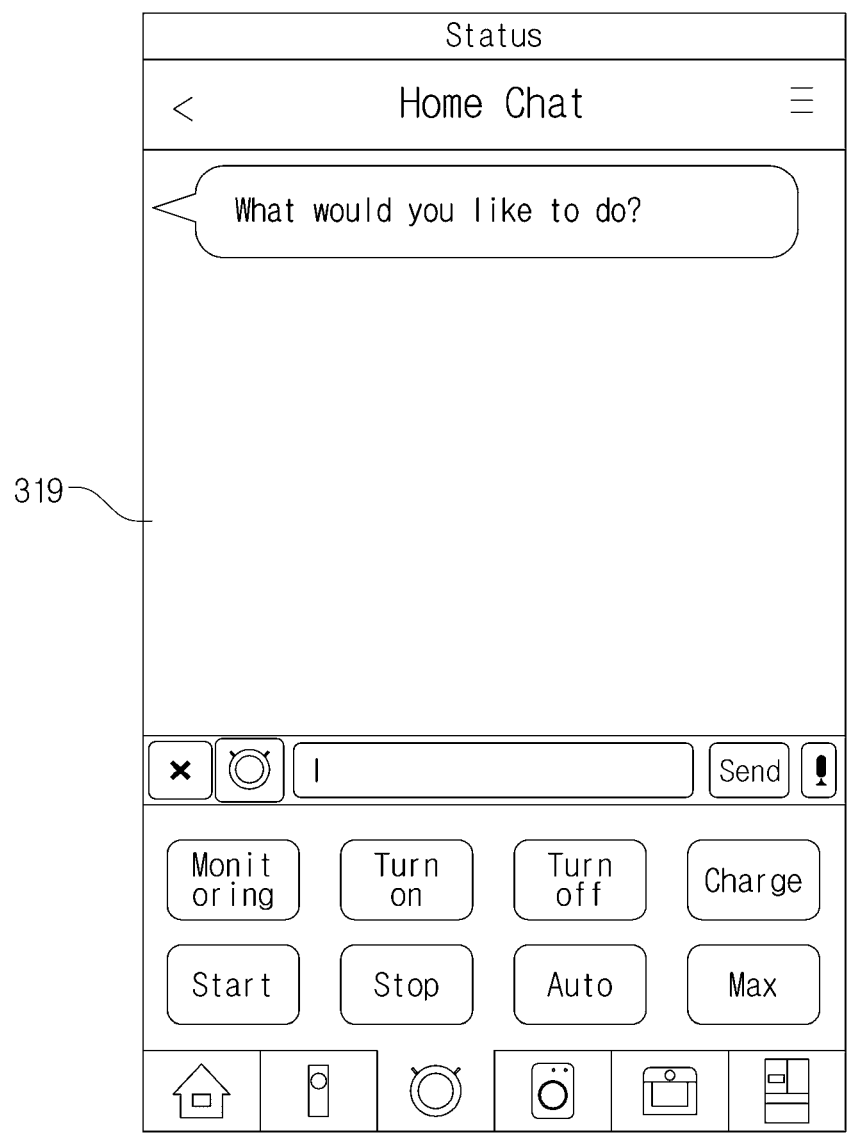
Figure 17D:
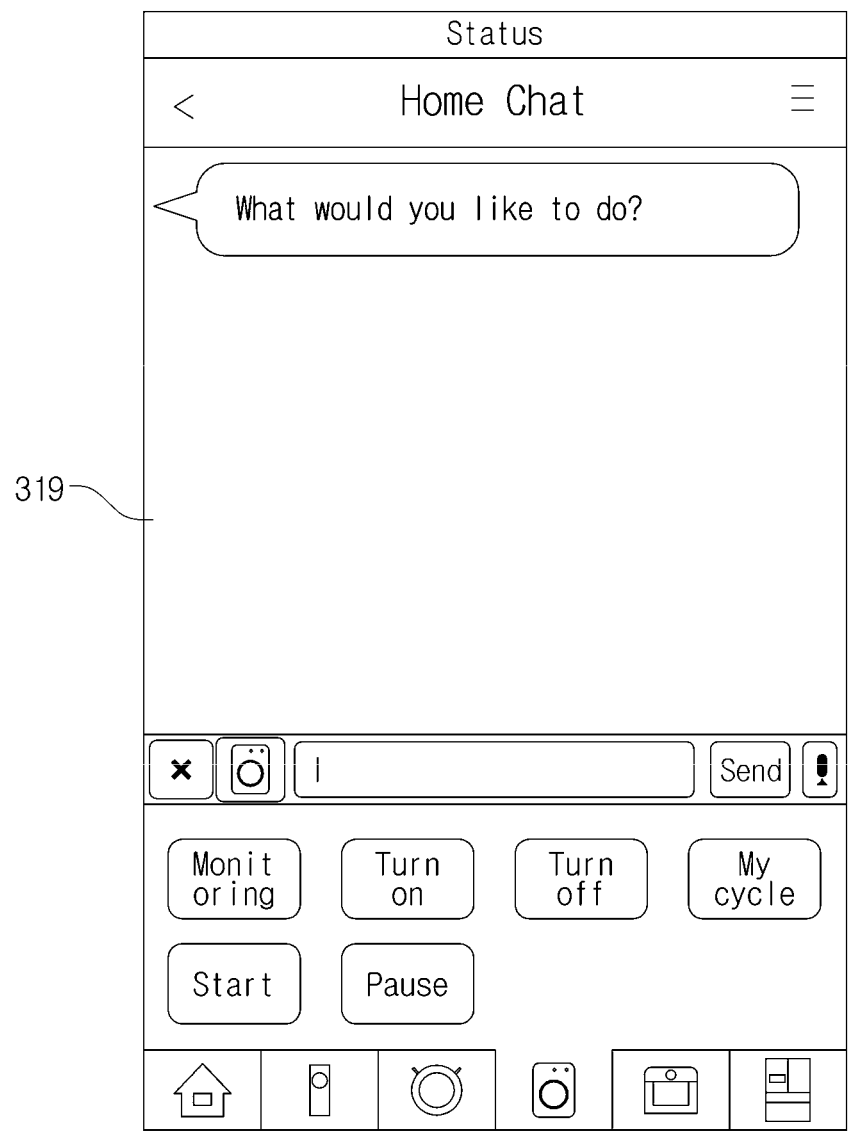
Figure 17E:
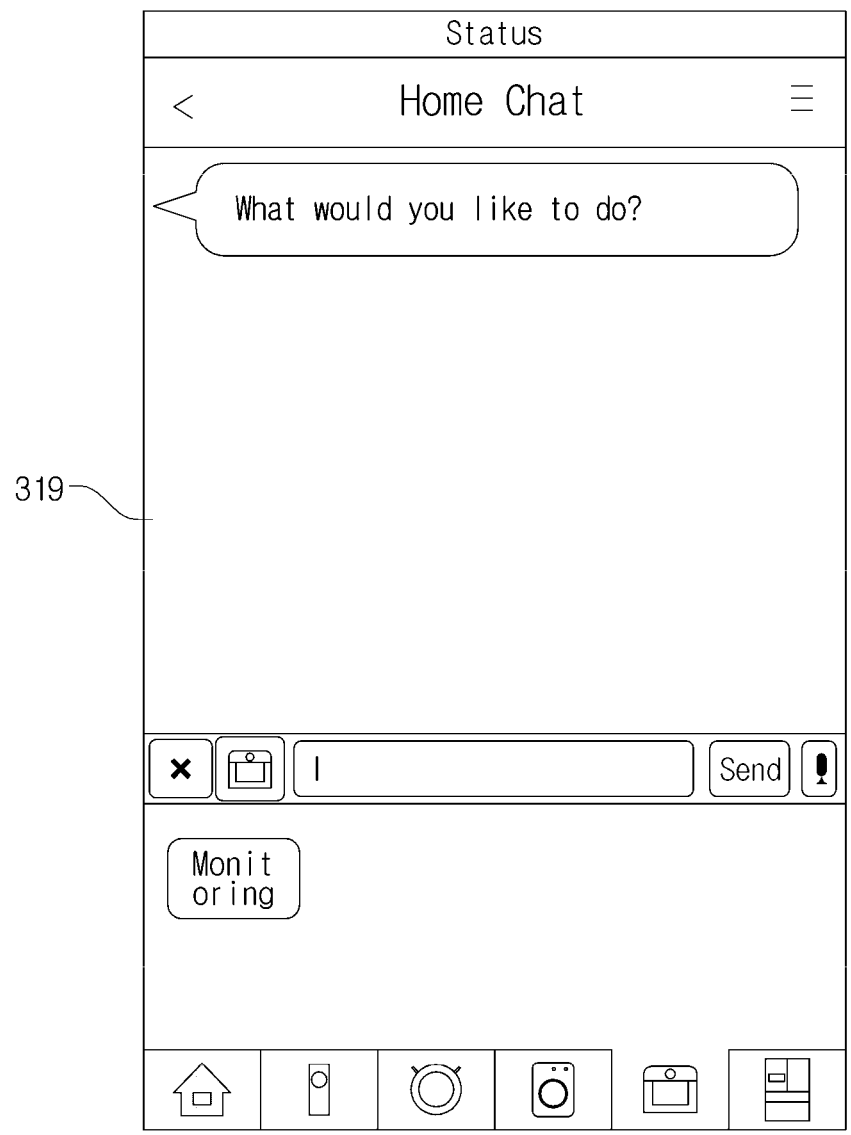
Figure 17F:
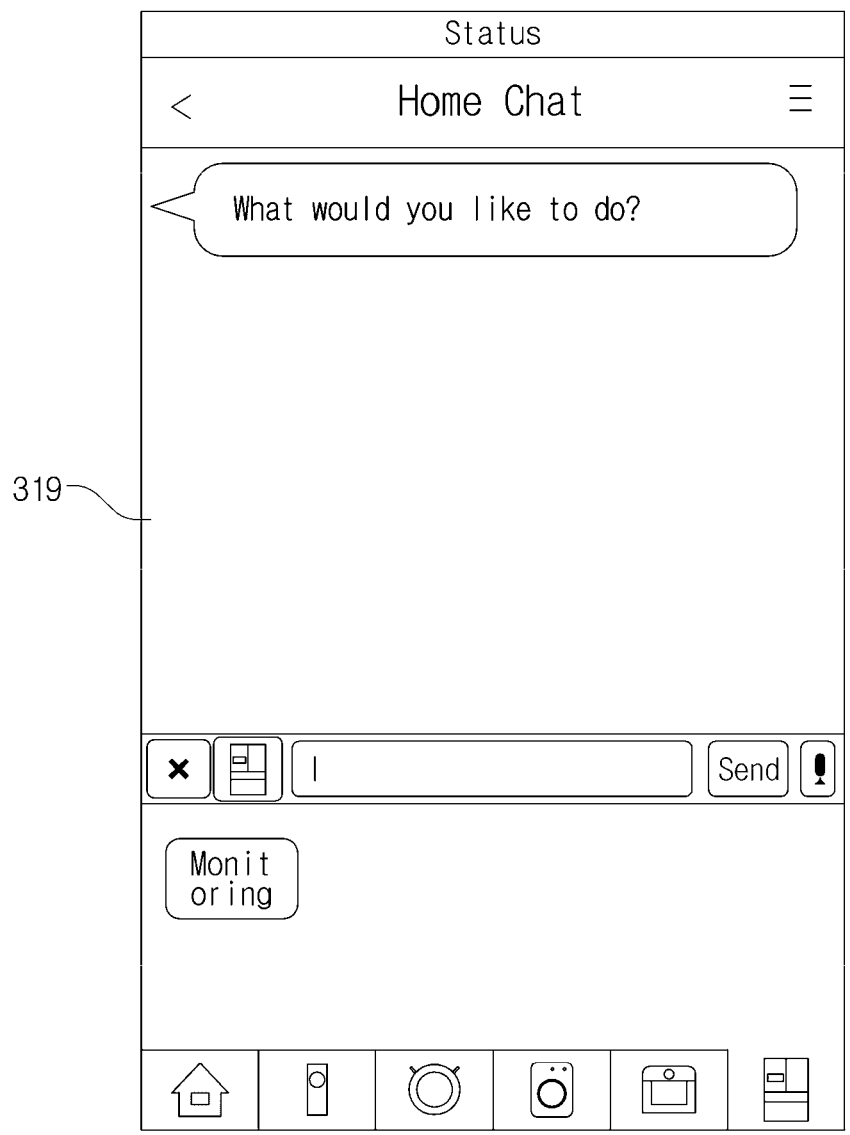
Figure 18A:
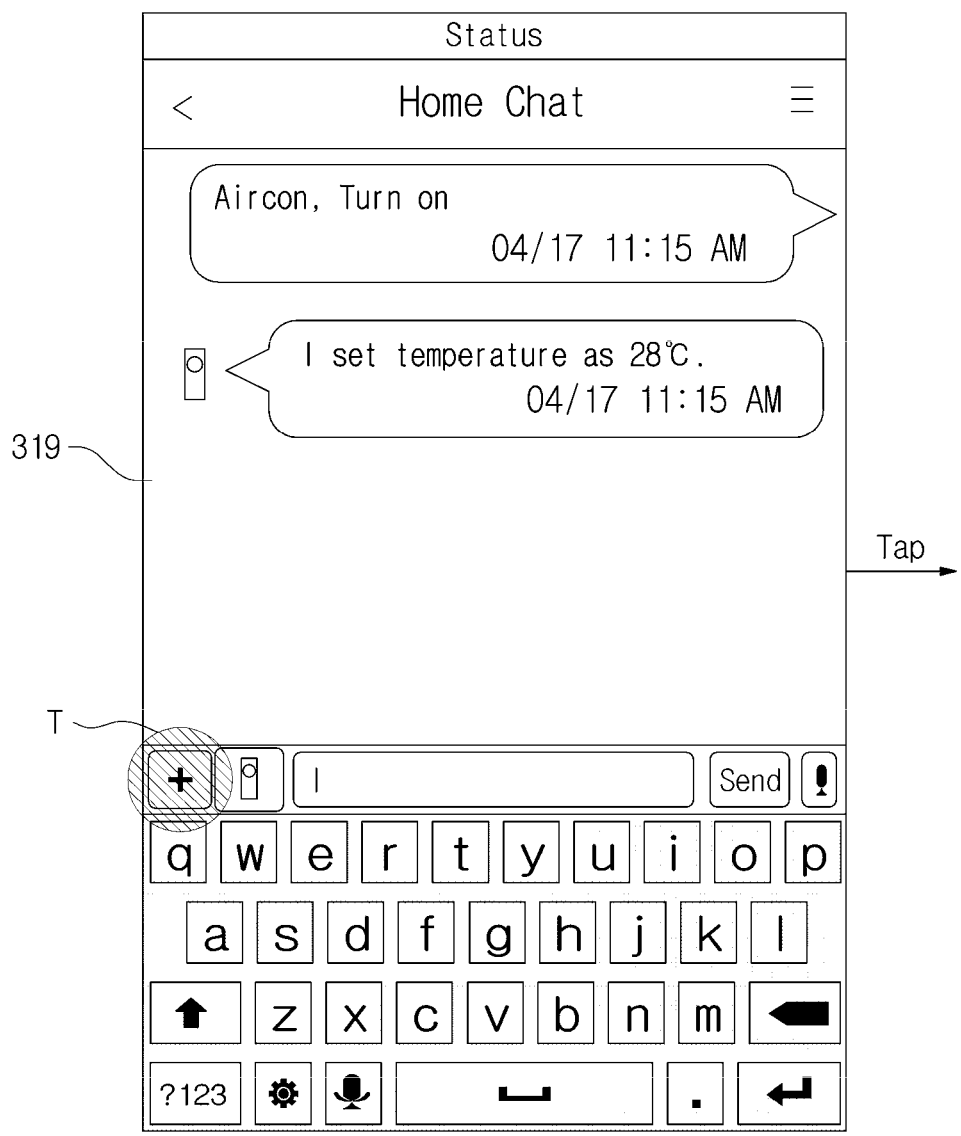
Figure 18B:
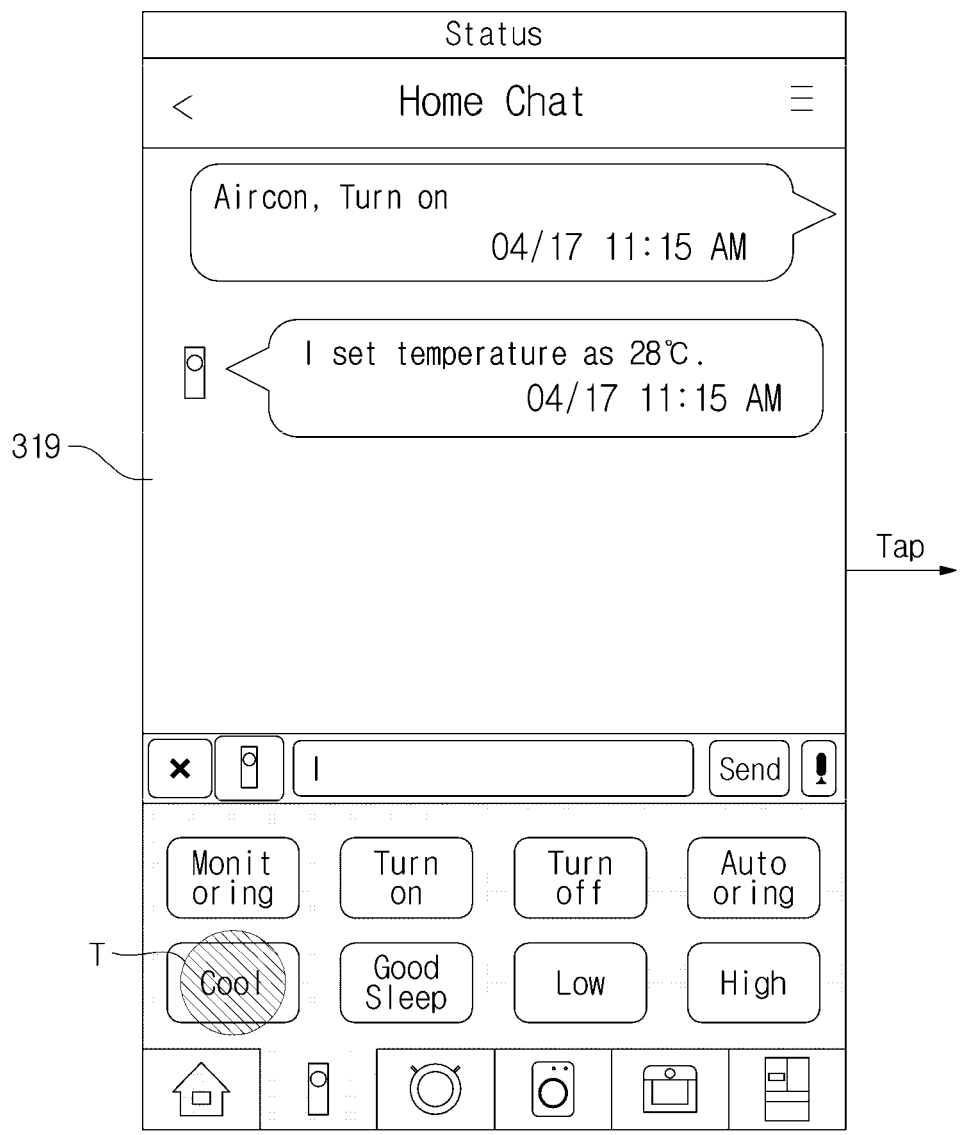
Figure 18C:
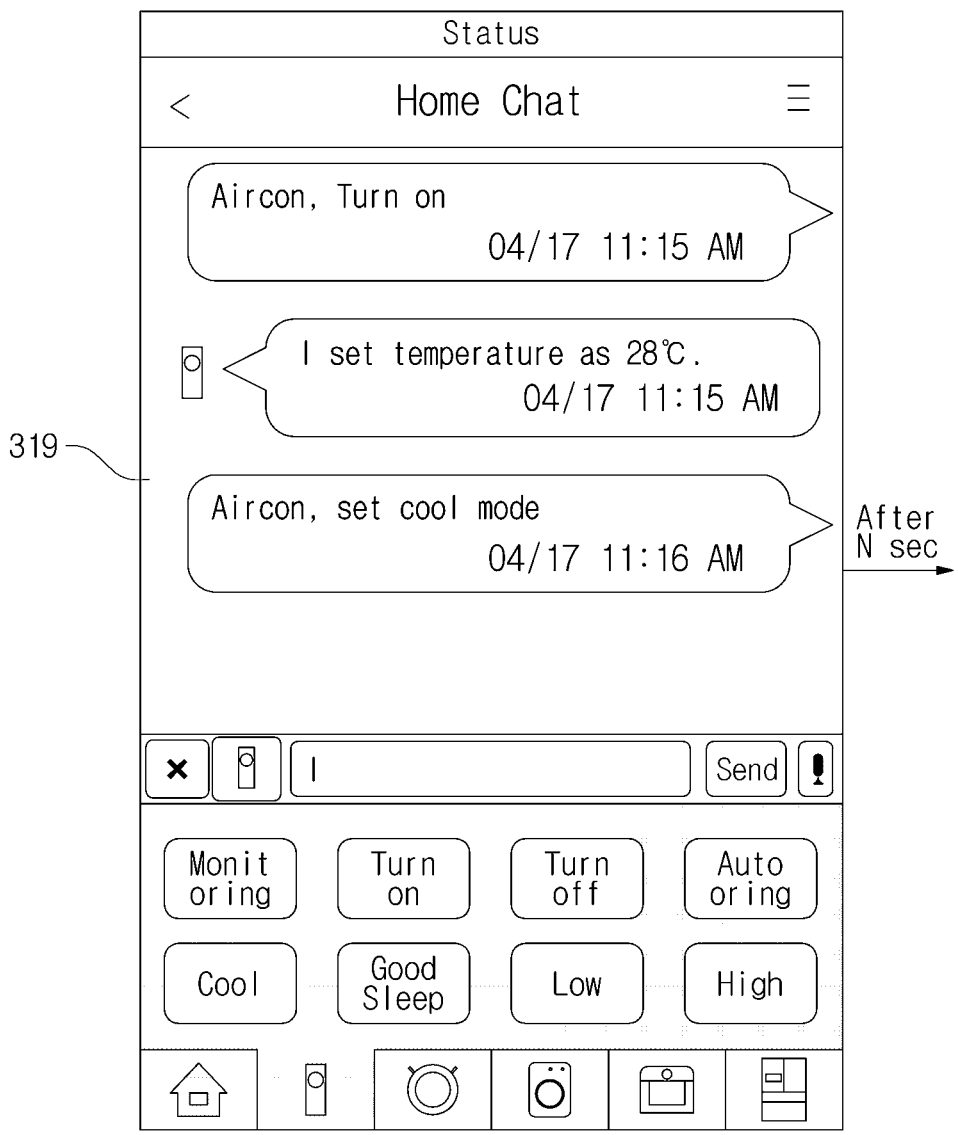
Figure 18D:
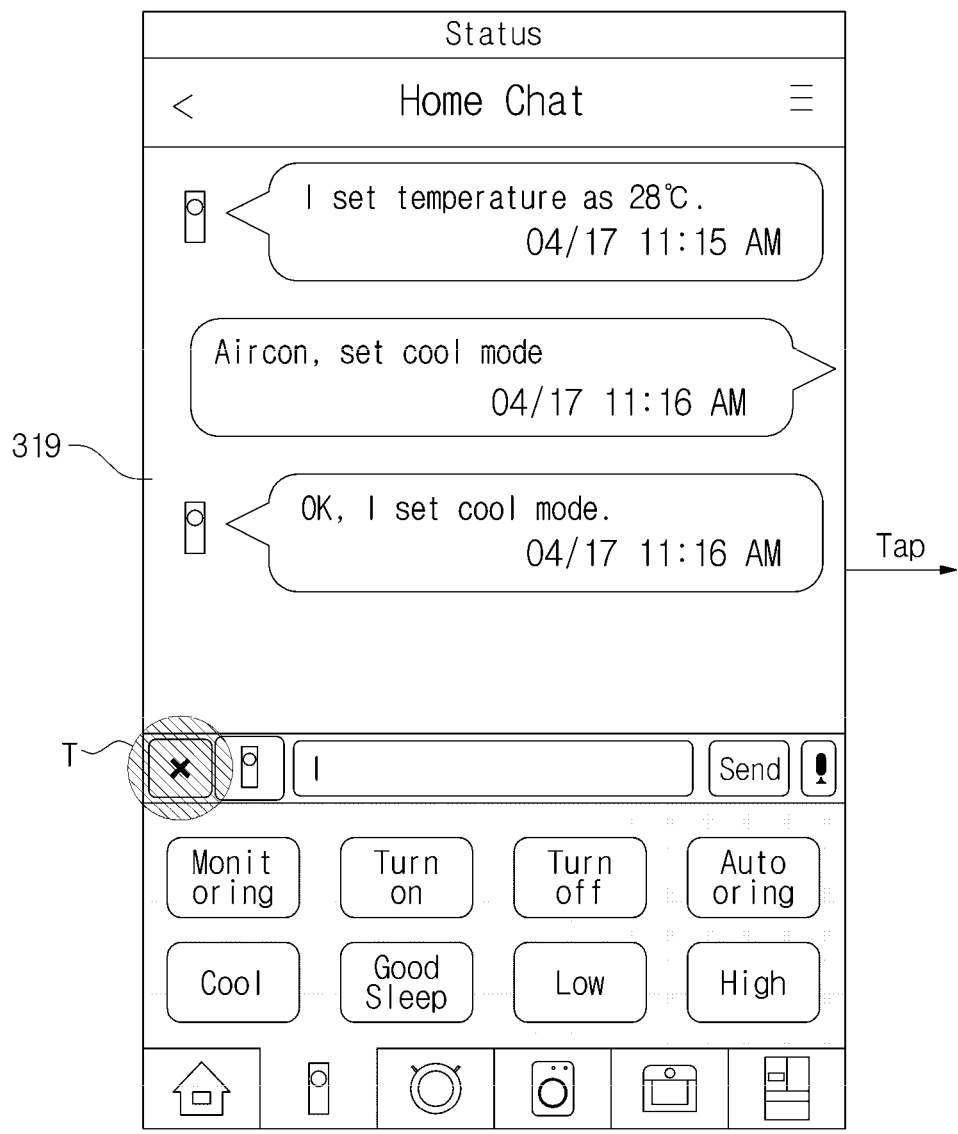
Figure 18E:
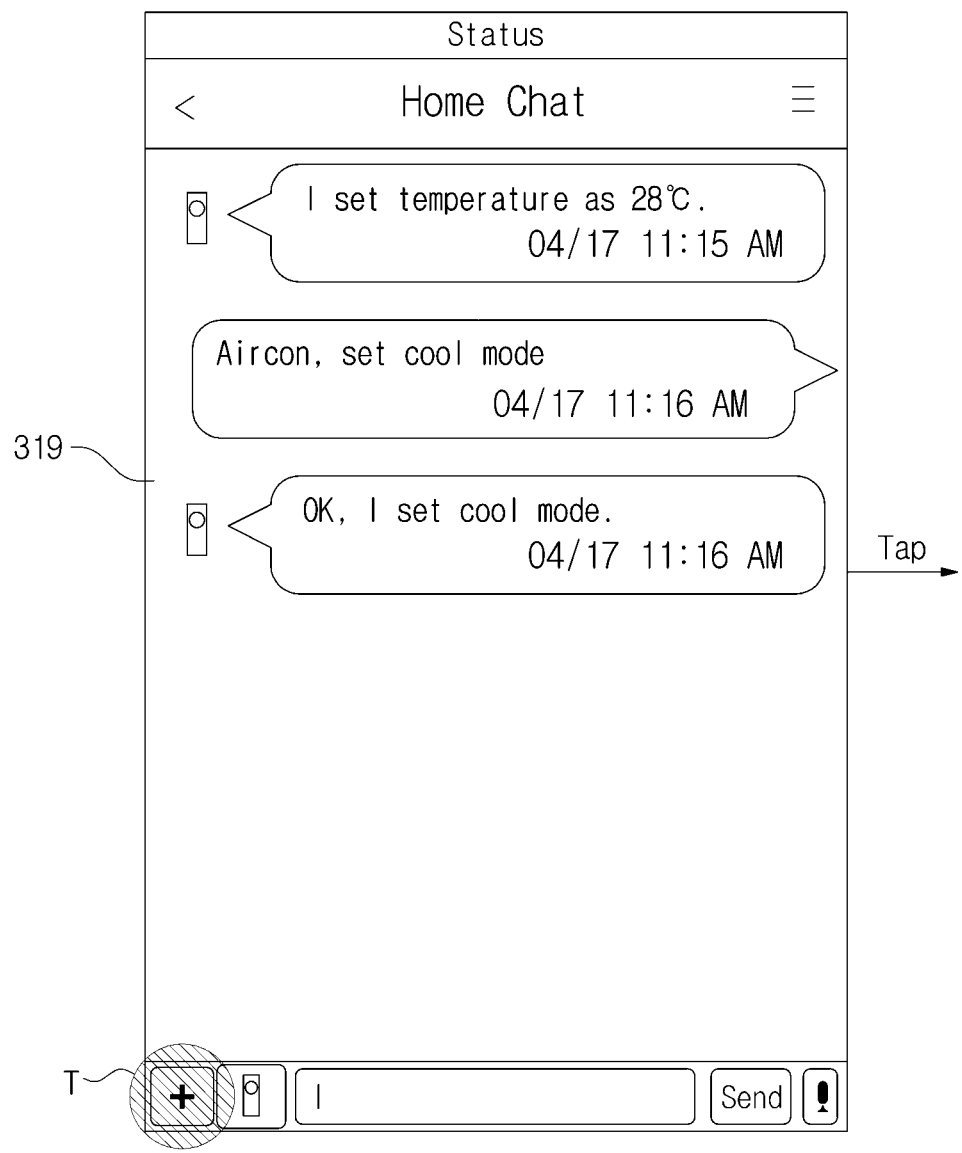
Figure 18F:
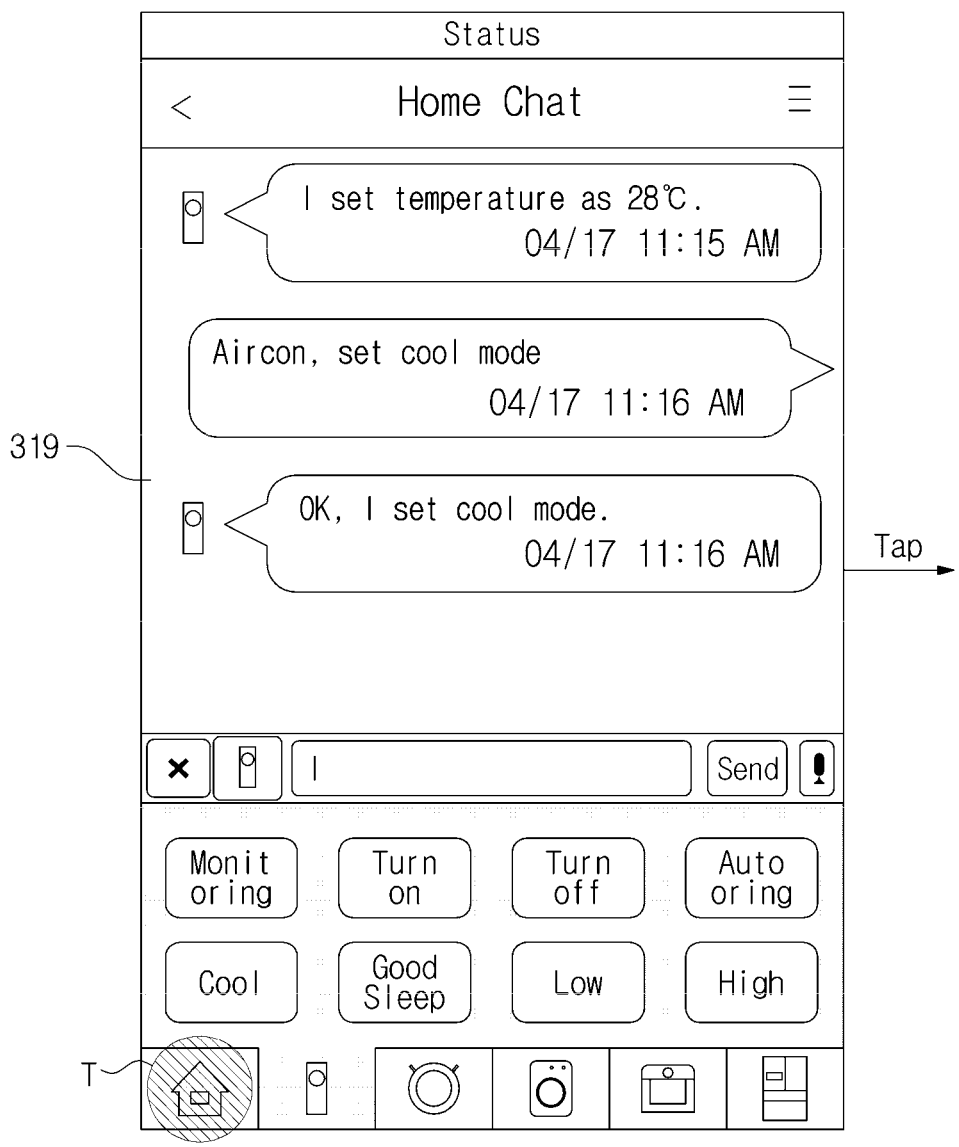
Figure 18G:
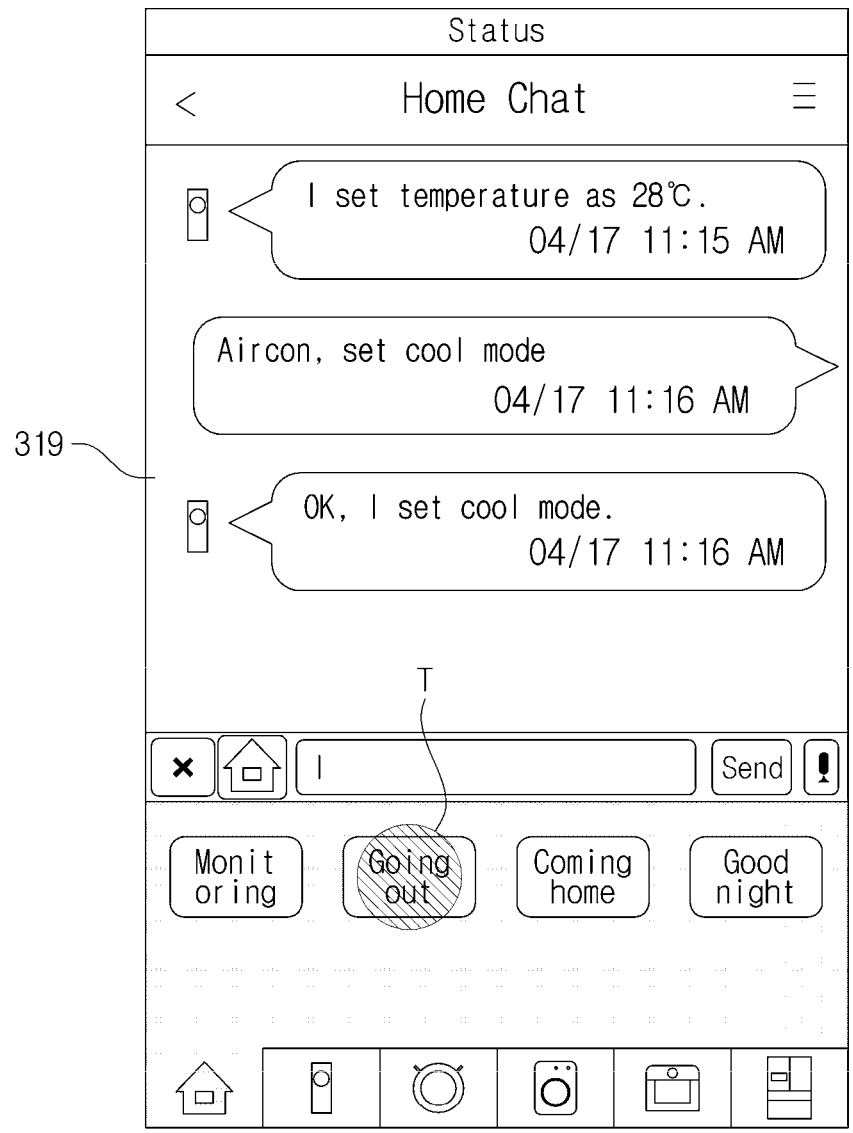

FIG. 17B is an example diagram of a shortcut button list corresponding to control of operation of the air conditioner, FIG. 17C is an example diagram of a shortcut button list corresponding to control of operation of the cleaning robot, FIG. 17D is an example diagram of a shortcut button list corresponding to control of operation of the washing machine, FIG. 17E is an example diagram of a shortcut button list corresponding to control of operation of the cooking equipment, and FIG. 17F is an example diagram of a shortcut button list corresponding to control of operation of the refrigerator.

As illustrated in FIGS. 18A to 18G, when the icon of the air conditioner is touched, the chatting screen 319 displays the icon of the air conditioner in the target window, receives information on a current room temperature from the air conditioner, and displays the received current room temperature in the conversation display window.

When the list button is touched, the chatting screen 319 displays the plurality of shortcut buttons E37 in which chatting instructions for operation control related to the air conditioner are shown.

When a shortcut button for instructing cooling is touched among the plurality of shortcut buttons, the chatting screen 319 displays a conversation corresponding to the touched shortcut button in the conversation display window, receives an operation status from the air conditioner, and displays a conversation that a cooling operation is carried out. When the list button is touched after a previously set time, the chatting screen 319 causes the list button to disappear. Subsequently, when the list button in the conversation input window is touched, the chatting screen 319 displays the icon selection window and a shortcut button list.

When the entire device selection icon is touched while the icon selection window and the shortcut button list are displayed, the chatting screen 319 displays the entire device selection icon in the target window and displays a list of shortcut buttons corresponding to the entire device selection icon.

Subsequently, when the going-out button is touched among the plurality of shortcut buttons, the chatting screen 319 displays a conversation providing a notification that the going-out button has been touched in the conversation display window, and transmits previously set device-specific operation instructions corresponding to the going-out button to the respective electronic devices.

In addition, the chatting screen 319 displays a time at which a chatting word is input in the conversation display window together.

As illustrated in FIG. 12D, when the microphone button E34 is touched, the chatting screen 319 performs a preparing process for a user to chat by displaying a voice input window E38 for receiving a voice instruction.

As illustrated in FIG. 12D, the chatting screen 319 performs a preparing process for a user to chat by displaying the icon of the washing machine in the target window when the icon of the washing machine is touched, and by displaying the voice input window E38 when the microphone button E34 is touched.

The voice input window E38 includes a button for setting voice instruction feedback, a button for voice input, and a keypad transition button for switching to the keypad.

When a speech is made after the button for voice input is touched, the chatting screen 319 collects the speech through the microphone, recognizes the speech, and then displays the recognized speech in the conversation display window. When the recognized speech corresponds to an inquiry about the state of progress of the washing machine, the chatting screen 319 receives information on the current state of progress from the washing machine and displays the received information with a progress bar or so on.

In addition, the chatting screen 319 displays a time at which a chatting word is input in the conversation display window together.

The home view part 314 outputs an image of the user's home at previously set time intervals, and may also enlarge and output the home view image on a dashboard screen when a touch instruction is input.

In addition, the home view part 314 may also output a past image in accordance with the user's instruction.

FIGS. 19A to 20F are example diagrams of a popup window displayed on a home screen of a mobile device according to an embodiment.

Figure 19A:
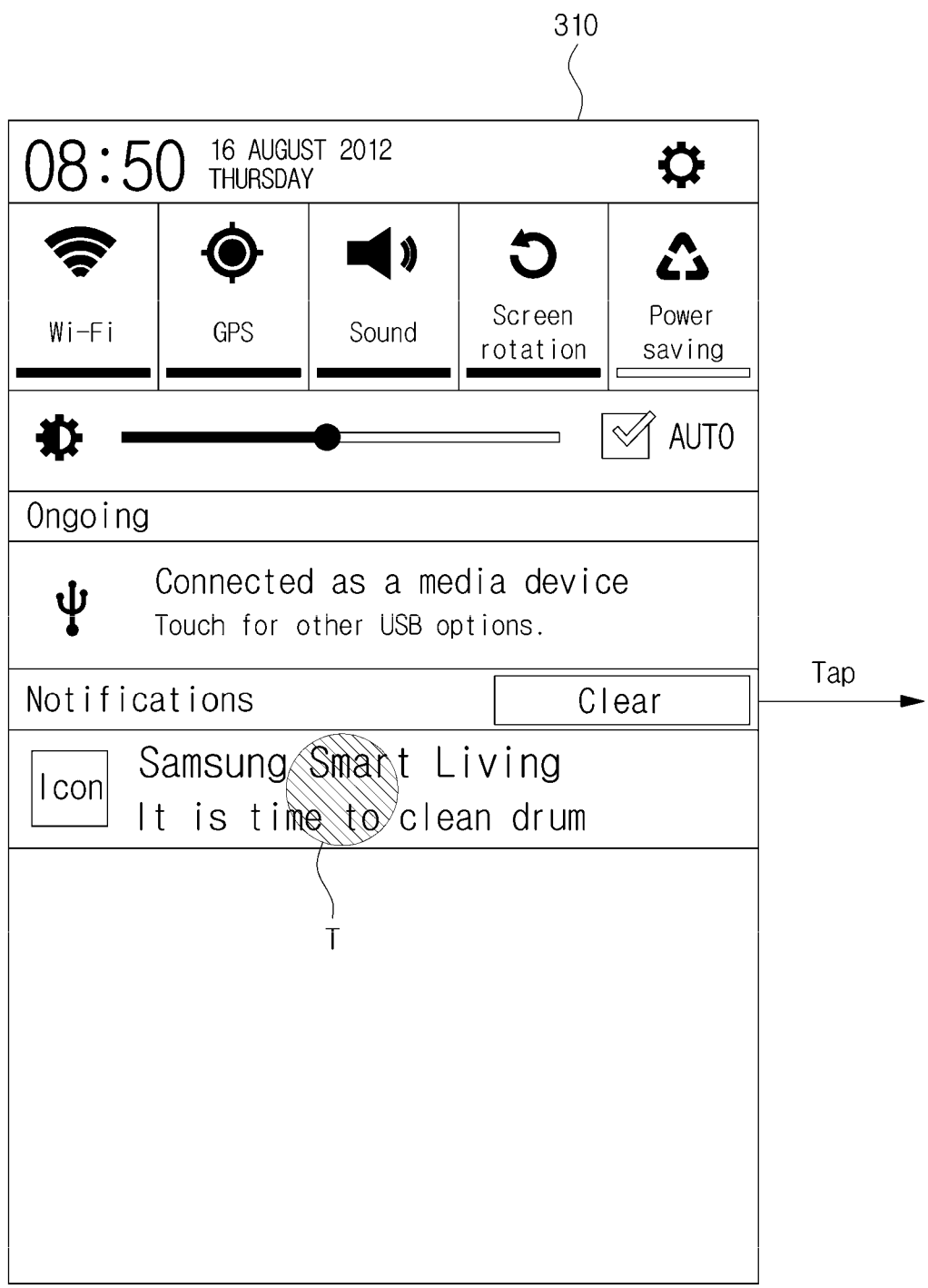
FIGS. 19A to 20F are diagrams illustrating a popup window displayed in a home screen of the mobile device according to an embodiment.
Figure 19B:
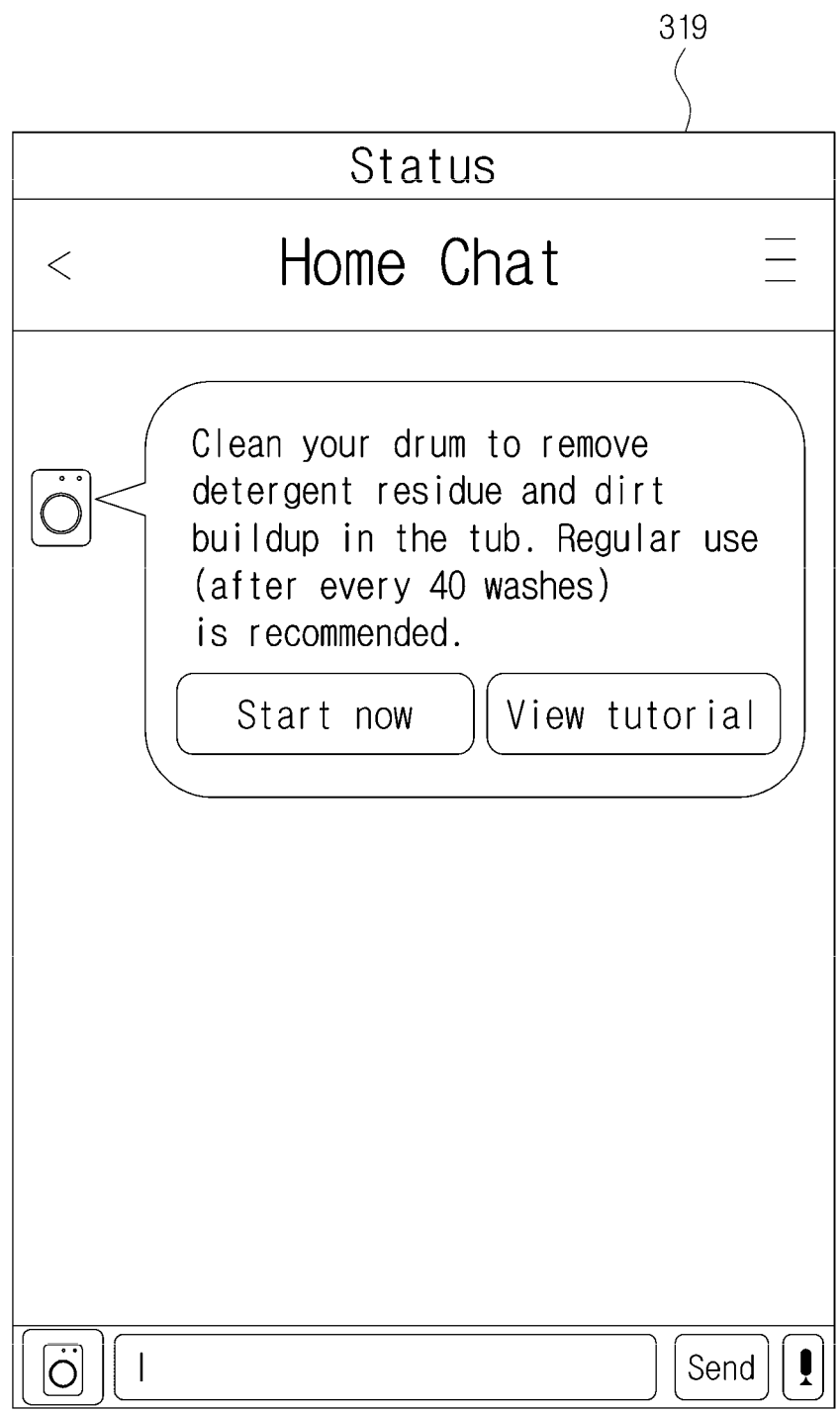
Figure 20A:
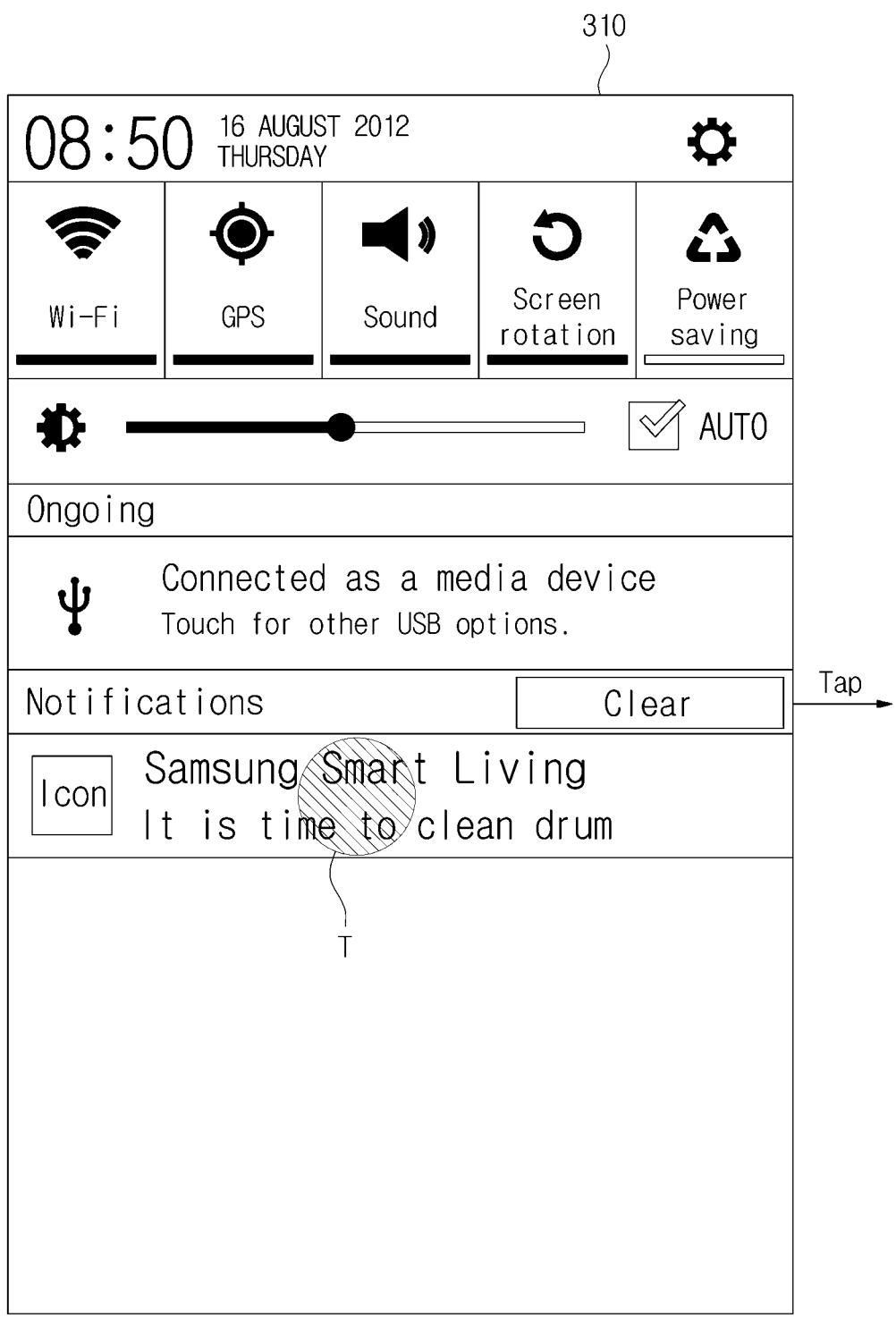
Figure 20B:
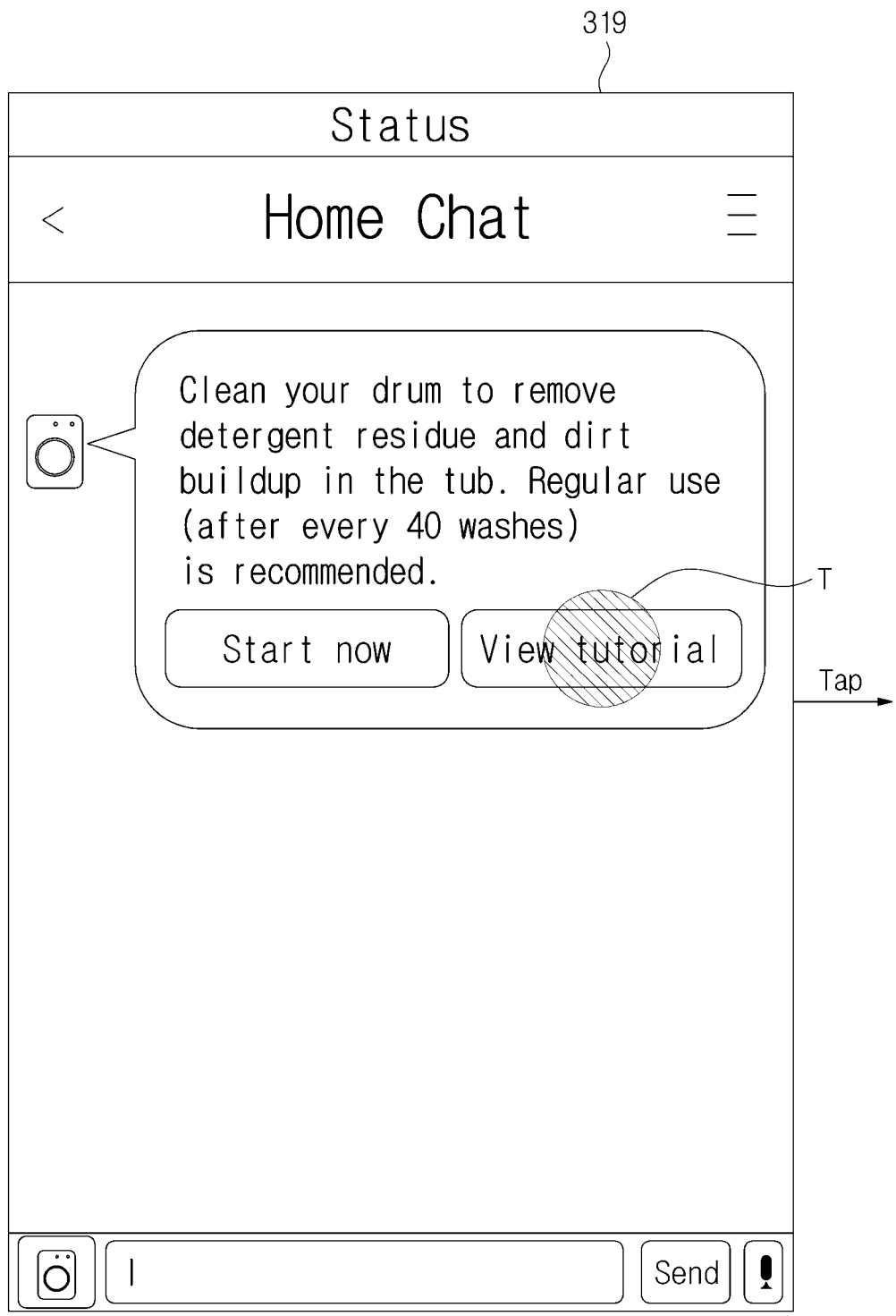
Figure 20C:
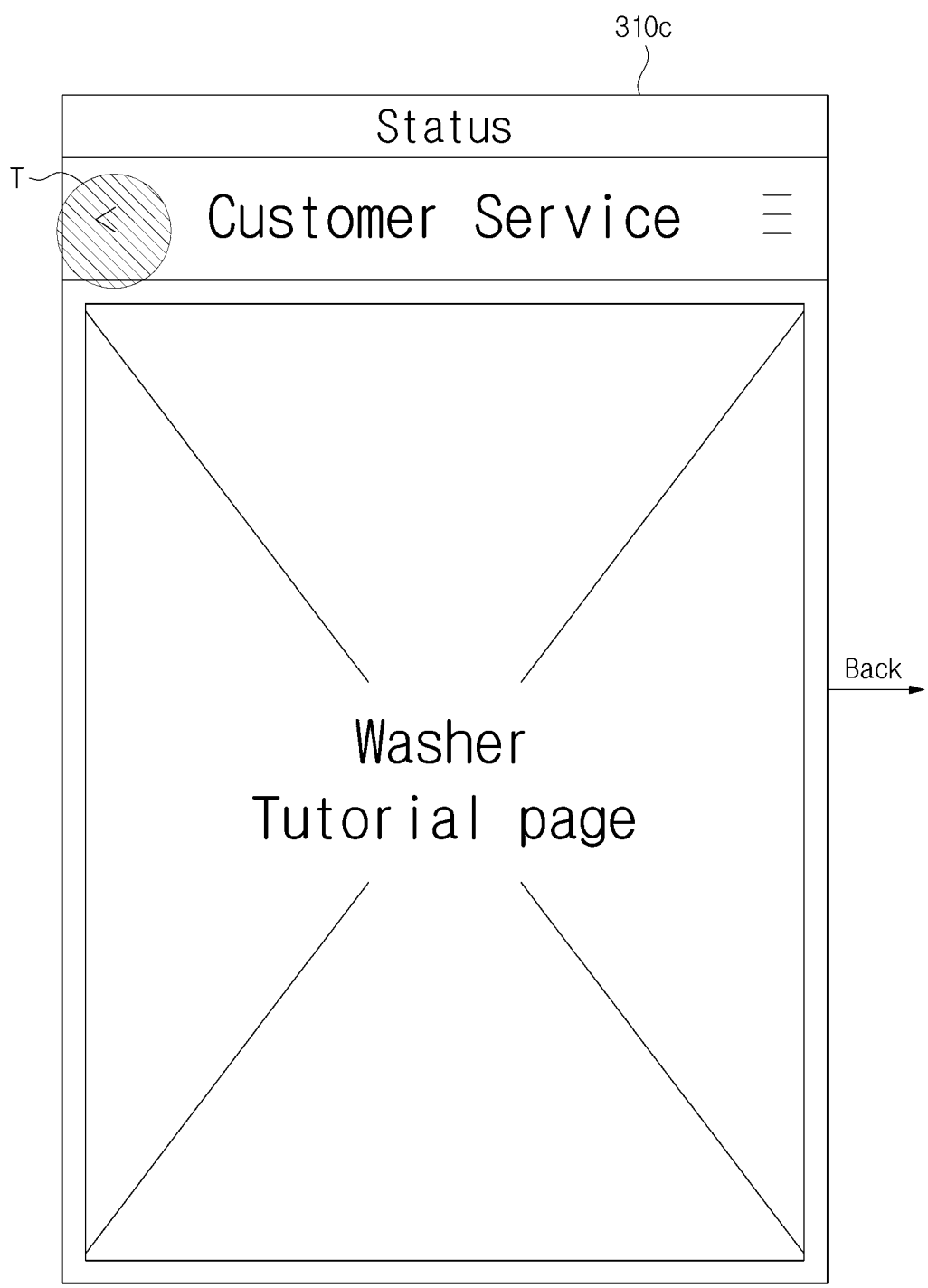
Figure 20D:
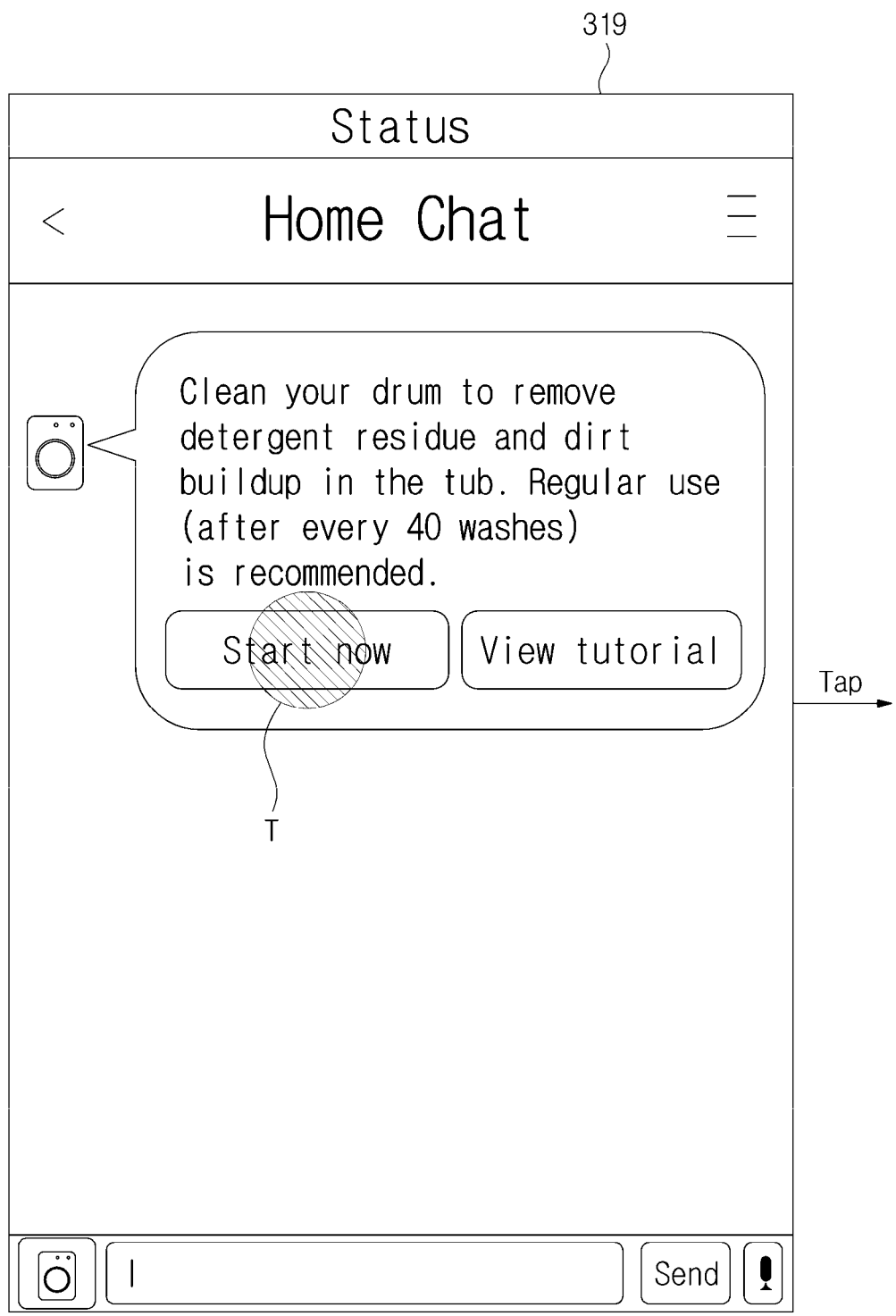
Figure 20E:
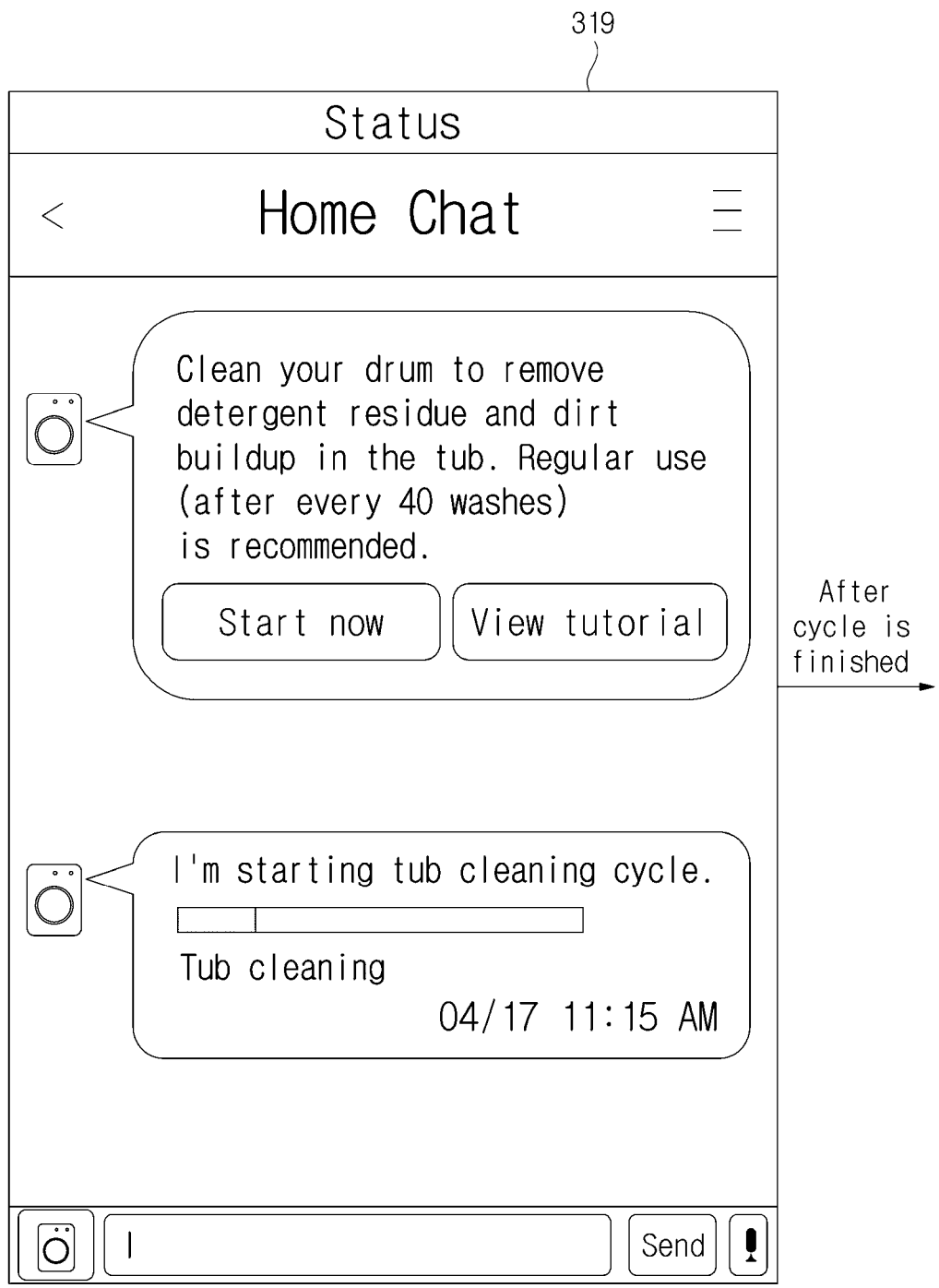
Figure 20F:
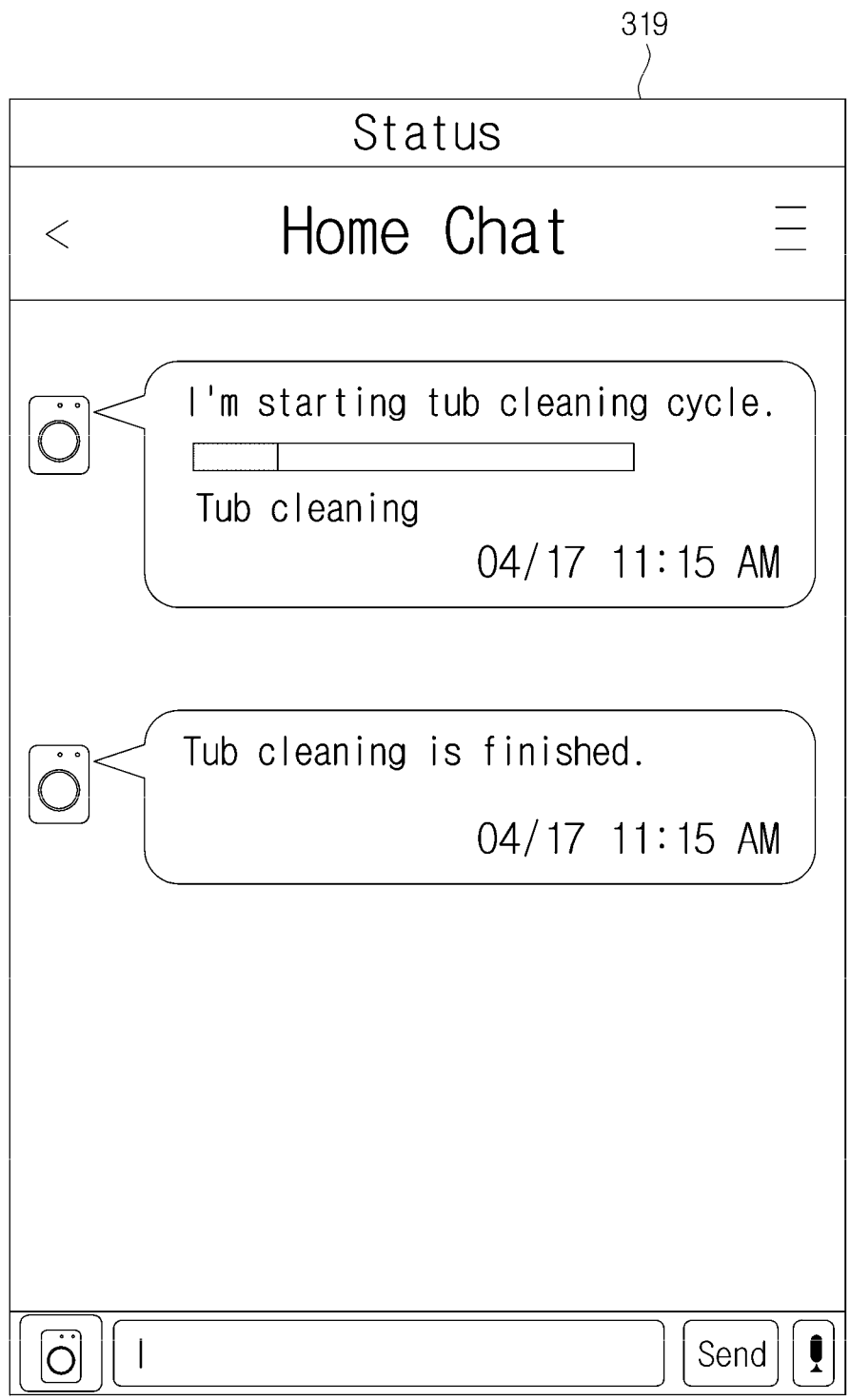

As illustrated in FIG. 19A and FIG. 19B, a mobile device determines whether the operation status of at least one electronic device is changed while no application is executed. When it is determined that the operation status of at least one electronic device is changed, the mobile device displays notification information corresponding to the change in the operation status on the home screen of the user interface unit 310 through a popup window.

When the notification information in the popup window is touched, the user interface unit 310 displays information on the corresponding electronic device in detail.

As illustrated in FIGS. 20A to 20F, the user interface unit 310 may also display a tutorial of the corresponding electronic device and perform an operation for managing the washing machine.

For example, when a button for instructing cleaning of a washing tub is touched while a message for cleaning of the washing tub of the washing machine is displayed, the user interface unit 310 transmits the washing tub cleaning instruction to the washing machine and displays the progress of cleaning of the washing tub in the user interface unit 310.

What is claimed is:

1. A mobile device comprising:
 a memory configured to store information of previously registered electrical devices;
 an application configured to monitor and control an operation of the previously registered electrical devices;
 a transceiver configured to communicate with the previously registered electrical devices;
 a display configured to display an operation status of the previously registered electrical devices;
 an input configured to receive an operation command of at least one of the previously registered electrical devices; and
 at least one processor configured to:
  execute the application, and
  control an operation of the at least one electrical device based on the operation command of the at least one electrical device when the application is executed,
 wherein the application includes a message screen for inputting and outputting an interactive message with at least one previously registered electrical device,
 wherein the message screen includes an interactive message display windows that displays interactive message with the at least one electrical device, and an interactive message input window for inputting interactive message with the at least one electrical device, and
 wherein the interactive message input window includes at least one of a keypad for inputting characters and a button for instructing to input voice.

2. The mobile device according to claim 1, wherein the application includes:
 a dashboard screen in which the message screen is set; and
 at least one plugin screen switched by a sliding touch input to the dashboard screen and inputting and outputting a registration item and a service item associated with the previously registered electrical devices.

3. The mobile device according to claim 2, wherein the plugin screen includes:
 a device confirmation button having registration information for the previously registered electrical device; and
 a registration setting button associated with registering new devices.

4. The mobile device according to claim 2, wherein the plugin screen includes:
 a setting changing button for changing settings of the message screen;
 a service button for receiving a service associated with the previously registered electrical devices; and
 a management button for each of the previously registered electrical devices.

5. The mobile device according to claim 1, wherein the application further includes:
 an overview part that includes an icon of the previously registered electrical device; and
 a status icon arranged around the icon of each of the previously registered electrical devices and guiding an ON/OFF state and a progress state of each of the previously registered electrical devices.

6. The mobile device according to claim 5, wherein when the icon of any one of the previously registered electrical devices is touched, the at least one processor is further configured to:
 change the operation status of a touched electrical device, and
 perform control so that the changed operation status is displayed as the status icon.

7. The mobile device according to claim 5, wherein when the icon of any one of the previously registered electrical devices is touched in a state in which a touched electrical device is ON, the at least one processor is further configured to:
 confirm a progress status of the touched electrical device corresponding to the touched icon, and control the application so that the confirmed progress status is displayed in the status icon.

8. The mobile device according to claim 5, wherein the at least one processor is further configured to:
confirm at least one of update, an error or a reservation status of the previously registered electrical devices, and
control the application so that the confirmed status is displayed in the status icon.

9. The mobile device according to claim 5,
wherein the application further includes: a master key part for causing the previously registered electrical device to operate based on a previously set operation command, and
wherein the at least one processor is further configured to:
change the operation status of the previously registered electrical device in response to a touch input of the master key part and an operation command input of the message screen, and
control the application so that the changed operation status is displayed in the status icon.

10. The mobile device according to claim 5,
wherein the overview part further includes a movement button for moving the icon to change a display position, wherein the movement button includes:
a first direction button for instructing movement from a current screen displayed currently in the overview part to a screen extending in a first direction; and
a second direction button for instructing movement from the current screen to a screen extending in a second direction that is a direction opposite to the first direction,
wherein icons of a predetermined number of the previously registered electrical devices within the current screen displayed currently in the overview part are shifted by one column in the second direction to rearrange the icons when the first direction button is selected, and
wherein the icons of the predetermined number of the previously registered electrical devices within the current screen displayed currently in the overview part are shifted by one column in the first direction to rearrange the icons when the second direction button is selected.

11. The mobile device according to claim 10, wherein when an icon of a new electrical device in an outermost column of the screen displaying the overview part is rearranged in the selected direction, an icon of a previously registered electrical device arranged in an outermost column in a direction opposite to the selected direction disappears.

12. The mobile device according to claim 10, wherein the at least one processor is further configured to cause a screen of a widget part to be kept in a current state when the movement button of the overview part is touched.

13. The mobile device according to claim 9,
wherein the master key part includes a going out button, a coming home button, and a good night button for collectively controlling previously registered electrical devices, and
wherein the at least one processor is further configured to:
confirm a button, selected from among the going out, coming home and good night buttons, touched in the input, and
cause an operation command to be transferred to the registered electrical device based on the confirmed button.

14. The mobile device according to claim 13, wherein the master key part further includes:

a setting button for setting and changing the operation command of the previously registered electrical devices for each of the going out button, the coming home button, and the good night button.

15. The mobile device according to claim 13, wherein the master key part further includes:
a setting button for adding and deleting a button for collectively controlling the previously registered electrical devices.

16. The mobile device according to claim 1,
wherein the application further includes a home view part that outputs an image in home, and
wherein the at least one processor is further configured to:
display an image of the inside of the home of a user at previously set time intervals in the home view part, and
enlarge and display a home view image on a dashboard screen when a touch command is input.

17. The mobile device according to claim 1, wherein the message screen includes: an icon selection window including the icon of each of the previously registered electrical devices and used to select at least one icon.

18. The mobile device according to claim 17, wherein the interactive message input window includes a transfer button that transfers an interactive message input.

19. The mobile device according to claim 1, wherein the interactive message input window includes a plurality of shortcut buttons in which the operation commands of the respective registered electrical devices are set.

20. The mobile device according to claim 17, wherein the interactive message input window further includes a target window that displays the icon of an electrical device among the previously registered electrical devices that is an interaction target.

21. The mobile device according to claim 17, wherein the interactive message input window further includes an all-device selection icon that causes all of the previously registered electrical devices to be interaction targets.

22. The mobile device according to claim 1, wherein the at least one processor is further configured to:
determine whether the operation status of at least one of the previously registered electrical devices is changed in a state in which the application is not executed, and
cause notice information corresponding to the change of the operation status to be displayed as a popup window on a home screen when determining that the operation status of the at least one of the previously registered electrical devices is changed.

23. The mobile device according to claim 1, wherein the at least one processor is further configured to cause notice information for update, an error, and management time of at least one of the previously registered electrical devices to be displayed as a popup window on a home screen in a state in which the application is not executed.

24. A mobile device comprising:
a memory configured to store information of previously registered electrical devices;
an application for monitoring and controlling the previously registered electrical devices;
a transceiver that communicates with the previously registered electrical devices;
a user interface that outputs icons of the previously registered electrical devices, a movement button for moving the icon to change a display position, and a status icon arranged around the icon and guiding an operation status of the previously registered electrical devices, and receives an operation command of at least one of the previously registered electrical devices; and a processor configured to:

execute the application, control the user interface so that the operation status of the previously registered electrical devices is output when the application is executed, change the operation status of the electrical device corresponding to a touched icon when the icon of any one of the previously registered electrical devices displayed on the user interface is touched, and control the user interface so that an operation status of the status icon corresponding to the touched icon is changed.

25. The mobile device according to claim 24, wherein the processor is further configured to:

confirm an ON/OFF state of the previously registered electrical devices, transfer an OFF command to the any one of the previously registered electrical devices when the icon is touched in a state in which the any one of the previously registered electrical device is ON, transfer an ON command to the electrical device when the icon is touched in a state in which the any one of the previously registered electrical devices is OFF, and control displaying of the status icon of the user interface based on the changed operation status.

26. The mobile device according to claim 24, wherein when the icon of any one of the previously registered electrical devices is touched in a state in which the any one of the previously registered electrical devices is ON, the processor is further configured to:

confirm a progress status of the any one of the previously registered electrical devices corresponding to the touched icon, confirm update, an error, and a reservation status of the any one of previously registered electrical devices, and control displaying of the status icon of the user interface based on each of the confirmed information.

* * * * *